United States Patent
Mitsuhashi et al.

(10) Patent No.: US 10,253,775 B2
(45) Date of Patent: Apr. 9, 2019

(54) ROTARY PUMP HAVING A CASING BEING FORMED WITH A COMMUNICATING HOLE COMMUNICATING A SPACE THAT IS BETWEEN THE SIDE PLATE AND THE WALL SURFACE OF THE DRIVING MACHINE

(71) Applicant: NABTESCO AUTOMOTIVE CORPORATION, Tokyo (JP)

(72) Inventors: Yoshihiro Mitsuhashi, Tokyo (JP); Katsunori Tanaka, Tokyo (JP); Hiroyuki Murakami, Tokyo (JP); Kouji Takahashi, Tokyo (JP); Taku Kawakami, Tokyo (JP); Ichiro Minato, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 0 days.

(21) Appl. No.: 15/625,531

(22) Filed: Jun. 16, 2017

(65) Prior Publication Data
US 2017/0284398 A1     Oct. 5, 2017

Related U.S. Application Data

(62) Division of application No. 14/992,549, filed on Jan. 11, 2016, now Pat. No. 9,709,057, which is a division
(Continued)

(30) Foreign Application Priority Data

Mar. 31, 2010  (JP) ................................. 2010-083699
Mar. 31, 2010  (JP) ................................. 2010-083843
(Continued)

(51) Int. Cl.
F03C 2/00       (2006.01)
F03C 4/00       (2006.01)
(Continued)

(52) U.S. Cl.
CPC .......... F04C 29/0078 (2013.01); F01C 21/10 (2013.01); F01C 21/104 (2013.01);
(Continued)

(58) Field of Classification Search
CPC .. F04C 18/3441; F04C 18/3448; F04C 25/02; F04C 29/061; F04C 29/063;
(Continued)

(56) References Cited

U.S. PATENT DOCUMENTS 3,459,275 A    8/1969  Prillwitz et al.
4,263,981 A    4/1981  Weiss et al.
(Continued)

FOREIGN PATENT DOCUMENTS

CN    1446290 A    10/2003
DE    3932299 A1    4/1991
(Continued)

OTHER PUBLICATIONS

International Search Report; PCT/JP2011/058656; dated Sep. 20, 2011.
(Continued)

*Primary Examiner* — Theresa Trieu
(74) *Attorney, Agent, or Firm* — Studebaker & Brackett PC

(57) ABSTRACT

It is intended to provide a vacuum pump so that without upsizing the vacuum pump, noise and vibration are reduced, heat dissipation property is secured, and the casing is downsized. Therefore, at least one turning part is provided in an exhausting path formed in a casing body. The casing body is formed of a material whose thermal conductivity is
(Continued)

higher than that of a rotor and vanes, and a cylinder part where the vanes slide is press fitted in the casing body.

4 Claims, 17 Drawing Sheets

Related U.S. Application Data of application No. 13/638,472, filed as application No. PCT/JP2011/058656 on Mar. 30, 2011, now Pat. No. 9,255,579.

(30) Foreign Application Priority Data

| Mar. 31, 2010 | (JP) | 2010-083878 |
|---|---|---|
| Nov. 30, 2010 | (JP) | 2010-267351 |
| Nov. 30, 2010 | (JP) | 2010-267556 |
| Feb. 14, 2011 | (JP) | 2011-028480 |

(51) Int. Cl.

| F04C 15/00 | (2006.01) |
|---|---|
| F04C 2/00 | (2006.01) |
| F04C 29/00 | (2006.01) |
| F04C 18/344 | (2006.01) |
| F04C 29/12 | (2006.01) |
| F04C 29/06 | (2006.01) |
| F04D 19/00 | (2006.01) |
| F01C 21/10 | (2006.01) |
| F04C 25/02 | (2006.01) |
| B60T 13/52 | (2006.01) |

(52) U.S. Cl.
CPC ...... *F04C 18/3441* (2013.01); *F04C 18/3448* (2013.01); *F04C 25/02* (2013.01); *F04C 29/0085* (2013.01); *F04C 29/061* (2013.01); *F04C 29/063* (2013.01); *F04C 29/068* (2013.01); *F04C 29/12* (2013.01); *F04D 19/00* (2013.01); *B60T 13/52* (2013.01); *F04C 2220/10* (2013.01); *F04C 2240/30* (2013.01); *F04C 2240/50* (2013.01); *F04C 2240/60* (2013.01); *F04C 2240/802* (2013.01); *F04C 2250/102* (2013.01); *F05C 2251/044* (2013.01); *F05C 2251/048* (2013.01)

(58) Field of Classification Search
CPC .... F04C 29/068; F04C 29/12; F04C 29/0078; F04C 29/0085; F04C 2250/102; F01C 21/104; F05C 2251/048; F04D 19/00
USPC ................ 418/259, 266–268, 181, 236–238, 418/178–179; 417/312, 540
See application file for complete search history.

(56) References Cited

U.S. PATENT DOCUMENTS

| 4,534,861 A | 8/1985 | Wedemeyer et al. |
|---|---|---|
| 4,747,761 A | 5/1988 | Yumiyama et al. |
| 4,844,719 A | 7/1989 | Toyomoto et al. |
| 5,722,816 A | 3/1998 | Shimada et al. |
| 6,503,068 B2 | 1/2003 | Kojima et al. |
| 9,255,579 B2 | 2/2016 | Mitsuhashi et al. |
| 2004/0022646 A1 | 2/2004 | Garczorz et al. |
| 2008/0099271 A1 | 5/2008 | Ueki et al. |

FOREIGN PATENT DOCUMENTS

| GB | 974191 A | 11/1964 |
|---|---|---|
| GB | 1017831 A | 1/1966 |
| JP | S54-035410 U | 8/1977 |
| JP | S54-017108 U | 2/1979 |
| JP | S56-148696 A | 11/1981 |
| JP | S57-006912 U | 1/1982 |
| JP | S57-114193 U | 7/1982 |
| JP | S58-72480 U | 5/1983 |
| JP | S59-027185 U | 2/1984 |
| JP | S59-27185 U | 2/1984 |
| JP | S59-045295 U | 3/1984 |
| JP | S59-052194 U | 4/1984 |
| JP | S59-114487 U | 8/1984 |
| JP | S60-261990 A | 12/1985 |
| JP | S61-107991 U | 7/1986 |
| JP | S61-291797 A | 12/1986 |
| JP | S62-060994 A | 3/1987 |
| JP | S62-276295 A | 12/1987 |
| JP | S63-110684 U | 7/1988 |
| JP | H01-167486 A | 7/1989 |
| JP | H04-060191 A | 2/1992 |
| JP | H07-010484 U | 2/1995 |
| JP | H08-135586 A | 5/1996 |
| JP | H08-226388 A | 9/1996 |
| JP | H09-068178 A | 3/1997 |
| JP | H09-105393 A | 4/1997 |
| JP | 2000-199489 A | 7/2000 |
| JP | 2000-257581 A | 9/2000 |
| JP | 2003-184767 A | 7/2003 |
| JP | 2003-222090 A | 8/2003 |
| JP | 2004-308503 A | 11/2004 |
| JP | 2005-016337 A | 1/2005 |
| JP | 2005-307902 A | 11/2005 |

OTHER PUBLICATIONS

An Office Action; "Notice of Reason for Refusal," issued by the Japanese Patent Office dated Oct. 29, 2013, which corresponds to Japanese Patent Application No. 2010-083699 and is related to U.S. Appl. No. 13/638,472; with English language translation.

An Office Action; "Notice of Reason for Refusal," issued by the Japanese Patent Office dated Nov. 5, 2013, which corresponds to Japanese Patent Application No. 2010-083843 and is related to U.S. Appl. No. 13/638,472; with English language translation.

An Office Action; "Notice of Reasons for Refusal," issued by the Japanese Patent Office dated Nov. 19, 2013, which corresponds to Japanese Patent Application No. 2010-083878 and is related to U.S. Appl. No. 13/638,472; with English language translation.

An Office Action; "Notification of Reasons for Refusal," issued by the Japanese Patent Office dated Jun. 30, 2014, which corresponds to Japanese Patent Application No. 2010-267351 and is related to U.S. Appl. No. 13/638,472; with English language translation.

"Notification of the First Office Action," issued by the State Intellectual Property Office of P.R. China dated Oct. 21, 2014, which corresponds to Chinese Patent Application No. 201180026715.9 and is related to U.S. Appl. No. 13/638,472; with English language translation.

Communication pursuant to Rule 164(1) EPC (The partial European search report) issued by the European Patent Office dated Feb. 6, 2015, which corresponds to European Patent Application No. 11765932.6-1608 and is related to U.S. Appl. No. 13/638,472.

An Office Action issued by the Chinese Patent Office dated Jul. 3, 2018, which corresponds to Chinese Patent Application No. 201710075495.8; with an English language translation.

An Office Action issued by the Intellectual Property India dated, Nov. 14, 2018, which corresponds to Indian Patent Application No. 8525/DELNP/2012 and is related to U.S. Appl. No. 15/625,531; with English Translation.

| configuration | noise level(dB) |
|---|---|
| only expansion chamber | 71.7 |
| expansion chamber + exhausting path | 63.4 |
| expansion chamber + exhausting path + silence members | 59.7 |
| expansion chamber + exhausting path + silence members + exhausting port shape | 58.6 |

US 10,253,775 B2

ROTARY PUMP HAVING A CASING BEING FORMED WITH A COMMUNICATING HOLE COMMUNICATING A SPACE THAT IS BETWEEN THE SIDE PLATE AND THE WALL SURFACE OF THE DRIVING MACHINE

CROSS-REFERENCE TO RELATED APPLICATIONS

This application is a Divisional Application of U.S. patent application Ser. No. 14/992,549 filed Jan. 11, 2016, which is a Divisional Application of U.S. patent application Ser. No. 13/638,472 filed Oct. 25, 2012, which is the U.S. National Phase Application of International Patent Application No. PCT/JP2011/058656 filed Mar. 30, 2011, which claims priority to Japanese Patent Application No. 2011-028480 filed Feb. 14, 2011, Japanese Patent Application No. 2010-267556 filed Nov. 30, 2010, Japanese Patent Application No. 2010-267351 filed Nov. 30, 2010, Japanese Patent Application No. 2010-083878 filed Mar. 31, 2010, Japanese Patent Application No. 2010-083843 filed Mar. 31, 2010 and Japanese Patent Application No. 2010-083699 filed Mar. 31, 2010, the entire contents of which are incorporated herein by reference.

FIELD OF INVENTION

The present invention relates to a vacuum pump (compressing device) which includes rotary compressing elements in a casing. Particularly, the present invention relates to a vacuum pump which has a rotor that is attached to the rotary shaft of a vane-type driving machine.

BACKGROUND ART

Generally, a vacuum pump (compressing device) which includes rotary compressing elements in a casing is known. In this kind of vacuum pumps, a vacuum can be obtained by driving the rotary compressing elements with a driving device such as an electric motor.

A vane-type vacuum pump is known as the compressing device. In this kind of vacuum pumps, a vacuum can be obtained by driving rotary compressing elements with a driving device such as an electric motor.

Generally, it is known that the vacuum pump includes a casing attached to the wall surface of the driving machine, a rotor which is rotationally driven by the rotary shaft of the driving machine in the casing, and a plurality of vanes which are extendably accommodated in the rotor. In this kind of vacuum pumps, a vacuum can be obtained by driving the rotor and the vanes in the casing with a driving machine such as an electric motor.

The vacuum pump is carried, for example, in an engine room of an automobile and is used to produce a vacuum to operate a brake boosting device (for example, refer to a PTL 1).

Further, it is known that a vacuum pump includes a casing attached to a driving machine, a hollow cylinder chamber which is formed in the casing and has openings at the two ends of the casing, a rotor which is provided at the rotary shaft of the driving machine and which is rotationally driven in the cylinder chamber with the rotary shaft, and a pair of side plates which block the openings of the cylinder chamber. This kind of vacuum pump is used to produce a vacuum to operate, for example, a brake boosting device of an automobile, and the vacuum can be obtained by driving the rotor in the cylinder chamber of the casing with the driving machine such as an electric motor (for example, refer to a PTL 2).

CITATION LIST

Patent Literatures

PTL 1: JP-A-2003-222090
PTL 2: U.S. Pat. No. 6,491,501

SUMMARY OF INVENTION

Technical Problem

With the vacuum pump of the PTL 1, by compressing the air which is taken in the casing and exhausting the air from an exhausting port by driving the rotary compressing elements, a big noise or vibration are produced when the air is exhausted from the exhausting port. In the conventional configuration, in order to reduce the noise or vibration, a silencer is provided at the exhausting port, and attached to the vehicle through a stubborn bracket which is provided with a vibration proof rubber. Thus, there is the first problem that the number of components is increased, and the vacuum pump is upsized.

The invention is made in view of the above circumstances, and the first object of the invention is to provide a vacuum pump whose noise and vibration can be reduced without being upsized.

With the vacuum pump of the PTL 1, because the casing temperature increases by compressing the air in the casing by driving the rotary compressing elements, it is desirable to cool the casing (heat radiation). In this case, to secure a big heat radiation area, it is considered to form the casing by attaching an attaching base to the electric pump and to laminate the cylinder body on the attaching base, but in this configuration, there is the second problem that the casing extends in the axial direction of the electric motor, and the vacuum pump is upsized.

The invention is made in view of the above circumstances, and the second object of the invention is to provide a vacuum pump so that while heat dissipation property is secured, the casing is downsized.

With the vacuum pump of the PTL 1, by compressing the air which is taken in the casing and exhausting the air by driving the rotary compressing elements, a big noise or vibration are produced when the air is exhausted from the exhausting port. Therefore, in order to reduce the noise or vibration, a silencer is provided at the exhausting port, and attached to the vehicle through a stubborn bracket which is provided with a vibration proof rubber. Thus, there is the third problem that the number of components is increased and the vacuum pump is upsized.

The invention is made in view of the above circumstances, and the third object of the invention is to provide a compressing device whose noise and vibration can be reduced without being upsized.

The vane-type compressing device of the PTL 1 has such a structure that the vanes fly out due to a centrifugal force with the rotation of the rotor, and an underpressure is produced in vane slits which accommodate the vanes when the vanes fly out, and this underpressure acts as a force to disturb the flying out of the vanes. In particular, in a layout that the vane slits are offset to positions apart from the rotation center of the rotor, or when the vanes are made of lightweight carbon, because the centrifugal force acting on the vanes becomes small, it is very likely for the vanes to be influenced by the above underpressure. When a well-known mechanism for helping the flying out of the vanes is used to avoid the influence of this underpressure, there is the fourth problem that the number of components is increased and the compressing device becomes expensive.

The invention is made in view of the above circumstances, and the fourth object of the invention is to provide a compressing device so that the number of components is not increased and the flying out of the vanes can be easy.

With the vacuum pump of the PTL 1, by attaching the casing, which includes a hollow cylinder chamber that has openings at the ends, and side plates that block the openings of the cylinder chamber, to a wall surface of the driving machine, it is considered to realize the downsizing.

With this configuration, when the casing is attached to the wall surface of the driving machine, a minute space is formed between the wall surface and the side plate. Since the space communicates with a space, where an underpressure is produced during the operation of the vacuum pump, through a gap between the rotor and the rotary shaft and a gap between the rotor and the side plate, the air in the above space is drawn into the space by this underpressure, and the pressure of the above space may become lower than the atmospheric pressure (i.e., underpressure).

When the pressure of the space between the wall surface of the driving machine and the side plate becomes an underpressure, a flow of air in the driving machine that flows into the above space through a bore near the bearing of the rotary shaft may be produced.

In the driving machine, abrasion powder due to sliding may exist, and it is considered that there is a problem that the durability of the driving machine decreases if the abrasion powder is attached to the bearing. In this case, the bearing can be changed to a sealed bearing, but in the configuration using the sealed bearing, there is the fifth problem that it is said that the mechanical loss increases.

The invention is made in view of the above circumstances, and the fifth object of the invention is to provide a vacuum pump so that the decrease of the durability of the driving machine can be prevented without increasing the mechanical loss.

In the small vacuum pump which operates a brake boosting device of an automobile, since a small and lightweight rotor is used, the rotor is provided movably in the axial direction of the rotary shaft without being fixed at all to the rotary shaft. Furthermore, because the rotor is provided at the front end part of the rotary shaft, when the rotor is rotated by driving the driving machine, it is possible that the rotor moves to the front end side of the rotary shaft with the rotation, and is protruded. Therefore, in the operation of the vacuum pump, since the rotor contacts with the front side plate (front end side of the rotary shaft), the rotor and the side plate are damaged due to the abrasion, and there is the sixth problem that the durability of the vacuum pump is decreased.

The invention is made in view of the above circumstances, and the sixth object of the invention is to prevent the damage of the rotor and the side plate and prevent the decrease of the durability of the vacuum pump with a simple configuration.

Solution to Problem

In order to achieve the first object, according to the present invention, there is provided a vacuum pump comprising rotary compressing elements in a casing, wherein the casing comprises a cylinder chamber in which the rotary compressing elements slide, an expansion chamber which makes a compressed air exhausted from the cylinder chamber to be expanded, and an exhausting path which connects the cylinder chamber and the expansion chamber, and at least one turning part is provided in the exhausting path.

According to this configuration, because at least one turning part is provided in the exhausting path that connects the cylinder chamber and the expansion chamber, the course length of the exhausting path can be formed to be longer. Therefore, when the compressed air exhausted from the cylinder chamber flows through the exhausting path having a long course length, since the air hits the wall surface of the exhausting path and is reflected diffusely, the sound energy of the compressed air can be attenuated. Furthermore, because the compressed air attenuated in the exhausting path flows into the expansion chamber and is further attenuated by being further expanded and scattered in the expansion chamber, the noise and the vibration in the air-exhausting can be reduced.

In the vacuum pump, the exhausting path and the expansion chamber are adjacently provided at a peripheral part of the cylinder chamber in the casing.

According to this configuration, the exhausting path, the expansion chamber and the cylinder chamber can be integrally formed in the casing, and the upsizing of the vacuum pump can be inhibited.

In the vacuum pump a silence member formed of porous material is arranged in the exhausting path.

According to this configuration, because the compressed air that flows through the exhausting path is rectified when the air passes the silence member, and the sound energy of the compressed air is absorbed by the silence member, the noise and the vibration in the air-exhausting can be further reduced.

In the vacuum pump, the casing comprises a cylindrical liner which forms the cylinder chamber, the cylindrical liner comprises an exhausting port which is connected to the exhausting path, a diameter of the exhausting port at an inside of the cylinder chamber is larger than a diameter of the exhausting port at an outside of the cylinder chamber, and the exhausting port is formed to a taper shape whose diameter is reduced from the inside to the outside.

According to this configuration, since the exhausting port formed in the cylindrical liner is a taper hole, the pulsation of the compressed air exhausted from the cylinder chamber can be inhibited, and the noise and the vibration in the air-exhausting with this pulsation can be reduced.

In the vacuum pump, a rotary shaft which drives the rotary compressing elements is comprised, and a front end part of the rotary shaft is supported with a bearing which is provided in the casing.

According to this configuration, because the shake of the rotary shaft is inhibited, the operating can be reduced.

In order to achieve the second object, according to the present invention, there is provided a vacuum pump comprising rotary compressing elements in a casing, wherein the casing comprises a casing body which is formed of material whose thermal conductivity is higher than that of the rotary compressing elements, and a cylinder part which is press fitted in the casing body and in which the rotary compressing elements slide.

According to this configuration, since the casing is formed by press fitting the cylinder part in the casing body, the casing can be downsized. Because the casing body is formed of material whose thermal conductivity is higher than that of the rotary compressing elements, since the heat that occurred when the rotary compressing elements are operated can be transmitted to the casing body immediately, the heat from the casing body can be dissipated sufficiently.

In the vacuum pump, the casing body and the cylinder part comprises a communicating hole which communicates with the cylinder part by penetrating through the casing body and the cylinder part, and while an inlet pipe is provided at the communicating hole, a front end of the inlet pipe is engaged with the communicating hole of the cylinder part.

According to this configuration, for example, when a material which has a higher thermal expansion coefficient than that of the cylinder part is used for the casing body, even if the press fitting amount of the cylinder part is decreased due to thermal expansion, because the front end of the inlet pipe is engaged with the communicating hole of the cylinder part, the cylinder part can be prevented from being rotated or falling out.

In the vacuum pump, the cylinder part is formed of a material which has a thermal expansion coefficient that is substantially equal to that of the rotary compressing elements.

According to this configuration, a change of the clearance between the rotary compressing elements and the cylinder part with the temperature change can be inhibited, and the contact of the outer peripheral surface of the rotary compressing elements and the internal peripheral surface of the cylinder part can be prevented.

In the vacuum pump, in the casing body, the cylinder part is arranged at a position that is offset from the rotation center of the rotary compressing elements, and the expansion chamber that communicates with the cylinder part is formed at the peripheral part of the cylinder part at the side of the rotation center.

According to this configuration, it is not necessary to provide the expansion chamber outside the casing body, the casing body can be downsized, and thus the vacuum pump can be downsized.

In order to achieve the third object, according to the present invention, there is provided a vacuum pump comprising rotary compressing elements in a casing, wherein the casing comprises a casing body in which a cylinder chamber in which the rotary compressing elements slide is formed, an exhausting path which connects the cylinder chamber and an exhausting port, and an expansion chamber which is formed in the exhausting path, and the expansion chamber is provided at a peripheral part of the cylinder chamber in the casing body.

According to this configuration, by providing the expansion chamber in the exhausting path, since the compressed air flowing through the exhausting path is expanded and scattered in the expansion chamber and reflected diffusely by hitting the wall of the expansion chamber, the sound energy of the air is attenuated, and thereby the noise and the vibration in the air-exhausting can be reduced. Furthermore, because the expansion chamber is provided at the peripheral part of the cylinder chamber in the casing body, the cylinder chamber and the expansion chamber can be formed integrally in the casing body and the upsizing of the compressing device can be inhibited.

In the vacuum pump, a Helmholtz resonance chamber which is branched from the exhausting path is connected to the expansion chamber.

The resonance chamber is connected to the expansion chamber through an orifice, and the cross section area and the length of the orifice and the volume of the resonance chamber are set so that a resonance counteracting the pressure pulsation of the compressed air that flows through the exhausting path occurs. Therefore, by connecting the resonance chamber to the expansion chamber, the sound energy of the air expanded in the expansion chamber is vibrated by an air spring in the orifice and the resonance chamber and attenuated. Therefore, the pressure pulsation of the air discharged from the rotary compressing elements can be reduced, and the noise and the vibration in the air-exhausting can be further reduced.

In the vacuum pump, the cylinder chamber is provided at a position that is offset from a rotation center of the rotary compressing elements in the casing body, and the expansion chamber and the resonance chamber are adjacently provided at the peripheral part of the cylinder chamber at a side of the rotation center.

According to this configuration, by arranging the cylinder chamber to be offset from the rotation center of the rotary compressing elements, a big space at the peripheral part of the cylinder chamber at the side of the rotation center can be ensured in the casing body. Therefore, by adjacently providing the expansion chamber and the resonance chamber in this space, it is not necessary to provide the expansion chamber and the resonance chamber outside the casing body, the casing body can be downsized and thus the compressing device can be downsized.

In the vacuum pump, an intake path which leads air to the cylinder chamber is comprised, and an intake side expansion chamber which expands the air flowing in the intake path is provided in the intake path.

According to this configuration, by providing the intake side expansion chamber in the exhausting path, since the compressed air taken in the vacuum pump is expanded and scattered in the intake side expansion chamber, the sound energy of the air is attenuated, and thereby the noise and the vibration in the air intake can be reduced.

In the vacuum pump, the intake side expansion chamber is formed adjacently to the expansion chamber at the peripheral part of the cylinder chamber in the casing body.

According to this configuration, by providing the expansion chamber and the intake side expansion chamber at the peripheral part of the cylinder chamber, the cylinder chamber, the expansion chamber and the intake side expansion chamber can be formed integrally in the casing body and the upsizing of the compressing device can be inhibited.

In the vacuum pump, a desiccating agent is accommodated in the intake side expansion chamber.

According to this configuration, since the water in the air flowing into the cylinder chamber through the intake path can be removed, dry air can be supplied to the cylinder chamber and dew condensation at the cylinder chamber and the rotary compressing elements can be prevented. Therefore, corrosion and freeze of the rotary compressing elements can be prevented and the life span of the compressing device can be extended.

In order to achieve the fourth object, according to the present invention, a vane-type compressing device, in which a rotor having an axial bore where a driving shaft is inserted is rotatably included in a casing, and the rotor is provided with a plurality of vane slits in which a plurality of vanes are extendably accommodated, is characterized in that the rotor is provided with a groove that links the vane slit to at least one of the axial bore and another vane slit.

According to this configuration, because the rotor is provided with the groove that links the vane slit to at least one of the axial bore and another vane slit, when an underpressure is almost produced in the vane slit with the flying out of the vane, the occurrence of the underpressure can be inhibited by making fluid from outside flow in, and without increasing the number of components, it becomes easy for the vane to fly out.

In this configuration, the groove may be provided on a side surface of the rotor. According to this configuration, the groove can be provided on the rotor with groove processing easily.

In this configuration, the groove may be a ring-like groove which links the deepest parts of all the vane slits. According to this configuration, the occurrence of an underpressure due to the flying out of the vanes can be inhibited regardless of the positions of the vanes and without affecting the rotation balance of the rotor.

In this configuration, on the side surface of the rotor, a labyrinth passage may be provided between the vane slits and the axial bore. According to this configuration, with the labyrinth passage between the vane slits and the axial bore, it becomes hard for the abrasion powder which occurs at the side of the vanes to flow to the center side of the rotor, it can be prevented that the abrasion powder flows to the center side of the rotor, and it can be prevented that the abrasion powder is attached to a bearing supporting the rotor.

In the configuration, it is preferred that the vane slits are offset to positions apart from the axial bore, and grooves that link the vane slits and the axial bore extend into a linear shape along the radial direction of the rotary shaft of the rotor and connect the deepest parts of the vane slits. According to this configuration, because the grooves which link the vane slits and the axial bore extend into a linear shape along the radial direction of the rotary shaft of the rotor and connect the deepest parts of the vane slits, in the configuration that the vane slits are offset to positions apart from the axial bore, the vane slits and the axial bore of the rotor can be linked at the shortest distance, and high pressure fluid at the center side of the rotor can be smoothly introduced into the vane slits. Therefore, the vanes can more easily fly out efficiently.

In order to achieve the fifth object, the present invention is characterized in that, a vacuum pump includes a casing attached to a wall surface of a driving machine, a rotor rotationally driven by a rotary shaft of the driving machine in the casing, and a plurality of vanes extendably accommodated in the rotor, in the vacuum pump, the casing includes a hollow cylinder chamber which is rotationally driven by the rotor and has openings at the ends, and side plates which block the openings of the cylinder chamber, and a communicating hole, which communicates a space which is formed between the side plate and the wall surface of the driving machine, and another space whose pressure is above the atmospheric pressure, is included.

According to this configuration, when the pressure of the space formed between the side plate and the wall surface of the driving machine is below the atmospheric pressure, since the air whose pressure is above the atmospheric pressure flows into the space through the communicating hole, the pressure of the space is immediately restored to the atmospheric pressure (or above the atmospheric pressure). Therefore, by inhibiting that the air in the driving machine flows into the above space, a durability drop of the driving machine due to the abrasion powder included in the air can be prevented.

In this configuration, the present invention is characterized in that, an expansion chamber formed in the exhausting path that links the cylinder chamber and the exhausting port is included in the casing at the peripheral part of the cylinder chamber, and the communicating hole is formed at the expansion chamber. The present invention is characterized in that the communicating hole is formed at a position that is higher than the rotary shaft in the expansion chamber. The present invention is characterized in that the driving machine includes a bearing which pivotally supports the rotary shaft, and the communicating hole is formed on the wall surface at a position that is higher than the bearing.

In order to achieve the sixth object, in a vacuum pump that includes a casing which is attached to a driving machine, a hollow cylinder chamber which is formed in the casing and has openings at the two ends of the casing, a rotor which is provided to be movable in the axial direction relative to a rotary shaft of the driving machine and which is rotationally driven in the cylinder chamber with the rotary shaft, and a pair of side plates which block the openings of the rotor, the present invention is characterized in that a push nut which regulates the movement of the rotor to the front end of the rotary shaft is provided to the rotary shaft.

According to this configuration, with the push nut provided to the rotary shaft, the movement of the rotor to the front end side of the rotary shaft is regulated. Therefore, by preventing the contact of the rotor and the front side plate with a simple configuration, the abrasion of the rotor and the side plate is inhibited and the durability of the vacuum pump can be improved. Furthermore, because the push nut is easily attached to the rotary shaft in comparison with other fastening means such as bolts, the movement of the rotor to the front end side of the rotary shaft can be prevented with an easy and short-time operation.

In this configuration, the present invention is characterized in that, the rotor is inserted into the rotary shaft until the rotor abuts against the side plate located at the side of the driving machine, and in this state, by pressing the push nut against the end surface of the rotor 527 until a predetermined reference value is exceeded, the push nut is locked to the rotary shaft. According to this configuration, the positioning of the rotor relative to the rotary shaft can be performed easily and the assembly of the pump can be performed in a short time even if there is not an expert.

The present invention is characterized in that the rotary shaft includes a locking part, to which a plurality of claw parts of the push nut are locked, and a diameter-reduced part whose diameter is smaller than that of the locking part, at the front end part, and the diameter of the diameter-reduced part is formed to be substantially equal to the inside diameter of an opening surrounded by the front ends of the plurality of claw parts of the push nut. According to this configuration, because the diameter of the diameter-reduced part is formed to be substantially equal to the inside diameter of the opening surrounded by the front ends of the plurality of claw parts of the push nut, by making the push nut to move along the diameter-reduced part, the push nut can be guided to the locking part without being inclined relative to the rotary shaft. Therefore, by pressing the push nut guided to the locking part against the rotor, the likelihood of failing to install the push nut due to the inclination of the push nut can be reduced, and while the operation procedure is simplified, the operation time can be shortened.

The present invention is characterized in that, a recess is formed at the front end surface of the rotor around the axial bore where the rotary shaft is inserted, and the push nut is locked to the rotary shaft in the recess. According to this configuration, without making the front end part of the rotary shaft to be protruded from the front end surface of the rotor, the push nut can be locked to the rotary shaft and the configuration of the vacuum pump can be simplified.

Advantageous Effects of Invention

According to the present invention, because at least one turning part is provided in the exhausting path that connects the cylinder chamber and the expansion chamber, the course length of the exhausting path can be formed to be longer. Therefore, when the compressed air exhausted from the cylinder chamber flows through the exhausting path having a long course length, since the air hits the wall surface of the exhausting path and is reflected diffusely, the sound energy of the compressed air can be attenuated. Furthermore, because the compressed air attenuated in the exhausting path flows into the expansion chamber and is further attenuated by being further expanded and scattered in the expansion chamber, the noise and the vibration in the air-exhausting can be reduced.

According to the present invention, since the casing is formed by press fitting the cylinder part in the casing body, the casing can be downsized. Because the casing body is formed of material whose thermal conductivity is higher than that of the rotary compressing elements, since the heat that occurred when the rotary compressing elements are operated can be transmitted to the casing body immediately, the heat from the casing body can be dissipated sufficiently.

According to the present invention, by providing the expansion chamber in the exhausting path, since the compressed air flowing through the exhausting path is expanded and scattered in the expansion chamber and reflected diffusely by hitting the wall of the expansion chamber, the sound energy of the air is attenuated, and thereby the noise and the vibration in the air-exhausting can be reduced. Furthermore, because the expansion chamber is provided at the peripheral part of the cylinder chamber in the casing body, the cylinder chamber and the expansion chamber can be formed integrally in the casing body and the upsizing of the compressing device can be inhibited.

According to the present invention, because the rotor is provided with the groove that links the vane slit to at least one of the axial bore and another vane slit, without increasing the number of components, it becomes easy for the vane to fly out.

According to the present invention, because the communicating hole that communicates the space which is formed between the side plate and the wall surface of the driving machine and another space whose pressure is above the atmospheric pressure is included, when the pressure of the space is below the atmospheric pressure, since the air whose pressure is above the atmospheric pressure flows into the space through the communicating hole, the pressure of the space is immediately restored to the atmospheric pressure (or above the atmospheric pressure). Therefore, by inhibiting that the air in the driving machine flows into the above space, a durability drop of the driving machine due to the abrasion powder included in the air can be prevented.

According to the present invention, with the push nut provided to the rotary shaft, the movement of the rotor to the front end side of the rotary shaft is regulated. Therefore, by preventing the contact of the rotor and the front side plate with a simple configuration, the abrasion of the rotor and the side plate is inhibited and the durability of the vacuum pump can be improved.

DESCRIPTION OF EMBODIMENTS

Below, preferred embodiments of the invention are described with reference to the figures.

Figure 1:
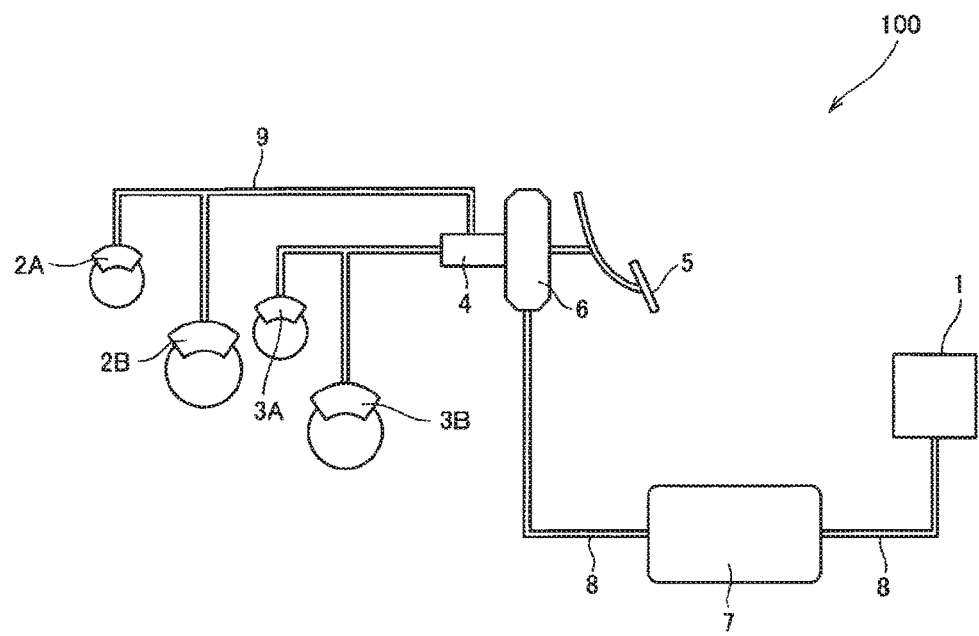
FIG. 1 is schematic diagram of a brake device in which a vacuum pump according to the embodiment of the invention to achieve the first object is used.

FIG. 1 is a schematic diagram of a brake device 100 in which a vacuum pump 1 according to the embodiment of the invention to achieve the first object is used as a vacuum source. For example, the brake device 100 includes front brakes 2A and 2B which are attached to the right and left front wheels of a vehicle such as an automobile, and rear brakes 3A and 3B which are attached to the right and left rear wheels. These brakes are connected with a master cylinder 4 via brake tubes 9, respectively, and each brake is operated with an oil pressure which is sent through the brake tube 9 from the master cylinder 4.

The brake device 100 further includes a brake booster 6 (brake boosting device) which is connected with a brake pedal 5, and a vacuum tank 7 and the vacuum pump 1 is serially connected to the brake booster 6 through an air tube 8. The brake booster 6 is adapted to boost the pedal force of the brake pedal 5 using an underpressure in the vacuum tank 7, and when a piston (not shown in the figure) of the master cylinder 4 is moved by a small pedal force, an enough braking power will be got.

The vacuum pump 1 is arranged in an engine room of the vehicle, and exhausts air in the vacuum tank 7 to the outside of the vehicle so that there becomes a vacuum in the vacuum tank 7. The use range of the vacuum pump 1 used for automobiles or the like is, for example, −60 kPa to −80 kPa.

Figure 2:
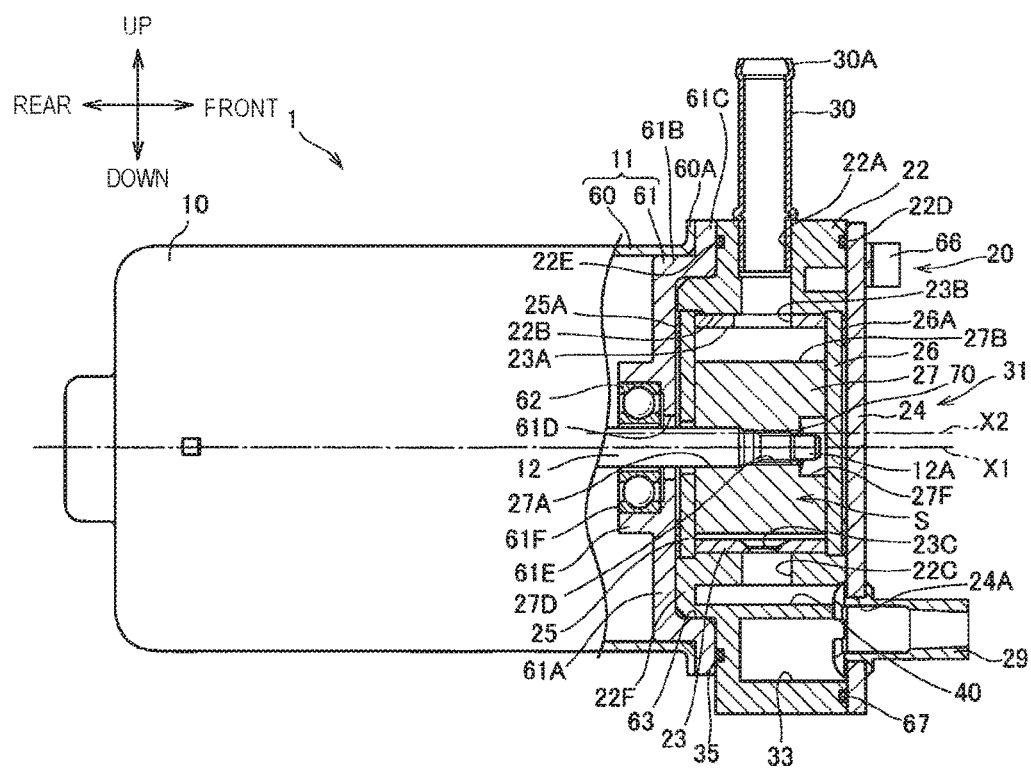
FIG. 2 is a side partial sectional view of the vacuum pump.
Figure 3:
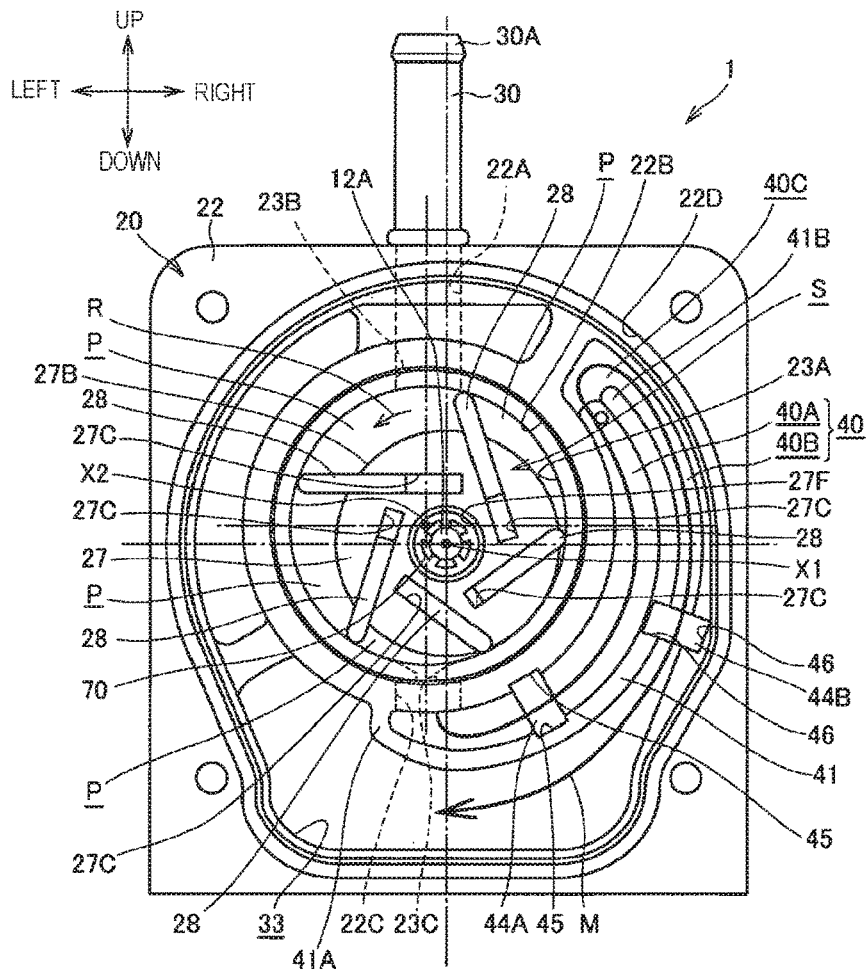
FIG. 3 is a figure of the vacuum pump when viewed from the front side.

FIG. 2 is a side partial sectional view of the vacuum pump 1, and FIG. 3 is a figure of the vacuum pump 1 of FIG. 2 when viewed from the front side of the vacuum pump 1 (the right side in the figure). However, FIG. 3 illustrates a state that those members such as a pump cover 24 and a side plate 26 are removed in order to show the configuration of a cylinder chamber S. In the following, for the convenience of description, the directions respectively indicated by the arrows in the upper parts of FIGS. 2 and 3 are the up, down, front, rear, right and left directions of the vacuum pump 1. The front-rear direction is an axial direction, and the right-left direction is a widthwise direction.

As shown in FIG. 2, the vacuum pump 1 includes an electric motor (driving machine) 10 and a pump body 20 which is operated by using the electric motor 10 as a driving source, and the electric motor 10 and the pump body 20 are fixed to and supported by a vehicle body of, for example, an automobile in an integrally connected state.

The electric motor 10 has an output shaft (rotary shaft) 12 which extends substantially from the center of one end (front end) of a case 11, which is formed into a substantially cylindrical shape, towards the side of the pump body 20 (front side). The output shaft 12 functions as a driving shaft for driving the pump body 20, and the output shaft 12 rotates around a rotation center X1 extending in the front-rear direction. A front end part 12A of the output shaft 12 is formed into a spline shaft and is engaged with a spline groove 27D, which is formed into a part of an axial bore 27A which is a through hole in the axial direction of the rotor 27 of the pump body 20, so that the output shaft 12 and the rotor 27 are connected to be integrally rotatable.

When a power supply (not shown in the figure) is switched ON, the output shaft 12 of the electric motor 10 rotates in an arrow R direction (counterclockwise direction) in FIG. 3, and thereby the rotor 27 is rotated in the same direction (arrow R direction) around the rotation center X1.

The case 11 includes a case body 60, which is formed to a bottomed cylindrical shape, and a cover body 61 which blocks the opening of the case body 60, and the case body 60 is formed by bending a peripheral part 60A of the case body 60 outwards. The cover body 61 is integrally formed by including a disk part (wall surface) 61A which is formed to have substantially the same diameter as that of the opening of the case body 60, a cylinder part 61B which is connected to the fringe of the disk part 61A and is fitted into the internal peripheral surface of the case body 60, and a flexed part 61C which is formed by bending outwards the fringe of the cylinder part 61B, the disk part 61A and the cylinder part 61B enter into the case body 60, and the flexed part 61C abuts against and is fixed to the peripheral part 60A of the case body 60. Thereby, in the electric motor 10, one end (front end) of the case 11 is caved inwards, and a fitting cavity 63, which the pump body 20 is attached to in a pillbox fitting manner, is formed.

Approximately in the center of the disk part 61A, a through hole 61D where the output shaft 12 penetrates and a circular bearing holding part 61E which extends inside of the case body 60 around the through hole 61D are formed, and the outer ring of a bearing 62 that pivotally supports the front side of the above output shaft 12 is held by the internal peripheral surface 61F of the bearing holding part 61E.

The pump body 20 includes, as shown in FIG. 2, a casing body 22 which is fitted into the fitting cavity 63 which is formed at the front side of the case 11 of the electric motor 10, a cylindrical liner 23 which is arranged in the casing body 22 and forms a cylinder chamber S, and a pump cover 24 which covers the casing body 22 from the front side. In this embodiment, a casing 31 of the vacuum pump 1 is formed by including the casing body 22, the cylindrical liner 23 and the pump cover 24.

The casing body 22 uses, for example, metal materials such as aluminum whose thermal conductivity is high, and as shown in FIG. 3, the shape of the casing body 22, when viewed from front, is formed to a substantially rectangular shape which is longer in the up-down direction with the above-mentioned rotation center X1 as an approximate center. A communicating hole 22A, which communicates with the cylinder chamber S which the casing body 22 is provided with, is formed in the upper part of the casing body 22, and an absorbing nipple 30 is press fitted to the communicating hole 22A. As shown in FIG. 2, the absorbing nipple 30 is a direct pipe which extends upwards, and a pipe or a tube which supplies underpressure air from an external equipment (for example, the vacuum tank 7 (refer to FIG. 1)) is connected to one end 30A of the absorbing nipple 30.

A bore 22B around a central axis X2 which extends in the front-rear direction is formed in the casing body 22, and a cylindrical liner 23 which is formed to a cylindrical shape is press fitted into the bore 22B. Instead of press fitting the cylindrical liner 23 into the bore 22B of the casing body 22, it is also possible to cast the casing body 22 in a state that the cylindrical liner 23 was cast in. The central axis X2 is parallel with the rotation center X1 of the output shaft 12 of the above-mentioned electric motor 10, and as shown in FIG. 3, is offset to the upper left side relative to the rotation center X1. In this configuration, the central axis X2 is offset so that the outer peripheral surface 27B of the rotor 27 around the rotation center X1 is adjacent to the internal peripheral surface 23A of the cylindrical liner 23 that is formed around the central axis X2.

The cylindrical liner 23 is formed of the same metal materials (in the present embodiment, iron) as that of the rotor 27, and for example, electroless nickel plating process is applied on the internal peripheral surface 23A of the cylindrical liner 23 so that the hardness of the internal peripheral surface 23A is raised.

In this embodiment, because the cylindrical liner 23 can be accommodated in the length range of the front-rear direction of the casing body 22 by press fitting (or casting in) the cylindrical liner 23 into the bore 22B which is formed in the casing body 22, the cylindrical liner 23 is prevented from being protruded from the casing body 22 and the casing body 22 can be downsized.

Furthermore, the casing body 22 is formed of material whose thermal conductivity is higher than that of the rotor 27.

Thereby, since the heat that is generated when the rotor 27 and vanes 28 are rotationally driven can be transmitted to the casing body 22 immediately, the heat from the casing body 22 can be dissipated sufficiently.

An opening 23B which is coupled with the communicating hole 22A of the above described casing body 22 and the cylinder chamber S is formed at the cylindrical liner 23, and the air passing through the absorbing nipple 30 is supplied to the cylinder chamber S through the communicating hole 22A and the opening 23B. At the lower part of the casing body 22 and the cylindrical liner 23, exhausting ports 22C and 23C, which penetrate the casing body 22 and the cylindrical liner 23 and where the air compressed in the cylinder chamber S is exhausted, are provided. The exhausting port 23C which the cylindrical liner 23 is provided with will be described later.

Side plates 25 and 26 which block the openings of the cylinder chamber S, respectively, are disposed at the rear end and the front end of the cylindrical liner 23.

The diameter of the side plates 25 and 26 is set to be larger than the inside diameter of the internal peripheral surface 23A of the cylindrical liner 23. The side plates 25 and 26 are pressed against the front end and the rear end of the cylindrical liner 23, respectively, by being biased by wave washers 25A and 26A. Thereby, the sealed cylinder chamber S is formed inside the cylindrical liner 23 except the opening 23B which is coupled to the absorbing nipple 30 and the exhausting ports 23C and 22C. It is also possible in configuration to provide sealing rings in substitution for the wave washers 25A and 26A.

In the cylinder chamber S, the rotor 27 is disposed. The rotor 27 has a cylindrical column shape which extends along the rotation center X1 of the electric motor 10, and has an axial bore 27A through which the output shaft 12 which is a driving shaft of the pump body 20 is inserted. Meanwhile, at positions away from the axial bore 27A in the radical direction, a plurality of guide grooves 27C are provided around the axial bore 27A by being spaced in the peripheral direction with an equal angular interval. A spline groove 27D, which is engaged with the spline shaft that is provided at the front end part 12A of the output shaft 12, is formed at a part of the axial bore 27A, and the rotor 27 and the output shaft 12 is adapted to be spline connected.

In this embodiment, at the front end of the rotor 27, a columnar recess 27F whose diameter is larger than that of the axial bore 27A is formed around the axial bore 27A, a push nut 70 is attached to the front end of the output shaft 12 which extends into the recess 27F, and the movement of the rotor 27 to the front end side of the output shaft 12 is regulated by the push nut 70.

The length in the front-rear direction of the rotor 27 is set to be substantially equal to the length of the cylinder chamber S of the cylindrical liner 23, namely, the distance between the mutually opposed inside surfaces of the above-mentioned two pieces of side plates 25 and 26, and the space between the rotor 27 and the side plates 25 and 26 are substantially blocked.

The outer diameter of the rotor 27 is set so that, as shown in FIG. 3, the outer peripheral surface 27B of the rotor 27 keeps a minute clearance from a part among the internal peripheral surface 23A of the cylindrical liner 23 that is located at the lower right side. Thereby, in the cylinder chamber S partitioned by the side plates 25 and 26, as shown in FIG. 3, a space of a crescent shape is formed between the outer peripheral surface 27B of the rotor 27 and the internal peripheral surface 23A of the cylindrical liner 23.

The rotor 27 is provided with a plurality of (in this example, five pieces) vanes 28 which partition the crescent space. The vane 28 is formed into a board shape, and the length in the front-rear direction is set to be substantially equal to the distance between the mutually opposed inside surfaces of the two pieces of side plates 25 and 26, like the rotor 27. These vanes 28 are disposed to be extendable from the guide grooves 27C which the rotor 27 is provided with. The vanes 28 are protruded outwards along the guide grooves 27C by a centrifugal force with the rotation of the rotor 27 so that the front ends of the vanes 28 abut with the internal peripheral surface 23A of the cylindrical liner 23. Thereby, the above-mentioned crescent space is partitioned into 5 compression chambers P surrounded by two pieces of mutually adjacent vanes 28 and 28, the outer peripheral surface 27B of the rotor 27 and the internal peripheral surface 23A of the cylindrical liner 23. These compression chambers P rotates in the same direction with the rotation of the arrow R direction of the rotor 27 with the rotation of the output shaft 12, and the capacity of each of these compression chambers P becomes bigger at positions near the opening 23B, and becomes smaller at positions near the exhausting port 23C. That is, with the rotation of the rotor 27 and the vanes 28, the air taken in one compression chamber P from the opening 23B rotates and is compressed with the rotation of the rotor 27, and is discharged from the exhausting port 23C. In this configuration, the rotary compressing elements are formed by including the rotor 27 and the plurality of vanes 28.

The pump cover 24 is arranged to the front side plate 26 via the wave washer 26A, and is fixed to the casing body 22 with a bolt 66. On the front of the casing body 22, as shown in FIG. 3, a sealing groove 22D is formed by surrounding the cylindrical liner 23, an expansion chamber 33 and an exhausting path 40 to be described below, and an annular sealing member 67 (FIG. 2) is arranged to the sealing groove 22D. An exhausting port 24A is provided in the pump cover 24 at a position corresponding to the expansion chamber 33. The exhausting port 24A is intended to exhaust the air which flows into the expansion chamber 33 to the outside of the device (the outside of the vacuum pump 1), and a check valve 29 for preventing the countercurrent of air from the outside of the device into the pump is attached to the exhausting port 24A.

As mentioned above, the vacuum pump 1 is formed by coupling the electric motor 10 and the pump body 20, and the rotor 27 connected to the output shaft 12 of the electric motor 10 and the vanes 28 slide in the cylindrical liner 23 of the pump body 20. Therefore, it is important to assemble the pump body 20 in accordance with the rotation center X1 of the output shaft 12 of the electric motor 10.

Therefore, in this embodiment, the fitting cavity 63, which is centered on the rotation center X1 of the output shaft 12, is formed at one end of the case 11 of the electric motor 10. On the other hand, on the back of the casing body 22, as shown in FIG. 2, a cylindrical fitting part 22F is integrally formed to be protruded backwards around the cylinder chamber S. The fitting part 22F is formed concentrically with the rotation center X1 of the output shaft 12 of the electric motor 10, and is formed so that the outer edge of the fitting part 22F is engaged with the fitting cavity 63 of the electric motor 10 in a pillbox manner. Thereby, with this configuration, only by fitting the fitting part 22F of the casing body 22 into the fitting cavity 63 of the electric motor 10, the central locations can be easily put together and the assembly of the electric motor 10 and the pump body 20 can be easily performed. Further, on the back of the casing body 22, a sealing groove 22E is formed around the fitting part 22F, and a circular sealing member 35 is arranged to the sealing groove 22E.

With the vane-type vacuum pump 1, because air is compressed when the rotor 27 and the vanes 28 are rotated in the cylinder chamber S, the compressed air is discharged intermittently from the exhausting ports 23C and 22C of the cylinder chamber S. Therefore, since pressure pulsation occurs at a constant basic frequency in the exhausting ports 23C and 22C of the cylinder chamber S, the noise and vibration due to this pressure pulsation may occur.

In order to prevent the noise and vibration, the exhausting path 40 which communicates with the exhausting ports 23C and 22C of the cylinder chamber S and the expansion chamber 33 which makes the compressed air which is introduced through the exhausting path 40 to be expanded are formed in the casing body 22.

In this embodiment, the cylindrical liner 23 is formed in the casing body 22, as shown in FIG. 3, by offsetting the central axis X2 of the cylindrical liner 23 to the upper left side relative to the rotation center X1. Therefore, in the casing body 22, a big space in the direction opposite to that the cylindrical liner 23 is offset can be secured, and the above described exhausting path 40 and the expansion chamber 33 are formed in this space along the peripheral part of the cylindrical liner 23. Thus, because the exhausting path 40 and the expansion chamber 33 can be integrally formed in the casing body 22, it is not necessary to provide the exhausting path 40 and the expansion chamber 33 outside the casing body 22, the casing body 22 can be downsized and the vacuum pump 1 can be downsized.

The expansion chamber 33 is a space where the compressed air which flows in through the exhausting path 40 is expanded and scattered. After the compressed air which flows into the expansion chamber 33 is expanded and scattered, the air hits the inner wall of the expansion chamber 33 and is reflected diffusely. Since the sound energy of the compressed air is attenuated, the noise and the vibration in the air-exhausting are reduced. In the embodiment, the expansion chamber 33 is formed as a big closed space along the peripheral part of the cylindrical liner 23 from a position below the cylindrical liner 23 to a position above the output shaft 12, and communicates with the exhausting port 24A which is formed in the pump cover 24. The exhausting port 24A is provided so that the flow of the discharged air is substantially perpendicularly changed relative to the flowing direction (arrow M direction) of the air in the exhausting path 40 and the expansion chamber 33, and the sound energy can be decreased by changing the direction of the flow of the air.

The exhausting path 40 is a space whose course cross section is formed to be smaller than that of the expansion chamber 33, and the compressed air that flows into the exhausting path 40 positively hits the inner wall of the exhausting path 40 so that the sound energy is decreased. In this embodiment, the casing body 22 includes a separating wall 41 which is provided outside the cylinder chamber S, and the exhausting path 40 is formed as a space partitioned by the separating wall 41.

In particular, the separating wall 41 is formed into an arc shape which is substantially concentric with the cylinder chamber S, and one end 41A of the separating wall 41 is connected to the bore 22B at a position beyond the exhausting port 22C. The other end 41B of the separating wall 41 extends to a position so that the space of the exhausting path 40 is not blocked.

Therefore, the exhausting path 40 includes an inside course 40A which is formed between the separating wall 41 and the cylinder chamber S and into which the compressed air from the exhausting port 22C flows, and an outside course 40B which is formed outside the separating wall 41 and which is connected to the above described expansion chamber 33, and a turning part 40C is formed at the side of the other end 41B of the separating wall 41 to couple the inside course 40A with the outside course 40B. Therefore, the compressed air exhausted from the cylinder chamber S through the exhausting ports 22C and 23C, as shown by the arrow M, flows through the inside course 40A, turns at the turning part 40C, flows through the outside course 40B, and flows into the expansion chamber 33.

With this configuration, since the exhausting path 40 includes the turning part 40C formed by the separating wall 41, the course length of the exhausting path 40 can be formed to be longer. When the compressed air flowing through the exhausting path 40 flows through the exhausting path 40 having a long course length, since the air hits the wall surface of the exhausting path 40 and is reflected diffusely, the sound energy of the compressed air can be attenuated. In this case, when the course cross section of the exhausting path 40 is an oblong shape that extends axially so that the surface area of the wall surface of the exhausting path 40 is increased as much as possible, the opportunity that the air hits the wall surface is increased, and the silence effect is increased.

Furthermore, because the compressed air attenuated in the exhausting path 40 then flows into the expansion chamber 33 and is further attenuated by being further expanded and scattered in the expansion chamber 33, the noise and the vibration in the air-exhausting can be reduced.

In this embodiment, the exhausting path 40 includes silence members 44A and 44B at the inlet part of the inside course 40A and the exhausting port part of the outside course 40B, respectively. These silence members 44A and 44B are, for example, porous members which are formed to a substantially rectangular shape by making metal particles such as copper or stainless steel to be sintered. These silence members 44A and 44B are fixed by being inserted into grooves 45 and 46 provided at the sidewalls of the inside course 40A and the outside course 40B, respectively.

According to this configuration, because the compressed air that flows through the exhausting path 40 is rectified when the air passes the micro spaces of the silence members 44A and 44B, and the sound energy of the compressed air is inleted by the silence members, the sound energy of the compressed air that flows into the expansion chamber 33 from the exhausting path 40 can be attenuated, and the noise and the vibration in the air-exhausting can be further reduced. In this case, by arranging one silence member 44A near the exhausting port 22C and the other silence member 44B near the expansion chamber 33, a bigger silence effect is achieved.

Figure 4:
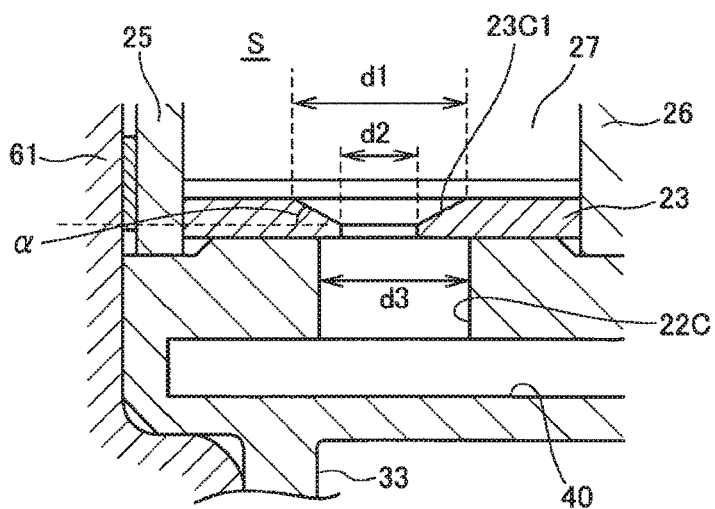
FIG. 4 is a partially enlarged view of FIG. 2 which shows an exhausting port that is formed in a cylindrical liner.

FIG. 4 is a partially enlarged view of FIG. 2 which shows the exhausting port 23C that is formed in the cylindrical liner 23. As mentioned above, it is found that the noise and the vibration that occur in the air-exhausting are caused by the pulsation of the compressed air from the exhausting ports 23C and 22C of the cylinder chamber S with the rotation of the rotor 27 and the vanes 28.

To reduce this pressure pulsation, after changing the shape of the exhausting port 23C in various ways and measuring noise levels, the applicant realized that, as shown in FIG. 4, when the inside pore size d1 of the exhausting port 23C at the cylinder chamber S is bigger than the outside pore size d2 and the exhausting port 23C becomes a taper hole which has a taper surface 23C1 whose diameter is reduced from the pore size d1 to d2, the noise is inhibited.

In particular, the inside pore size d1 of the exhausting port 23C at the cylinder chamber S is set to be substantially the same as the pore size d3 of the exhausting port 22C of the casing body 22 (in the present embodiment, 10.5 mm in diameter). It is desirable that the outside pore size d2 is set to be around 70% of the above described pore size d1, or 7 mm in diameter in the present embodiment. The angle α of the taper surface 23C1 is set to 120°.

With this configuration, since the inside pore size d1 of the exhausting port 23C formed in the cylindrical liner 23 at the cylinder chamber S is bigger than the outside pore size d2, and the exhausting port 23C is a taper hole which has a taper surface 23C1 whose diameter is reduced from inside to outside, without extremely raising the exhausting resistance from the exhausting port 23C, the exhausting volume from the cylinder chamber S can be squeezed. Therefore, the pulsation of the compressed air exhausted from the cylinder chamber can be inhibited, and the noise and vibration in the air-exhausting with this pulsation can be reduced.

Next, the reduction effect of noise level with the above described configuration is described.

Figures 5, 6:
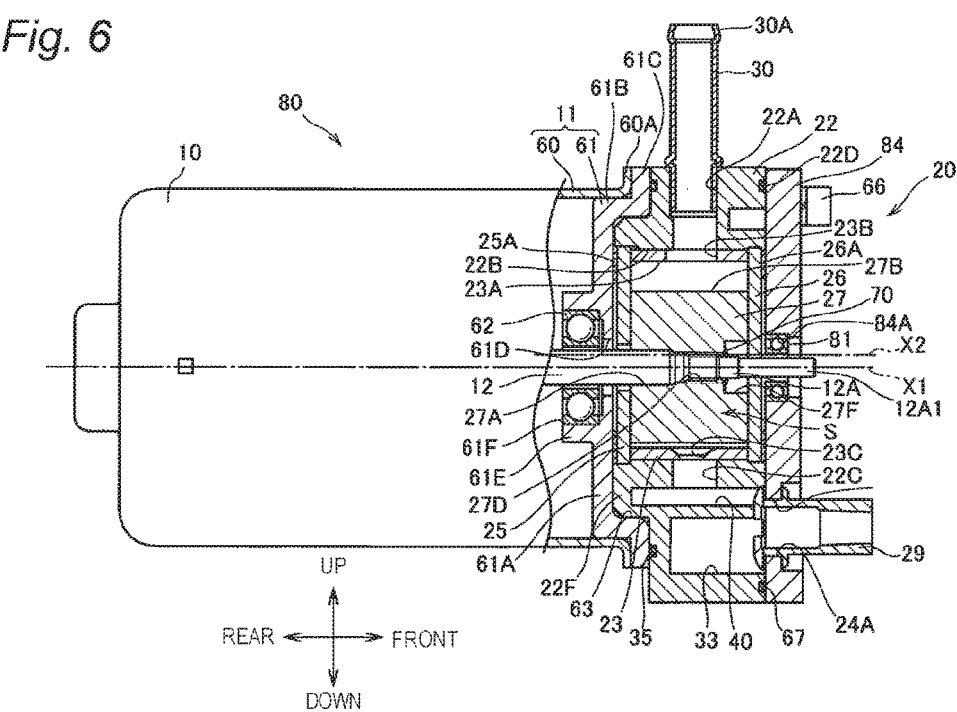
FIG. 5 is a list which records noise levels corresponding to different configurations.
FIG. 6 is a side partial sectional view of a vacuum pump according to another embodiment.

FIG. 5 records noise levels corresponding to different configurations. These noise levels are obtained by arranging a plurality of (for example, at ten positions) microphones for measurement around the vacuum pump 1, measuring noise levels with each of the microphones in this state when the vacuum pump 1 is operated, and averaging these measurements.

According to the FIG. 5, by providing the exhausting path 40, the noise level (63.4 dB) is lower by 8.3 dB (approximately 12%) than the noise level (71.7 dB) of the configuration that only the expansion chamber 33 is provided. By placing the silence members 44A and 44B in the exhausting path 40, the noise level (59.7 dB) is further lower by 3.7 dB (approximately 6%), and when the exhausting port 23C is added in the configuration as the taper hole, as a result, the noise level (58.6 dB) is further lower by 1.1 dB (approximately 1.9%).

Thus, by taking various measures, the vacuum pump 1 whose noise level is reduced can be realized, and when the vacuum pump 1 is carried on a vehicle, discomfort due to the noise of the vacuum pump 1 can be inhibited.

According to the present embodiment, the casing body 22 includes the cylinder chamber S where the rotor 27 and the vanes 28 slides, the expansion chamber 33 which makes the compressed air that is exhausted from the cylinder chamber S to be expanded, and the exhausting path 40 which connects the expansion chamber 33 and the cylinder chamber S, and at least one turning part 40C is provided in the exhausting path 40. Therefore, the course length of the exhausting path 40 can be formed to be longer, since the exhausting path 40 is turned at the turning part 40C. Therefore, when the compressed air exhausted from the cylinder chamber S flows through the exhausting path 40 having a long course length, since the air hits the wall surface of the exhausting path 40 and is reflected diffusely, the sound energy of the compressed air can be attenuated. Furthermore, because the compressed air attenuated in the exhausting path 40 flows into the expansion chamber 33 and is further attenuated by being further expanded and scattered in the expansion chamber 33, the noise and the vibration in the air-exhausting can be reduced.

According to the present embodiment, the exhausting path 40 and the expansion chamber 33 are adjacently provided at the peripheral part of the cylinder chamber S in the casing body 22. Therefore, the exhausting path 40, the expansion chamber 33 and the cylinder chamber S can be integrally formed in the casing body 22, and the upsizing of the vacuum pump 1 can be inhibited.

According to the present embodiment, because the silence members 44A and 44B formed of porous material are arranged in the exhausting path 40, while the compressed air flowing through the exhausting path 40 is rectified when the compressed air passes the silence members 44A and 44B, the sound energy of the compressed air is inleted by the silence members 44A and 44B. Therefore, the noise and the vibration in the air-exhausting can be further reduced.

According to the present embodiment, the casing body 22 and the cylindrical liner 23 forming the cylinder chamber S are included, the cylindrical liner 23 includes the exhausting port 23C connected to the exhausting path 40, the inside pore size d1 of the exhausting port 23C at the cylinder chamber S is bigger than the outside pore size d2, and the exhausting port 23C is formed to the taper hole which has the taper surface 23C1 whose diameter is reduced from inside to outside. Therefore, the pulsation of the compressed air exhausted from the cylinder chamber S can be inhibited, and the noise and vibration in the air-exhausting with this pulsation can be reduced.

Then, another embodiment is described.

FIG. 6 is a side partial sectional view of a vacuum pump according to another embodiment.

A vacuum pump 80 according to the embodiment differs in configuration from the above described embodiment in that a pilot bearing, which supports the front end part of the output shaft 12 which rotates the rotor 27, is included. The same components are given the same symbols and their description is omitted.

In this embodiment, the output shaft 12 integrally includes a bearing attaching part 12A1, to which a pilot bearing 81 is attached, at the front end part 12A, and the bearing attaching part 12A1 extends beyond the pump body 20 by penetrating through a through hole 26B of the front side plate 26 and a bearing holding hole 84A of a pump cover 84. On the inner surface of the pump cover 84, the bearing holding hole 84A is formed, and the pilot bearing 81 is held in the bearing holding hole 84A. With this configuration, because the bearing holding hole 84A, which has such a depth that the pilot bearing 81 can be held, is formed on the inner surface, the board of the pump cover 84 is thickly formed.

According to this configuration, because the front end part of the output shaft 12 is supported by the pilot bearing 81, by inhibiting the shake of the output shaft 12, the rotor 27 and the vanes 28 can be rotated stably in the cylinder chamber S. Therefore, the sound of the rotor 27 and the vanes 28 that are operating can be reduced.

The preferred embodiments for performing the present invention are described as above, but the present invention is not limited to the previously described embodiments, and various modifications and changes are possible based on the technical thought of the present invention. For example, in this embodiment, the exhausting path 40 is formed by including one turning part 40C, but it is also possible to provide two or more turning parts as long as they can be installed. Further, in this embodiment, it is described that two silence members 44A and 44B are arranged in the exhausting path 40, but three or more silence members may be included. Further, the sintered metal silence members which are made by sintering metal particles are exemplified as the silence members, but if a temperature condition is set, silence members formed of sintered resin can be arranged.

Figure 7:
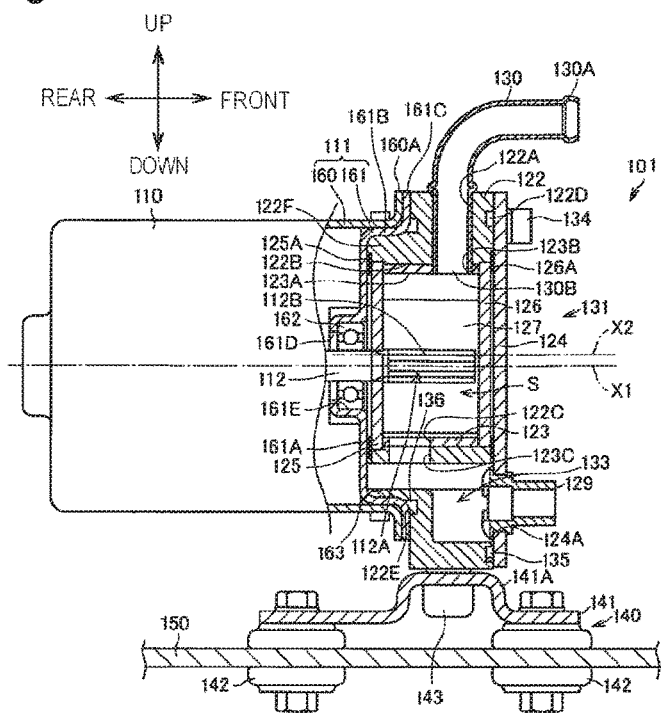
FIG. 7 is a side partial sectional view of a vacuum pump according to the embodiment to achieve the second object.
Figure 8:
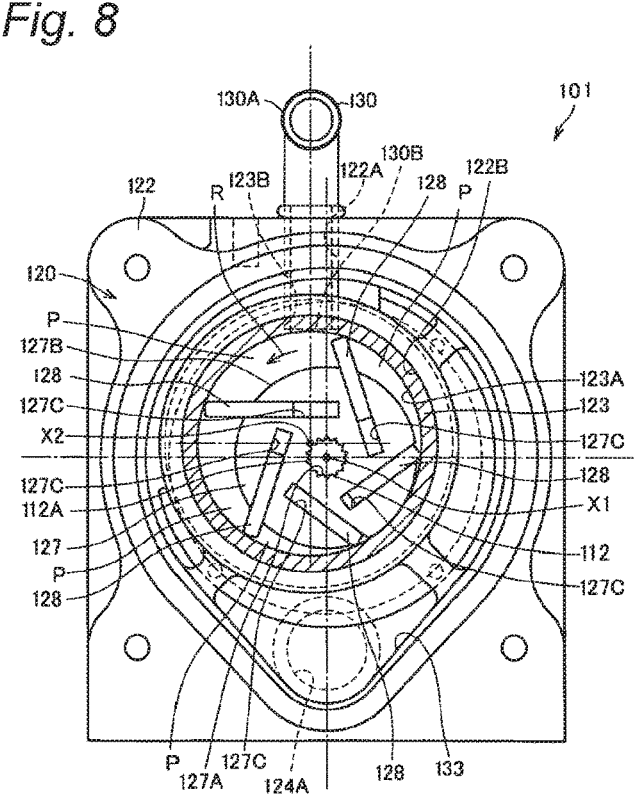
FIG. 8 is a figure of the vacuum pump viewed from the front side.

FIG. 7 is a side partial sectional view of a vacuum pump 1 according to the embodiment of the invention to achieve the second object. FIG. 8 is a figure of the vacuum pump 101 of FIG. 7 when viewed from the front side of the vacuum pump 101 (the right side in the figure above). However, FIG. 8 illustrates a state that those members such as a pump cover 124 and a side plate 126 are removed in order to show the configuration of a cylinder chamber S. In FIG. 8, a state that an attaching member 140 is removed is shown.

In the following, for the convenience of description, the directions respectively indicated by the arrows in the upper parts of FIGS. 7 and 8 are the up, down, front, rear, right and left directions of the vacuum pump 101. The front-rear direction is an axial direction, and the right-left direction is an widthwise direction.

The vacuum pump 101 shown in FIG. 7 is a rotary vane-type vacuum pump, and, for example, is used as a vacuum source of a brake boosting device (not shown in the figure) of an automobile or the like. In this case, the vacuum pump 101 is usually arranged in an engine room and is connected with pipes to the brake boosting device through a vacuum tank (not shown in the figure). The use range of the vacuum pump 101 used for automobiles or the like is, for example, −60 kPa to −80 kPa.

As shown in FIG. 7, the vacuum pump 101 includes an electric motor 110 and a pump body 120 which is arranged to the electric motor 110, and the electric motor 110 and the pump body 120 are fixed to and supported by a vehicle body 150 of, for example, an automobile in an integrally connected state by an attaching member 140.

The attaching member 140 includes an attaching plate 141 which is provided with a rectangular projecting slot 141A that extends in the widthwise direction of the pump body 120, and vibration proof rubbers 142 and 142 which are fixed to the front end and the rear end of the attaching plate 141, respectively. These vibration proof rubbers 142 and 142 are held by being fitted into bores formed on the vehicle body. The attaching plate 141 is fixed with a bolt 143 onto the bottom surface of the pump body 120 at the projecting slot 41A.

The electric motor 110 has an output shaft 112 which extends substantially from the center of one end (front end) of a case 111, which is formed into a substantially cylindrical shape, towards the side of the pump body 120 (front side). The output shaft 112 rotates around a rotation center X1 that extends in the front-rear direction. A spline part 112B, which is fitted into a rotor 127 of the pump body 120 to be described below and turns and stops the rotor 127, is formed at the front end part 112A of the output shaft 112. By providing a key on the outside surface of the output shaft 112, the skidding of the rotor 127 can be prevented.

When a power supply (not shown in the figure) is switched ON, the output shaft 112 of the electric motor 110 rotates in an arrow R direction (counterclockwise direction) in FIG. 8, and thereby the rotor 127 is rotated in the same direction (arrow R direction) around the rotation center X1.

The case 111 includes a case body 160, which is formed to a bottomed cylindrical shape, and a cover body 161 which blocks the opening of the case body 160, and the case body 160 is formed by bending a peripheral part 160A of the case body 60 outwards. The cover body 161 is integrally formed by including a disk part 161A which is formed to have substantially the same diameter as that of the opening of the case body 160, a cylinder part 161B which is connected to the fringe of the disk part 161A and is fitted into the internal peripheral surface of the case body 160, and a flexed part 161C which is formed by bending outwards the fringe of the cylinder part 161B, the disk part 161A and the cylinder part 161B enter into the case body 160, and the flexed part 161C abuts against and is fixed to the peripheral part 160A of the case body 160. Thereby, in the electric motor 110, one end (front end) of the case 111 is caved inwards, and a fitting cavity 63, which the pump body 120 is fitted to in a pillbox manner, is formed.

A through hole 161D where the output shaft 112 penetrates and a recess 161E which holds an outer ring of the bearing 162 that pivotally supports the output shaft 112 are formed substantially in the center of the disk part 161A.

The pump body 120 includes, as shown in FIG. 7, a casing body 122 which is fitted into the fitting cavity 163 which is formed at the front side of the case 111 of the electric motor 110, a cylinder part 123 which is press fitted in the casing body 122 and forms a cylinder chamber S, and a pump cover 124 which covers the casing body 122 from the front side. In this embodiment, a casing 131 of the vacuum pump 101 is formed by including the casing body 122, the cylinder part 123 and the pump cover 124.

The casing body 122 uses, for example, metal materials such as aluminum whose thermal conductivity is high, and as shown in FIG. 8, the shape of the casing body 122, when viewed from front, is formed to a substantially rectangular shape which is longer in the up-down direction with the above-mentioned rotation center X1 as an approximate center. A communicating hole 122A, which communicates with the cylinder chamber S which the casing body 122 is provided with, is formed in the upper part of the casing body 122, and an vacuum absorbing nipple (intake pipe) 130 is press fitted to the communicating hole 122A. As shown in FIG. 7, the vacuum absorbing nipple 130 is a pipe which is bent to a rough L shape, and a pipe or tube for supplying underpressure air from an external equipment (for example, a vacuum tank (not shown in the figure)) is connected to one end 130A of the vacuum absorbing nipple 130. In this embodiment, because the vacuum absorbing nipple 130 is press fitted into the communicating hole 122A of the casing body 122, when a position where the external equipment is arranged is determined beforehand as in a vehicle, the vacuum absorbing nipple 130 may be press fitted by turning the end 130A to the direction in which the external equipment is arranged so that with a simple configuration, the direction in which the pipe or tube for supplying underpressure air is drawn out can be set freely.

A bore 122B around a central axis X2 which extends in the front-rear direction is formed in the casing body 122, and a cylinder part 23 which is formed to a cylindrical shape is press fitted into the bore 122B. The central axis X2 is parallel with the rotation center X1 of the output shaft 112 of the above-mentioned electric motor 110, and as shown in FIG. 8, is offset to the upper left side relative to the rotation center X1. In this configuration, the central axis X2 is offset so that the outer peripheral surface 127B of the rotor 127 to be described later around the rotation center X1 is adjacent to the internal peripheral surface 123A of the cylinder part 123 that is formed around the central axis X2.

The cylinder part 123 is formed of metal material (in the present embodiment, iron) which is the same as that of the rotor 127. With this configuration, because the thermal expansion coefficients of the cylinder part 123 and the rotor 127 are the same, regardless of temperature change of the cylinder part 123 and the rotor 127, the contact of the outer peripheral surface 127B of the rotor 127 and the internal peripheral surface 123A of the cylinder body 23 when the rotor 127 is rotated can be prevented.

Furthermore, because the thermal expansion coefficients of the cylinder part 123 and the rotor 127 are the same, the clearance between the side surface of the rotor 127 and the side plates 125 and 126 (to be described later) which are arranged at the rear end and the front end of the cylinder part 123, respectively, can be stabilized.

Because the cylinder part 23 can be accommodated in the length range of the front-rear direction of the casing body 122 by press fitting the cylinder part 123 into the bore 122B which is formed in the casing body 122, the cylinder part 123 is prevented from being protruded from the casing body 122 and the casing body 122 can be downsized.

Furthermore, the casing body 122 is formed of material whose thermal conductivity is higher than that of the rotor 127.

Thereby, since the heat that is generated when the rotor 127 and vanes 128 are rotationally driven can be transmitted to the casing body 122 immediately, the heat from the casing body 122 can be dissipated sufficiently.

Substantially, because aluminum has a thermal expansion coefficient bigger than that of iron, the press fitting amount of the cylinder part 123 tends to be decreased when the temperature of the pump body 120 becomes high. Therefore, in this structure, the opening (communicating hole) 123B which is coupled to the communicating hole 122A of the casing body 122 is formed in the cylinder part 123, and the other end (front end) 130B of the vacuum absorbing nipple 130 is arranged to be engaged with the opening 123B. Thus, even if the press fitting amount of the cylinder part 123 is decreased due to thermal expansion, because the other end 130B of the vacuum absorbing nipple 130 is engaged with the opening 123B of the cylinder part 123, the cylinder part 123 can be prevented from being rotated or falling out.

At the lower part of the casing body 122 and the cylinder part 123, discharging ports 122C and 123C, which penetrate the casing body 122 and the cylinder part 123 and where the air compressed in the cylinder chamber S is exhausted, are provided.

Side plates 125 and 126 are disposed at the rear end and the front end of the cylinder part 123, respectively. The diameter of the side plates 125 and 126 is set to be larger than the inside diameter of the internal peripheral surface 123A of the cylinder part 23. The side plates 125 and 126 are pressed against the front end and the rear end of the cylinder part 123, respectively, by being biased by gaskets 125A and 126A. Thereby, the sealed cylinder chamber S is formed inside the cylinder part 123 except the opening 123B which is coupled to the vacuum absorbing nipple 130 and the discharging ports 123C and 122C.

In the cylinder chamber S inside the cylinder part 123, the rotor 127 is disposed. The rotor 127 is formed into a thick cylindrical shape, and the output shaft 112 on which the above-mentioned spline part 112B is formed is fitted to the internal peripheral surface 127A of the rotor 127. With this spline fitting configuration, the rotor 127 is rotated integrally with the output shaft 12. The length in the front-rear direction of the rotor 127 is set to be substantially equal to the length of the cylinder part 123, namely, the distance between the mutually opposed inside surfaces of the above-mentioned two pieces of side plates 125 and 126. The outer diameter of the rotor 127 is set so that, as shown in FIG. 8, the outer peripheral surface 27B of the rotor 127 keeps a minute clearance from a part among the internal peripheral surface 123A of the cylinder part 123 that is located at the lower right side. Thereby, as shown in FIG. 8, a space of a crescent shape is formed between the outer peripheral surface 127B of the rotor 127 and the internal peripheral surface 123A of the cylinder part 123.

The rotor 127 is provided with a plurality of (in this example, five pieces) vanes 128 which partition the crescent space. The vane 128 is formed into a board shape, and the length in the front-rear direction is set to be substantially equal to the distance between the mutually opposed inside surfaces of the two pieces of side plates 125 and 126, like the rotor 127. These vanes 128 are disposed to be extendable from guide grooves 127C which the rotor 127 is provided with. The vanes 128 are protruded outwards along the guide grooves 127C by a centrifugal force with the rotation of the rotor 127 so that the front ends of the vanes 28 abut with the internal peripheral surface 123A of the cylinder part 123. Thereby, the above-mentioned crescent space is partitioned into 5 compression chambers P surrounded by two pieces of mutually adjacent vanes 128 and 128, the outer peripheral surface 127B of the rotor 127 and the internal peripheral surface 123A of the cylinder part 123. These compression chambers P rotates in the same direction with the rotation of the arrow R direction of the rotor 127 with the rotation of the output shaft 112, and the capacity of each of these compression chambers P becomes bigger at positions near the opening 123B, and becomes smaller at positions near the discharging port 123C. That is, with the rotation of the rotor 127 and the vanes 128, the air taken in one compression chamber P from the opening 23B rotates and is compressed with the rotation of the rotor 127, and is discharged from the exhausting port 23C. In this configuration, the rotary compressing elements are formed by including the rotor 127 and the plurality of vanes 128.

In this configuration, the cylinder part 123 is formed in the casing body 122, as shown in FIG. 8, by offsetting the central axis X2 of the cylinder part 123 to the upper left side relative to the rotation center X1. Therefore, the expansion chamber 133 communicating with the discharging ports 123C and 122C is formed in the casing body 122 in a direction opposite to that the cylinder part 123 is offset. The expansion chamber 133 is formed into a crescent shape along the outer peripheral surface of the cylinder part 123, and the part near the exhausting port 123C and 122C swells further downward and communicates with an exhausting port 124A formed in the pump cover 124. In this configuration, because the cylinder part 123 is offset relative to the rotation center X1 and formed in the casing body 122, the expansion chamber 133 communicating with the discharging ports 123C and 122C can be formed in the casing body 122. Therefore, it is not necessary to provide the expansion chamber 133 outside the casing body 122, the casing body 122 can be downsized, and thus the vacuum pump 101 can be downsized. The noise is reduced since the air exhausted from the discharging ports 123C and 122 is led into the expansion chamber 133 and expanded.

The pump cover 124 is arranged to the front side plate 126 via the gasket 126A, and is fixed to the casing body 122 with a bolt 134. On the front of the casing body 122, as shown in FIG. 8, a sealing groove 122D is formed by surrounding the cylinder part 123 and the expansion chamber 133, and an annular sealing member 135 is arranged to the sealing groove 122D. The exhausting port 124A is provided in the pump cover 124 at a position corresponding to the expansion chamber 133. The exhausting port 124A is intended to exhaust the air which flows into the expansion chamber 133 to the outside of the device (the outside of the vacuum pump 101), and a check valve 129 for preventing the countercurrent of air from the outside of the device into the pump is attached to the exhausting port 124A.

Figure 9:
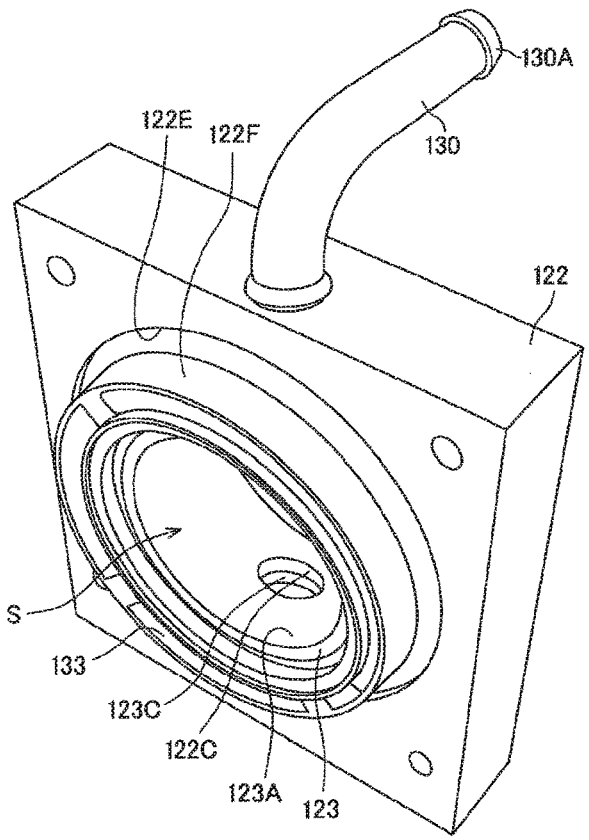
FIG. 9 is a perspective view which shows the back side of a case body.

FIG. 9 is a perspective view of the casing body 122 when viewed from back.

As mentioned above, the vacuum pump 101 is formed by coupling the electric motor 110 and the pump body 120, and the rotor 127 connected to the output shaft 12 of the electric motor 110 and the vanes 128 slide in the cylinder part 123 of the pump body 120. Therefore, it is important to assemble the pump body 120 in accordance with the rotation center X1 of the output shaft 112 of the electric motor 110.

Therefore, in this embodiment, as mentioned above, the fitting cavity 163, which is centered on the rotation center X1 of the output shaft 112, is formed at one end of the case 111 of the electric motor 110. On the other hand, on the back of the casing body 122, as shown in FIG. 9, a cylindrical fitting part 122F is integrally formed to be protruded backwards around the cylinder chamber S. The fitting part 122F is formed concentrically with the rotation center X1 of the output shaft 112 of the electric motor 110, and is formed so that the outer edge of the fitting part 122F is engaged with the fitting cavity 163 of the electric motor 110 in a pillbox manner.

Therefore, with this configuration, since only by fitting the fitting part 122F of the casing body 122 into the fitting cavity 163 of the electric motor 110, the central locations can be easily put together, the assembly of the electric motor 110 and the pump body 120 can be easily performed. Further, on the back of the casing body 122, a sealing groove 122E is formed around the fitting part 122F, and a circular sealing member 136 is arranged to the sealing groove 122E.

With this configuration, because the electric motor 110 and the pump body 120 can be fixed provisionally by engaging the electric motor 110 and the pump body 120 in a pillbox manner, the casing body 122 and the case 111 of the electric motor 110 can be collectively fixed with the bolt 134 for fixing the pump cover 124.

In particular, as shown in FIG. 110A, a female screw part 160A1 is provided at the peripheral part 160A of the case body 160, and by engaging the bolt 134 threadedly with the female screw part 160A1, the pump cover 124, the casing body 122 and the case 111 of the electric motor 110 are collectively fixed with one bolt 134. In this case, by forming the female screw part 160A1 to be thicker than the board of the peripheral part 160A, the pump cover 124, the casing body 122 and the case 111 of the electric motor 110 can be fixed strongly.

Figure 10A:
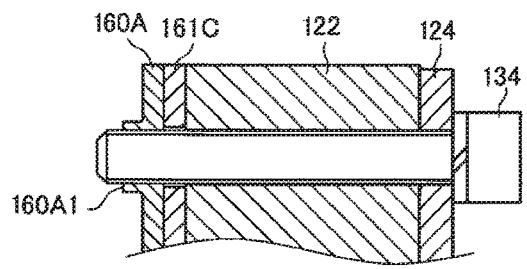
FIG. 10A is a figure which shows a coupling structure of an electric motor and a pump body.
Figure 10B:
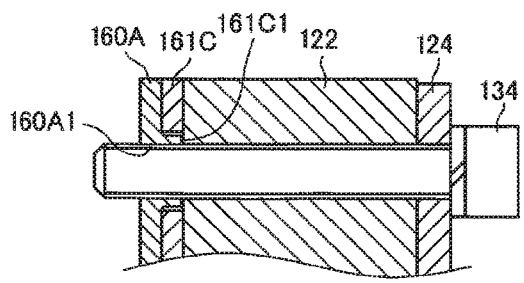
FIG. 10B is a variation of the coupling structure.

As shown in FIG. 10B, while the female screw part 160A1 is formed by being protruded at the side of the casing body 122, it is also possible to accommodate this female screw part 160A1 in a bore 160C1 which is formed in the flexed part 161C of the cover body 161. According to this configuration, the female screw part 160A1 will not be protruded beyond the surface of the vacuum pump 1 and exposed, and thus design-related improvement can be achieved.

As mentioned above, according to the present embodiment, in the vacuum pump 101 including the rotor 127 and the vanes 128 in the casing, the casing includes the casing body 122 formed of material whose thermal conductivity is higher than that of the rotor 27 or the vanes 128, and the cylinder part 123 on which the rotor 127 and the vanes 128 which are press fitted in the casing body 122 slide. Therefore, since the casing 131 is formed by press fitting the cylinder part 123 in the casing body 122, the casing 131 can be downsized. Because the casing body 122 is formed of material whose thermal conductivity is higher than that of the rotor 127 and the vanes 128, since the heat that occurred when the rotor 127 and the vanes 128 are rotationally driven can be transmitted to the casing body 122 immediately, the heat from the casing body 122 can be dissipated sufficiently.

According to the present embodiment, the casing body 122 and the cylinder part 123 include the communicating hole 122A and the opening 123B which communicate with the cylinder part 123 by penetrating through the casing body 122 and the cylinder part 123, respectively, and while the vacuum absorbing nipple 130 is press fitted into the communicating hole 122A, the other end 130B of the vacuum absorbing nipple 130 is engaged with the opening 123B of the cylinder part 123. Therefore, for example, when aluminum having a high thermal expansion coefficient is used for the casing body 122, and iron having a low thermal expansion coefficient is used for the cylinder part 123, even if the press fitting amount of the cylinder part 123 is decreased due to thermal expansion, because the other end 130B of the vacuum absorbing nipple 130 is engaged with the opening 123B of the cylinder part 123, the cylinder part 123 can be prevented from being rotated or falling out.

According to the present embodiment, the cylinder part 123 is formed of material having a thermal expansion coefficient that is substantially equal to that of the rotor 127. Therefore, the clearance between the side surfaces of the rotor 127 and the side plates 125 and 126 can be prevented from being changed with temperature change, and the internal peripheral surface 123A of the cylinder body 23 and the outer peripheral surface 127 of the rotor 127 can be prevented from being contacted with temperature change.

According to the present embodiment, in the casing body 122, the cylinder part 123 is arranged at a position that is offset from the rotation center X1 of the rotor 127, and the expansion chamber 133 communicating with the cylinder part 123 is formed at the peripheral part of the cylinder part 123 at the side of the rotation center X1. Therefore, it is not necessary to provide the expansion chamber 133 outside the casing body 122, the casing body 122 can be downsized, and thus the vacuum pump 101 can be downsized.

The preferred embodiments for performing the present invention are described as above, but the present invention is not limited to the previously described embodiments, and various modifications and changes are possible based on the technical thought of the present invention. For example, in this embodiment, the vane-type vacuum pump is used as the vacuum pump 1, but if rotary compressing elements are included, for example, a scroll type vacuum pump may be used.

Figure 11:
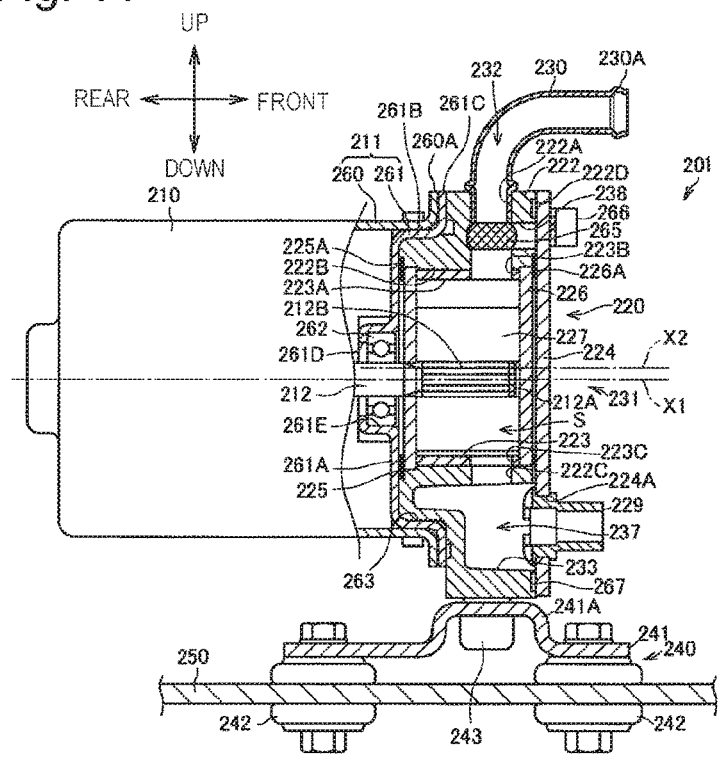
FIG. 11 is a side partial sectional view of a vacuum pump according to the embodiment to achieve the third object.
Figure 12:
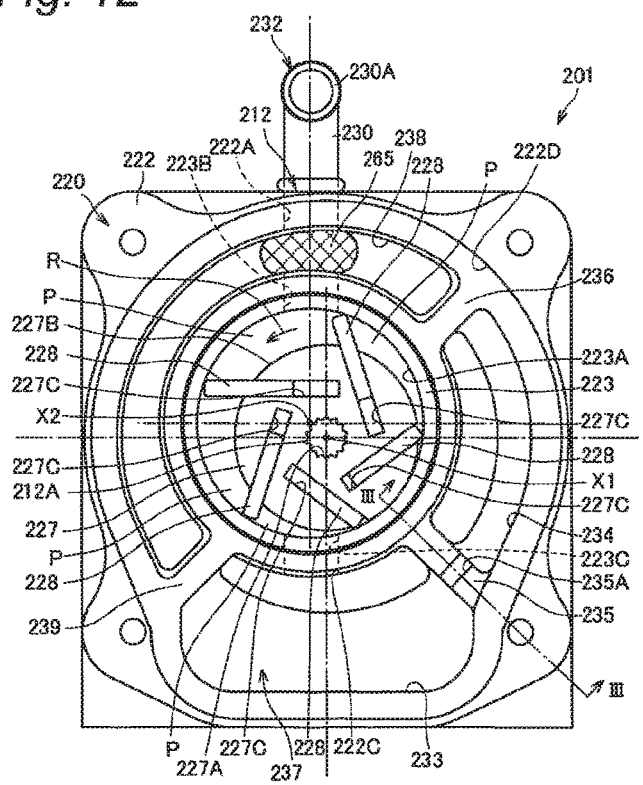
FIG. 12 is a figure of the vacuum pump when viewed from the front side.

FIG. 11 is a side partial sectional view of a vacuum pump (compressing device) 201 according to the embodiment of the invention to achieve the third object. FIG. 12 is a figure of the vacuum pump 201 of FIG. 11 when viewed from the front side of the vacuum pump 201 (the right side in the figure above). However, FIG. 12 illustrates a state that those members such as a pump cover 224 and a side plate 226 are removed in order to show the configuration of a cylinder chamber S. In FIG. 12, a state that an attaching member 240 is removed is shown. In the following, for the convenience of description, the directions respectively indicated by the arrows in the upper parts of FIGS. 11 and 12 are the up, down, front, rear, right and left directions of the vacuum pump 201. The front-rear direction is an axial direction, and the right-left direction is an widthwise direction.

The vacuum pump 201 shown in FIG. 11 is a rotary vane-type vacuum pump, and, for example, is used as a vacuum source of a brake boosting device (not shown in the figure) of an automobile or the like. In this case, the vacuum pump 201 is usually arranged in an engine room and is connected with pipes to the brake boosting device through a vacuum tank (not shown in the figure). The use range of the vacuum pump 201 used for automobiles or the like is, for example, −60 kPa to −80 kPa.

As shown in FIG. 11, the vacuum pump 201 includes an electric motor 210 and a pump body 220 which is arranged to the electric motor 210, and the electric motor 210 and the pump body 220 are fixed to and supported by a vehicle body 250 of, for example, an automobile in an integrally connected state by an attaching member 240.

The attaching member 240 includes an attaching plate 241 which is provided with a rectangular projecting slot 241A that extends in the widthwise direction of the pump body 220, and vibration proof rubbers 242 and 242 which are fixed to the front end and the rear end of the attaching plate 241, respectively. These vibration proof rubbers 242 and 242 are held by being fitted into bores formed on the vehicle body. The attaching plate 241 is fixed with a bolt 243 onto the bottom surface of the pump body 220 at the projecting slot 241A.

The electric motor 210 has an output shaft 212 which extends substantially from the center of one end (front end) of a case 211, which is formed into a substantially cylindrical shape, towards the side of the pump body 220 (front side). The output shaft 212 rotates around a rotation center X1 that extends in the front-rear direction. A spline part 212B, which is fitted into a rotor 227 of the pump body 220 to be described below and turns and stops the rotor 227, is formed at the front end part 212A of the output shaft 212. By providing a key on the outside surface of the output shaft 212, the skidding of the rotor 227 can be prevented.

When a power supply (not shown in the figure) is switched ON, the output shaft 212 of the electric motor 210 rotates in an arrow R direction (counterclockwise direction) in FIG. 12, and thereby the rotor 227 is rotated in the same direction (arrow R direction) around the rotation center X1.

The case 211 includes a case body 260, which is formed to a bottomed cylindrical shape, and a cover body 261 which blocks the opening of the case body 260, and the case body 260 is formed by bending a peripheral part 260A of the case body 260 outwards. The cover body 261 is integrally formed by including a disk part 261A which is formed to have substantially the same diameter as that of the opening of the case body 260, a cylinder part 261B which is connected to the fringe of the disk part 261A and is fitted into the internal peripheral surface of the case body 260, and a flexed part 261C which is formed by bending outwards the fringe of the cylinder part 261B, the disk part 261A and the cylinder part 261B enter into the case body 260, and the flexed part 261C abuts against and is fixed to the peripheral part 260A of the case body 260. Thereby, in the electric motor 210, one end (front end) of the case 211 is caved inwards, and a fitting cavity 263, which the pump body 220 is fitted to in a pillbox manner, is formed.

A through hole 261D where the output shaft 212 penetrates and a recess 61E which holds an outer ring of the bearing 62 that pivotally supports the output shaft 212 are formed substantially in the center of the disk part 261A.

The pump body 220 includes, as shown in FIG. 11, a casing body 222 which is fitted into the fitting cavity 263 which is formed at the front side of the case 211 of the electric motor 210, a cylinder part 223 which is press fitted in the casing body 222 and forms a cylinder chamber S, and a pump cover 224 which covers the casing body 222 from the front side. In this embodiment, a casing 231 of the vacuum pump 201 is formed by including the casing body 222, the cylinder part 223 and the pump cover 224.

The casing body 222 uses, for example, metal materials such as aluminum whose thermal conductivity is high, and as shown in FIG. 12, the shape of the casing body 222, when viewed from front, is formed to a substantially rectangular shape which is longer in the up-down direction with the above-mentioned rotation center X1 as an approximate center. A communicating hole 222A, which communicates with the cylinder chamber S which the casing body 222 is provided with, is formed in the upper part of the casing body 222, and a vacuum absorbing nipple 230 is press fitted to the communicating hole 222A. As shown in FIG. 11, the vacuum absorbing nipple 230 is a pipe which is bent to a rough L shape, and a pipe or tube for supplying underpressure air from an external equipment (for example, a vacuum tank (not shown in the figure)) is connected to one end 230A of the vacuum absorbing nipple 230. In this embodiment, because the vacuum absorbing nipple 230 is press fitted into the communicating hole 222A of the casing body 222, when a position where the external equipment is arranged is determined beforehand as in a vehicle, the vacuum absorbing nipple 230 may be press fitted by turning the end 230A to the direction in which the external equipment is arranged so that with a simple configuration, the direction in which the pipe or tube for supplying underpressure air is drawn out can be set freely.

A bore 222B around a central axis X2 which extends in the front-rear direction is formed in the casing body 222, and a cylinder part 223 which is formed to a cylindrical shape is press fitted into the bore 222B. The central axis X2 is parallel with the rotation center X1 of the output shaft 212 of the above-mentioned electric motor 210, and as shown in FIG. 12, is offset to the upper left side relative to the rotation center X1. In this configuration, the central axis X2 is offset so that the outer peripheral surface 227B of the rotor 227 to be described later around the rotation center X1 is adjacent to the internal peripheral surface 223A of the cylinder part 223 that is formed around the central axis X2.

The cylinder part 223 is formed of metal material (in the present embodiment, iron) which is the same as that of the rotor 227. With this configuration, because the thermal expansion coefficients of the cylinder part 223 and the rotor 227 are the same, regardless of temperature change of the cylinder part 223 and the rotor 227, the contact of the outer peripheral surface 227B of the rotor 227 and the internal peripheral surface 223A of the cylinder part 223 when the rotor 227 is rotated can be prevented.

Because the cylinder part 223 can be accommodated in the length range of the front-rear direction of the casing body 222 by press fitting the cylinder part 223 into the bore 222B which is formed in the casing body 222, the cylinder part 223 is prevented from being protruded from the casing body 222 and the casing body 222 can be downsized.

Furthermore, the casing body 222 is formed of material whose thermal conductivity is higher than that of the rotor 227. Thereby, since the heat that is generated when the rotor 227 and vanes 228 are rotationally driven can be transmitted to the casing body 222 immediately, the heat from the casing body 222 can be dissipated sufficiently.

An opening 223B which is coupled with the communicating hole 222A of the above described casing body 222 and the cylinder chamber S is formed at the cylinder part 223, and the air passing through the vacuum absorbing nipple 230 is supplied to the cylinder chamber S through the communicating hole 222A and the opening 223B. Therefore, in this embodiment, an intake path 232 is formed by including the vacuum absorbing nipple 230, the communicating hole 222A of the casing body 222 and the opening 223B of the cylinder part 223. At the lower part of the casing body 222 and the cylinder part 223, discharging ports 222C and 223C, which penetrate the casing body 222 and the cylinder part 223 and where the air compressed in the cylinder chamber S is exhausted, are provided.

Side plates 225 and 226 are disposed at the rear end and the front end of the cylinder part 223, respectively. The diameter of the side plates 225 and 226 is set to be larger than the inside diameter of the internal peripheral surface 223A of the cylinder part 223. The side plates 225 and 226 are pressed against the front end and the rear end of the cylinder part 223, respectively, by being biased by gaskets 225A and 226A. Thereby, the sealed cylinder chamber S is formed inside the cylinder part 223 except the opening 223B which is coupled to the vacuum absorbing nipple 230 and the discharging ports 223C and 222C.

In the cylinder chamber S inside the cylinder part 223, the rotor 227 is disposed. The rotor 227 is formed into a thick cylindrical shape, and the output shaft 212 on which the above-mentioned spline part 212B is formed is fitted to the internal peripheral surface 227A of the rotor 127. With this spline fitting configuration, the rotor 227 is rotated integrally with the output shaft 212. The length in the front-rear direction of the rotor 227 is set to be substantially equal to the length of the cylinder part 223, namely, the distance between the mutually opposed inside surfaces of the above-mentioned two pieces of side plates 225 and 226. The outer diameter of the rotor 227 is set so that, as shown in FIG. 12, the outer peripheral surface 227B of the rotor 227 keeps a minute clearance from a part among the internal peripheral surface 223A of the cylinder part 223 that is located at the lower right side. Thereby, as shown in FIG. 12, a space of a crescent shape is formed between the outer peripheral surface 227B of the rotor 227 and the internal peripheral surface 223A of the cylinder part 223.

The rotor 227 is provided with a plurality of (in this example, five pieces) vanes 228 which partition the crescent space. The vane 228 is formed into a board shape, and the length in the front-rear direction is set to be substantially equal to the distance between the mutually opposed inside surfaces of the two pieces of side plates 225 and 226, like the rotor 227. These vanes 228 are disposed to be extendable from guide grooves 227C which the rotor 227 is provided with. The vanes 228 are protruded outwards along the guide grooves 227C by a centrifugal force with the rotation of the rotor 227 so that the front ends of the vanes 28 abut with the internal peripheral surface 223A of the cylinder part 223. Thereby, the above-mentioned crescent space is partitioned into 5 compression chambers P surrounded by two pieces of mutually adjacent vanes 228 and 228, the outer peripheral surface 227B of the rotor 227 and the internal peripheral surface 223A of the cylinder part 223. These compression chambers P rotates in the same direction with the rotation of the arrow R direction of the rotor 227 with the rotation of the output shaft 212, and the capacity of each of these compression chambers P becomes bigger at positions near the opening 223B, and becomes smaller at positions near the discharging port 223C. That is, with the rotation of the rotor 227 and the vanes 228, the air taken in one compression chamber P from the opening 223B rotates and is compressed with the rotation of the rotor 227, and is discharged from the discharging port 223C. In this configuration, the rotary compressing elements are formed by including the rotor 227 and the plurality of vanes 228.

Figure 13:
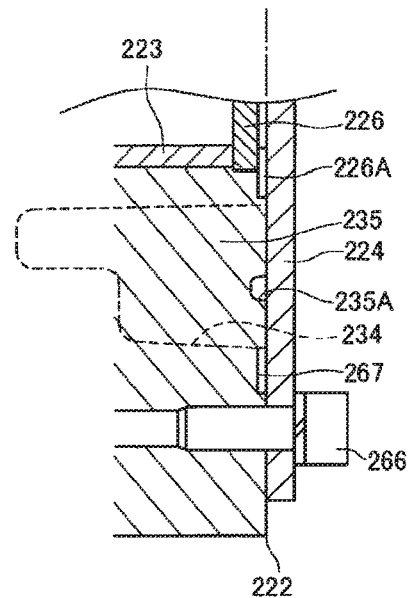
FIG. 13 is an III-III sectional view of FIG. 12.

In this configuration, the cylinder part 223 is formed in the casing body 222, as shown in FIG. 12, by offsetting the central axis X2 of the cylinder part 223 to the upper left side relative to the rotation center X1. Therefore, in the casing body 222, a big space in the direction opposite to that the cylinder part 223 is offset can be secured, and an expansion chamber 233 that communicates with the discharging ports 223C and 222C and a resonance chamber 234 which is aligned with the expansion chamber 233 at the peripheral part of the cylinder part 223 are formed in this space. The expansion chamber 233 and the resonance chamber 234 are separated by a rib 235 formed integrally with the casing body 222, and as shown in FIG. 13, an orifice 235A which connects the expansion chamber 233 and the resonance chamber (resonator) 234 is formed in the rib 235.

The expansion chamber 233 is formed as a big closed space below the cylinder part 223, and communicates with the exhausting port 224A which is formed in the pump cover 224. After the compressed air which flows into the expansion chamber 233 is expanded and scattered in the expansion chamber 233, the air hits the wall of the expansion chamber 233 and is reflected diffusely. Thereby, since the sound energy of the compressed air is attenuated, the noise and the vibration in the air-exhausting can be reduced. In the embodiment, an exhausting path 237 is formed by including the discharging ports 222C and 223C, which are formed in the casing body 222 and the cylinder part 223, respectively, the expansion chamber 233 and the exhausting port 224A.

With the vane-type vacuum pump 201, because air is compressed when the rotor 227 and the vanes 228 are rotated in the cylinder chamber S, the compressed air is discharged intermittently from the discharging ports 223C and 222C of the cylinder chamber S to the expansion chamber 233. Therefore, since pressure pulsation occurs at a constant basic frequency in the discharging ports 223C and 222C of the cylinder chamber S, the noise and vibration due to this pressure pulsation may occur.

Therefore, in this embodiment, the Helmholtz-type resonance chamber 234, which is branched from the exhausting path 237, is connected to the expansion chamber 233. The resonance chamber 234 is formed to produce resonance that counteracts the pressure pulsation of the compressed air flowing through the exhausting path 237, and inhibits the noise and vibration due to the pressure pulsation.

The resonance chamber 234 is designed to produce a resonance frequency corresponding to the above described basic frequency of the pressure pulsation of air, and in particular, this resonance frequency is determined by the length and the area of the orifice 235A for connecting with the expansion chamber 233 and the capacity of the resonance chamber 234.

According to this configuration, by connecting the resonance chamber 234 to the expansion chamber 233 through the orifice 235A, the sound energy of the air expanded in the expansion chamber 233 is vibrated by an air spring in the orifice 235A and the resonance chamber 234 and attenuated. Therefore, the pressure pulsation of the air discharged with the rotation of the rotor 227 and the vanes 228 can be reduced, and the noise and vibration in the air-exhausting can be further reduced.

Furthermore, in this embodiment, by arranging the cylinder part 223 to be offset from the rotation center X1 of the rotor 227, a big space at the peripheral part of the cylinder part 223 at the side of the above mentioned rotation center X1 can be ensured in the casing body 222. Therefore, because the expansion chamber 233 and the resonance chamber 234 can be integrally formed in the casing body 222 by adjacently providing the expansion chamber 233 and the resonance chamber 234 in this space, it is not necessary to provide the expansion chamber 233 and the resonance chamber 234 outside the casing body 222, the casing body 222 can be downsized and thus the vacuum pump 201 can be downsized.

Further, in the casing body 222, an intake side expansion chamber 238 is formed at the peripheral part of the cylinder part 223 at the side of offsetting the cylinder part 223. The intake side expansion chamber 238 is provided in the intake path 232 connecting the above described vacuum absorbing nipple 230 and the cylinder chamber S, and in the present embodiment, the intake side expansion chamber 238 is separated respectively from the expansion chamber 233 and the resonance chamber 234 by ribs 239 and 236 that are integrally provided in the casing body 222.

According to this configuration, since the air flowing through the intake path 232 is expanded and scattered in the intake side expansion chamber 238 and reflected diffusely by hitting the wall of the intake side expansion chamber 238, the sound energy is attenuated. Thus, the noise and the vibration in the air intake can be reduced as well as those in the air-exhausting.

In the intake side expansion chamber 238, for example, a desiccating agent 265 such as silica gel or zeolite is arranged. The desiccating agent 265 is formed by adhering silica gel or zeolite grains to such a size that the discharging ports 223C and 222C cannot be passed, and removes the water of the air flowing in the intake side expansion chamber 238. Therefore, because the air in which water is removed by the desiccating agent 265 flows into the cylinder chamber S, dew condensation in the cylinder chamber S is prevented and the corrosion of the rotor 227 and the cylinder part 223 and the freeze in the cylinder chamber S due to the dew condensation can be prevented.

Because the intake side expansion chamber 238 is formed at the peripheral part of the cylinder chamber S, the vacuum absorbing nipple 230 communicates with the cylinder chamber S through the intake side expansion chamber 238. Therefore, the vacuum absorbing nipple 230 can be provided in any places in the range where the intake side expansion chamber 238 extends, and the attaching position of the vacuum absorbing nipple 230 can be changed depending on the position where the vacuum pump 201 is arranged in the vehicle.

In this embodiment, because in the casing body 222, the expansion chamber 233, the resonance chamber 234 and the intake side expansion chamber 238 are formed at the peripheral part of the cylinder part 223, the expansion chambers 233, the resonance chamber 234 and the intake side expansion chamber 238 can be collectively well arranged in the casing body 222. Therefore, it is not necessary to provide the intake side expansion chamber 238 outside the casing body 222, the casing body 222 can be downsized, and thus the vacuum pump 201 can be downsized. In this embodiment, the expansion chamber 233, the resonance chamber 234 and the intake side expansion chamber 238 are arranged at the peripheral part of the cylinder part 223, and the expansion chambers 233, the resonance chamber 234 and the intake side expansion chamber 238 are separated from each other by the ribs 235, 236 and 239. Therefore, by changing the positions of these ribs 235, 236 and 239, the size of each of the expansion chamber 233, the resonance chamber 234 and the intake side expansion chamber 238 can be changed. For example, after the size of the resonance chamber 234 is determined, the sizes of the expansion chamber 233 and the intake side expansion chamber 238 can be appropriately set.

The pump cover 224 is arranged to the front side plate 226 via a gasket 226A, and is fixed to the casing body 222 with a bolt 266. On the front of the casing body 222, as shown in FIG. 12, a sealing groove 222D is formed by surrounding the cylinder part 223 and the expansion chamber 233, and an annular sealing member 267 is arranged to the sealing groove 222D. The exhausting port 224A is provided in the pump cover 224 at a position corresponding to the expansion chamber 233. The exhausting port 224A is intended to exhaust the air which flows into the expansion chamber 233 to the outside of the device (the outside of the vacuum pump 201), and a check valve 229 for preventing the countercurrent of air from the outside of the device into the pump is attached to the exhausting port 224A.

As described above, according to the present embodiment, the casing 231 includes the casing body 222 in which the cylinder chamber S, in which the rotor 227 and the vanes 228 slide, is formed, the exhausting path 237 that connects the cylinder chamber S and the exhausting port 224A, and the expansion chamber 233 formed in the exhausting path 237, and the expansion chamber 233 is provided at the peripheral part of the cylinder chamber S in the casing body 222. Therefore, since the compressed air flowing through the exhausting path 237 is expanded and scattered in the expansion chamber 233 and reflected diffusely by hitting the wall of the expansion chamber 233, the sound energy of the air is attenuated, and thereby the noise and the vibration when the air is exhausted from the exhausting port 224A to the outside of the device can be reduced. Furthermore, because the expansion chamber 233 is provided at the peripheral part of the cylinder chamber S in the casing body 222, the cylinder chamber S and the expansion chamber 233 can be formed integrally in the casing body 222 and the upsizing of the vacuum pump 201 can be inhibited.

According to the present embodiment, the Helmholtz-type resonance chamber 234 which is branched from the exhausting path 237 is connected to the expansion chamber 233 through the orifice 235A. Thus, the sound energy of the air expanded in the expansion chamber 233 is vibrated by the air spring in the orifice 235A and the resonance chamber 234 and is attenuated. Therefore, the pressure pulsation of the air discharged from the cylinder chamber S can be reduced, and the noise and the vibration in the air-exhausting can be further reduced.

According to the present embodiment, because the cylinder chamber S is provided at the position that is offset from the rotation center X1 of the rotor 227 and the vanes 228 in the casing body 222, a big space at the peripheral part of the cylinder chamber at the side of the rotation center can be secured in the casing body. Therefore, by adjacently providing the expansion chamber and the resonance chamber in this space, it is not necessary to provide the expansion chamber and the resonance chamber outside the casing body, the casing body can be downsized and thus the compressing device can be downsized.

According to the present embodiment, the intake path 232 which leads air to the cylinder chamber S is included and the intake side expansion chamber 238 that expands the air flowing in the intake path 232 is provided in the intake path 232. Therefore, because the air taken in the cylinder chamber S is expanded and scattered in the intake side expansion chamber 238 so that the sound energy is attenuated, the noise and the vibration in the air intake can be reduced as well as those in the air-exhausting.

According to the present embodiment, the intake side expansion chamber 238 is formed at the peripheral part of the cylinder chamber S in the casing body 222 along with the expansion chamber 233. Therefore, by providing the expansion chamber 233 and the intake side expansion chamber 238 at the peripheral part of the cylinder chamber S, the cylinder chamber S, the expansion chamber 233 and the intake side expansion chamber 238 can be formed integrally in the casing body 222 and the upsizing of the vacuum pump 201 can be inhibited.

According to the present embodiment, the desiccating agent 265 is accommodated in the intake side expansion chamber 238. Therefore, by removing the water in the air flowing into the cylinder chamber S through the intake path 232, dry air can be supplied to the cylinder chamber S and dew condensation at the cylinder chamber S, the rotor 227 and the vanes 228 can be prevented. Therefore, corrosion and freeze of the rotor 227 can be prevented and the life span of the vacuum pump 201 can be extended.

Then, another embodiment is described.

Figure 14:
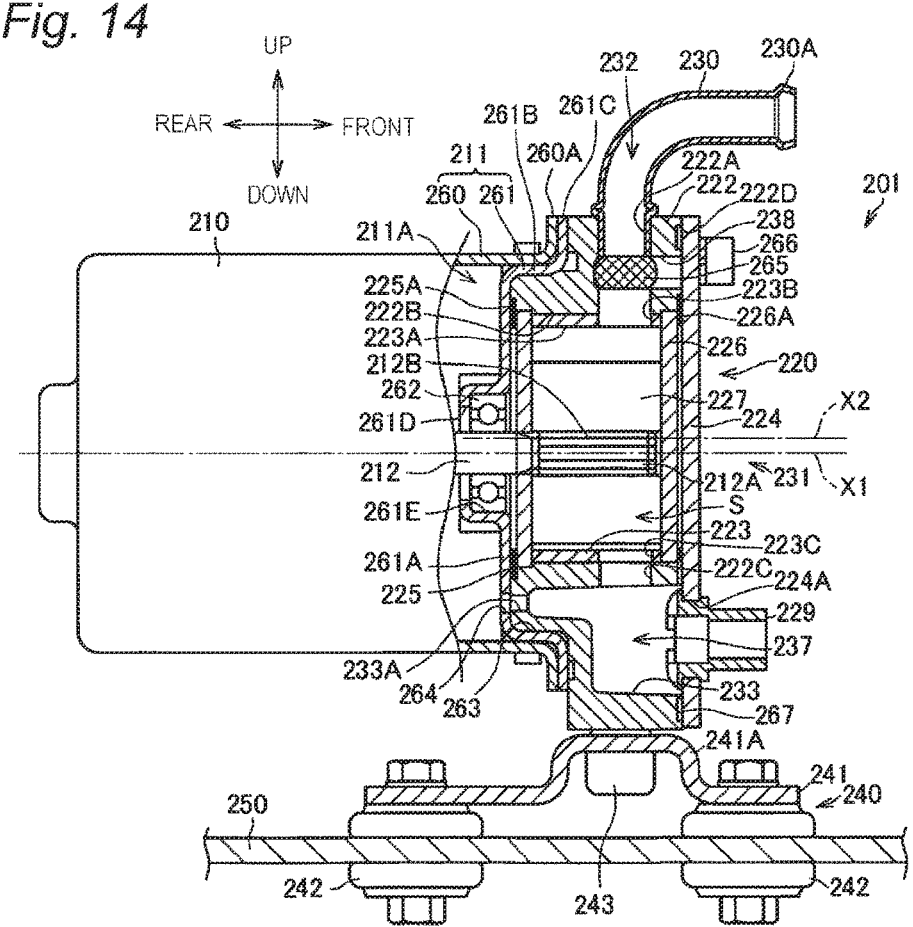
FIG. 14 is a side partial sectional view of a vacuum pump according to another embodiment.

FIG. 14 is a side partial sectional view of a vacuum pump 200 according to the embodiment.

This embodiment differs in configuration from the above mentioned embodiment in that a resonance chamber is formed in the case 211 of the electric motor 210. The same components as the above components are given the same symbols and their description is omitted.

As shown in FIG. 14, the vacuum pump 200 includes a first orifice 233A which is provided at the expansion chamber 233 which is formed in the casing body 222, and a second orifice 264 which is formed in the cover body 261 of the case 211 and is connected to the first orifice 233A, and through the first orifice 233A and the second orifice 264, the expansion chamber 233 and the inside of the case 211 are connected. In this embodiment, a space 211A in the case 211 functions as a Helmholtz-type resonance chamber.

This embodiment is useful, for example, when the outer diameter of the pump body 220 is small and a resonance chamber cannot be formed at the peripheral part of the cylinder part 223. Because the case 211 as a Helmholtz-type resonance chamber which is branched from the exhausting path 237 is connected to the expansion chamber 233 through the first orifice 233A and the second orifice 264, the sound energy of the air expanded in the expansion chamber 233 is vibrated by the air spring in the first orifice 233A, the second orifice 264 and the case 211 and is attenuated. Therefore, the pressure pulsation of the air discharged from the cylinder chamber S can be reduced, and the noise and the vibration in the air-exhausting can be further reduced.

Figure 15:
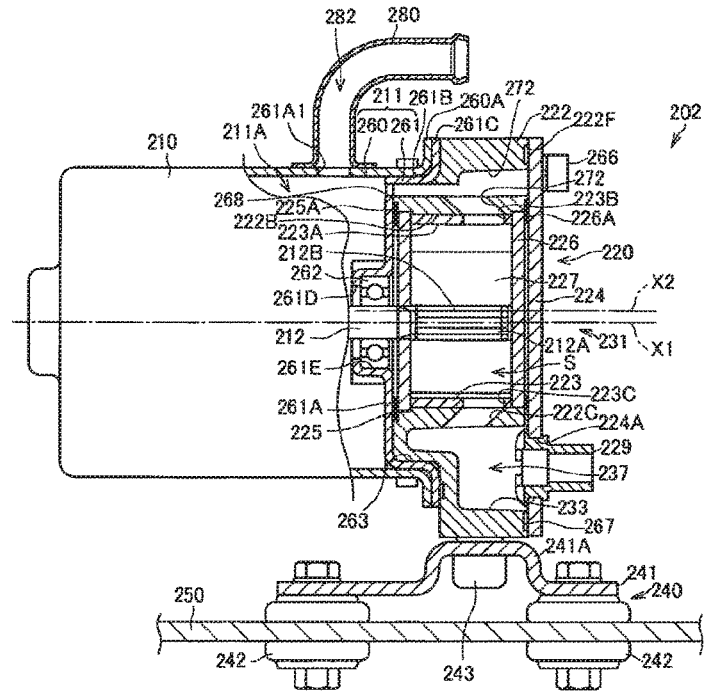
FIG. 15 is a side partial sectional view of a vacuum pump according to another embodiment.

FIG. 15 is a side partial sectional view of a vacuum pump 202 according to another embodiment.

This embodiment differs in configuration from the above mentioned embodiment in that an intake side expansion chamber is formed in the case 211 of the electric motor 210. The same components as the above components are given the same symbols and their description is omitted.

With this configuration, in the vacuum pump 202, an intake port 260A1 is formed in the case body 260 which forms the case 211 of the electric motor 210, and the above described vacuum absorbing nipple 280 is connected to the intake port 260A1. A first communicating hole 271 extending axially and a second communicating hole 272 which communicates with the first communicating hole 271 and the opening 223B of the cylinder part 223 are formed in the casing body 222, and a communicating hole 268 communicating with the first communicating hole 271 is formed in the cover body 261. Thereby, the space 211A in the case 211 communicates with the cylinder chamber S through the communicating hole 268, the first communicating hole 271, the second communicating hole 272 and the opening 223B, and an intake path 282 is formed by including the communicating hole 268, the first communicating hole 271, the second communicating hole 272 and the opening 223B.

Therefore, in this embodiment, because the space 211A in the case 211 is provided in the intake path 282, the air taken in the cylinder chamber S is attenuated by being expanded and scattered in the space 211A. Thus, the noise and the vibration in the air intake can be reduced as well as those in the air-exhausting. Furthermore, because the air flow that flows into the space in the case 211 through the vacuum absorbing nipple 280 cools the coil or the commutator (not shown in the figure) that is accommodated in the case 211, extra cooling devices are not necessary even if the case 211 is arranged in a bad environment such as an engine room, and the number of components can be reduced.

The preferred embodiments for performing the present invention are described as above, but the present invention is not limited to the previously described embodiments, and various modifications and changes are possible based on the technical thought of the present invention. For example, in this embodiment, the vane-type vacuum pump is used as the compressing device, but if rotary compressing elements are included, a scroll type vacuum pump may be used.

In the above described embodiment, it is described that the resonance chamber 234 (or the space 211A in the case 211) are combined together with the expansion chamber 233 at the exhausting side, but the resonance chamber may be combined together with the intake side expansion chamber 238 (or the space 211A in the case 211).

The resonance chamber of FIG. 14 may be combined with the above described vacuum pump 201 of FIG. 11. That is to say, besides that the expansion chamber 233 and the resonance chamber 234 are provided at the peripheral part of the cylinder part 223 of the casing body 222, by communicating the expansion chamber 233 and the case 211 of the electric motor 210 through the first orifice 233A and second orifice 264, a resonance chamber other than the resonance chamber 234 may be formed in the case 211. According to this configuration, by changing the cross section areas and lengths of the first orifice 233A and the second orifice 264 or the volume inside the case 211 appropriately, the pressure pulsation of a different basic frequency can be corresponded to.

Figure 16:
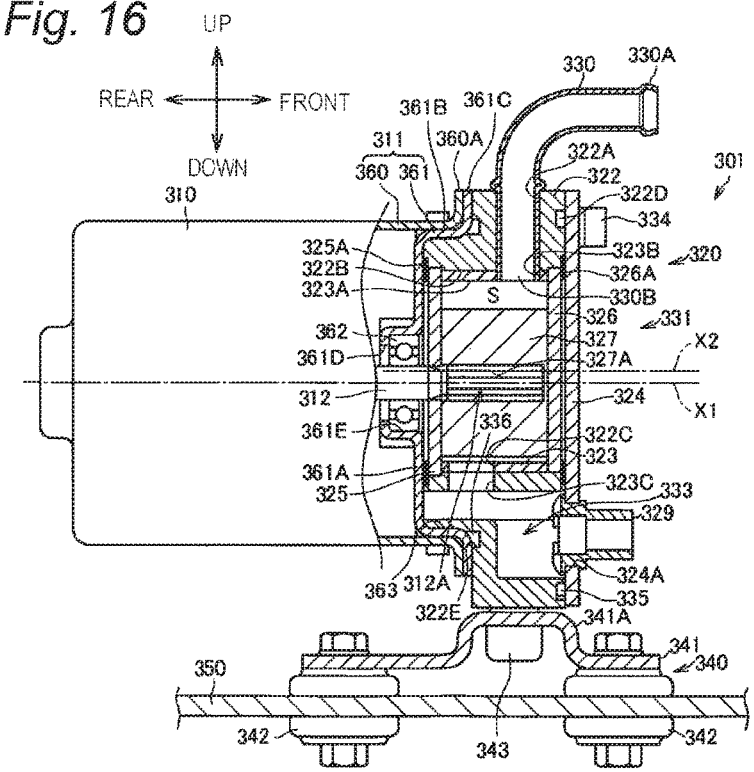
FIG. 16 is a side partial sectional view of a vacuum pump according to the first embodiment of the invention to achieve the fourth object.
Figure 17:
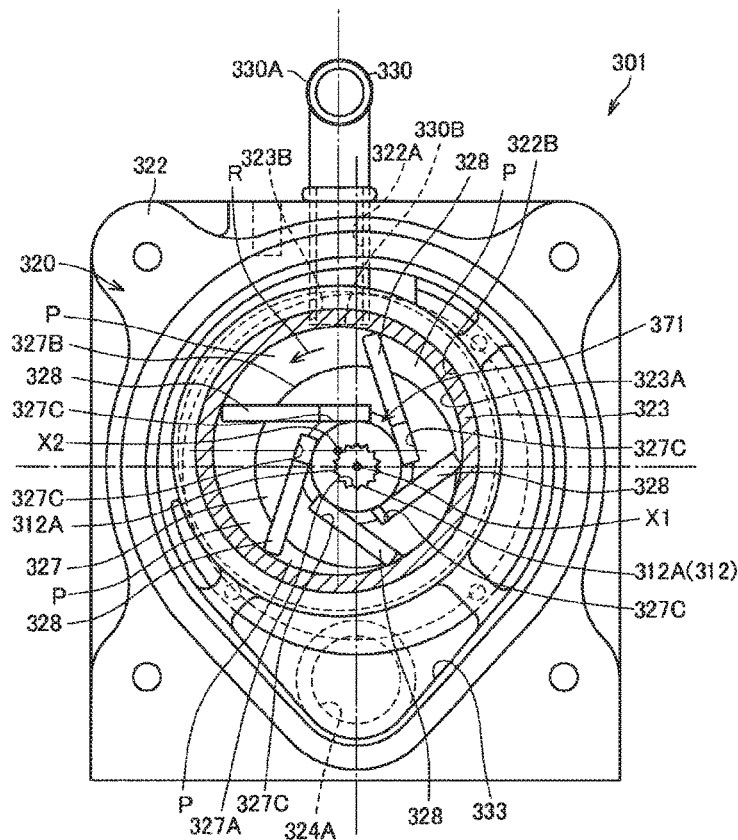
FIG. 17 is a figure of the vacuum pump when viewed from the front side.

FIG. 16 is a side partial sectional view of a vacuum pump 301 according to the first embodiment of the invention to achieve the fourth object. FIG. 17 is a figure of the vacuum pump 301 of FIG. 16 when viewed from the front side of the vacuum pump 301 (the right side in the figure above). However, FIG. 17 illustrates a state that those members such as a pump cover 324 and a side plate 326 are removed in order to show the configuration of a cylinder chamber S. In FIG. 17, a state that an attaching member 340 is removed is shown. In the following, for the convenience of description, the directions respectively indicated by the arrows in the upper parts of FIGS. 16 and 17 are the up, down, front, rear, right and left directions of the vacuum pump 301. The front-rear direction is an axial direction, and the right-left direction is a widthwise direction.

The vacuum pump 301 shown in FIG. 16 is a rotary vane-type vacuum pump, and is used as a vacuum source of a brake boosting device (not shown in the figure) of an automobile or the like. In this case, the vacuum pump 301 is usually arranged in an engine room and is connected with pipes to the brake boosting device through a vacuum tank (not shown in the figure). The use range of the vacuum pump 301 used for automobiles or the like is, for example, −60 kPa to −80 kPa.

As shown in FIG. 16, the vacuum pump 301 includes an electric motor 310 and a pump body 320 which is operated by using the electric motor 310 as a driving source, and the electric motor 310 and the pump body 320 are fixed to and supported by a vehicle body 350 of, for example, an automobile in an integrally connected state by an attaching member 340.

The attaching member 340 includes an attaching plate 341 which is provided with a rectangular projecting slot 341A that extends in the widthwise direction of the pump body 320, and vibration proof rubbers 342 and 342 which are fixed to the front end and the rear end of the attaching plate 341, respectively. The attaching plate 341 is connected to the bottom surface of the pump body 320 with a bolt 343 that passes through the projecting slot 341A, and these vibration proof rubbers 342 and 342 are held by being fitted into bores formed at the side of the vehicle body 350.

The electric motor 310 has an output shaft 312 which is protruded substantially from the center of one end (front end) of a case 311, which is formed into a substantially cylindrical shape, towards the front side. The output shaft 312 functions as a driving shaft for driving the pump body 320, and the output shaft 12 rotates around a rotation center X1 extending in the front-rear direction. A front end part 312A of the output shaft 312 is formed to a spline shaft and is engaged with a shaft hole 327A where the rotor 327 of the pump body 320 is penetrated in the axial direction, so that the output shaft 312 and the rotor 327 are connected to be integrally rotatable. Instead of that the output shaft 312 and the rotor 327 are spline coupled, the output shaft 312 and the rotor 327 may be coupled through a key.

When a power supply (not shown in the figure) is switched ON, the output shaft 312 of the electric motor 310 rotates in an arrow R direction (counterclockwise direction) in FIG. 17, and thereby the rotor 327 is rotated in the same direction (arrow R direction) around the rotation center X1.

The case 311 includes a case body 360, which is formed to a bottomed cylindrical shape, and a cover body 361 which blocks the opening of the case body 360, and the case body 360 is formed by bending a peripheral part 360A of the case body 60 outwards. The cover body 361 is integrally formed by including a disk part 361A which is formed to have substantially the same diameter as that of the opening of the case body 360, a cylinder part 361B which is connected to the fringe of the disk part 361A and is fitted into the internal peripheral surface of the case body 360, and a flexed part 361C which is formed by bending outwards the fringe of the cylinder part 361B, the disk part 361A and the cylinder part 361B enter into the case body 360, and the flexed part 361C abuts against and is fixed to the peripheral part 360A of the case body 360. Thereby, in the electric motor 310, one end (front end) of the case 311 is caved inwards, and a fitting cavity 363, which the pump body 320 is fitted to in a pillbox manner, is formed. A through hole 361D where the output shaft 312 penetrates and a recess 361E which holds an outer ring of the bearing (shaft bearing) 362 that pivotally supports the output shaft 312 are formed substantially in the center of the disk part 361A.

The pump body 320 includes, as shown in FIG. 16, a casing body 322 which is fitted into the fitting cavity 363 which is formed at the front side of the case 311 of the electric motor 310, a cylinder part 323 which is press fitted in the casing body 322 and forms a cylinder chamber S, and a pump cover 324 which covers the casing body 322 from the front side. In this embodiment, a casing 331 of the vacuum pump 301 is formed by including the casing body 322, the cylinder part 323 and the pump cover 324.

The casing body 322 uses metal materials such as aluminum whose thermal conductivity is high, and as shown in FIG. 17, the shape of the casing body 322, when viewed from front, is formed to a substantially rectangular shape which is longer in the up-down direction with the above-mentioned rotation center X1 as an approximate center. A communicating hole 322A, which communicates with the cylinder chamber S which the casing body 322 is provided with, is formed in the upper part of the casing body 322, and an vacuum absorbing nipple (intake pipe) 330 is press fitted to the communicating hole 322A.

As shown in FIG. 16, the vacuum absorbing nipple 330 is a pipe which is bent to a rough L shape, and a pipe or tube for supplying underpressure air from an external equipment (for example, a vacuum tank (not shown in the figure)) is connected to one end 330A of the vacuum absorbing nipple 330. In this embodiment, because the vacuum absorbing nipple 330 is press fitted into the communicating hole 322A of the casing body 322, when a position where the external equipment is arranged is determined beforehand as in a vehicle, the vacuum absorbing nipple 330 may be press fitted by turning the end 330A to the direction in which the external equipment is arranged so that with a simple configuration, the direction in which the pipe or tube for supplying underpressure air is drawn out can be set freely.

A bore 322B around a central axis X2 which extends in the front-rear direction is formed in the casing body 322, and a cylinder part 323 which is formed to a cylindrical shape is press fitted into the bore 322B. The central axis X2 is parallel with the rotation center X1 of the output shaft 312 of the above-mentioned electric motor 310, and as shown in FIG. 17, is offset to the upper left side relative to the rotation center X1. In the embodiment, the central axis X2 is offset so that the outer peripheral surface 327B of the rotor 327 around the rotation center X1 keeps a minute clearance from the internal peripheral surface 323A of the cylinder part 323 that is formed to a circular surface around the central axis X2.

In FIG. 16, a symbol 334 is a bolt for fixing the pump cover 324 to the casing body 322, a symbol 335 is a sealing member for blocking a gap between the casing body 322 and the pump cover 324, and a symbol 322D is a sealing groove where the sealing member 335 is installed. Further, a symbol 336 is a sealing member for blocking a gap between the casing body 322 and the cover body 361, and a symbol 322E is a sealing groove where the sealing member 336 is installed.

The cylinder part 323 is formed of metal material (in the present embodiment, iron) which is the same as that of the rotor 327. With this configuration, because the thermal expansion coefficients of the cylinder part 323 and the rotor 327 are the same, regardless of temperature change of the cylinder part 323 and the rotor 327, the contact of the outer peripheral surface 327B of the rotor 327 and the internal peripheral surface 323A of the cylinder part 323 when the rotor 327 is rotated can be prevented. The cylinder part 323 and the rotor 327 may use different materials as long as they are metal materials that have substantially the same thermal expansion coefficient.

Because the cylinder part 323 can be accommodated in the length range of the front-rear direction of the casing body 322 by press fitting the cylinder part 323 into the bore 322B which is formed in the casing body 322, the cylinder part 323 is prevented from being protruded from the casing body 322 and the casing body 322 can be downsized.

Furthermore, the casing body 322 is formed of material whose thermal conductivity is higher than that of the rotor 327. Thereby, since the heat that is generated when the rotor 327 and vanes 328 are rotationally driven can be transmitted to the casing body 322 immediately, the heat from the casing body 322 can be dissipated sufficiently.

Substantially, because aluminum has a thermal expansion coefficient bigger than that of iron, the press fitting amount of the cylinder part 323 tends to be decreased when the temperature of the pump body 320 becomes high. Therefore, in this structure, the opening (communicating hole) 323B which is coupled to the communicating hole 322A of the casing body 322 is formed in the cylinder part 323, and the other end (front end) 330B of the vacuum absorbing nipple 330 is arranged to be engaged with the opening 323B. Thus, even if the press fitting amount of the cylinder part 323 is decreased due to thermal expansion, because the other end 330B of the vacuum absorbing nipple 330 is engaged with the opening 323B of the cylinder part 323, the cylinder part 323 can be prevented from being rotated or falling out.

At the lower part of the casing body 322 and the cylinder part 323, discharging ports 322C and 323C, which penetrate the casing body 322 and the cylinder part 323 and where the air compressed in the cylinder chamber S is exhausted, are provided.

Side plates 325 and 326 are disposed at the rear end and the front end of the cylinder part 323, respectively. The diameter of the side plates 325 and 326 is set to be larger than the inside diameter of the internal peripheral surface 323A of the cylinder part 323. The side plates 325 and 326 are pressed against the front end and the rear end of the cylinder part 323, respectively, by being biased by gaskets 325A and 326A. Thereby, the sealed cylinder chamber S is formed inside the cylinder part 323 except the opening 323B which is coupled to the vacuum absorbing nipple 330 and the discharging ports 323C and 322C.

In the cylinder chamber S, the rotor 327 is disposed. Because the vacuum pump 301 of the present embodiment is a vane-type pump, the rotor 327 is formed into a vane rotor having guide grooves 327C which are a plurality of (five pieces) vane slits that accommodate a plurality of (in the present embodiment, five pieces) vanes 328 to be extendable substantially in the radial direction.

The rotor 327 has a cylindrical column shape which extends along the rotation center X1 of the electric motor 310, and has an axial bore 327A through which the output shaft 312 which is a driving shaft of the pump body 320 is inserted. Meanwhile, at positions away from the axial bore 327A in the radical direction, a plurality of guide grooves 327C are provided around the axial bore 327A by being spaced in the peripheral direction with an equal angular interval.

A spline groove, which is engaged with the spline shaft that is provided at the front end part 312A of the output shaft 312, is formed at the axial bore 327A, and the rotor 327 and the output shaft 312 is adapted to be spline connected.

The length in the front-rear direction of the rotor 327 is set to be substantially equal to the length of the cylinder chamber S of the cylinder part 323, namely, the distance between the mutually opposed inside surfaces of the above-mentioned two pieces of side plates 325 and 326, and the space between the rotor 327 and the side plates 325 and 326 are substantially blocked.

The radius of the rotor 327 is set to the shortest distance between the rotation center X1 and the internal peripheral surface 323A of the cylinder part 323, as shown in FIG. 17, and the outer peripheral surface 327B of the rotor 327 is set to roughly contact a part of the internal peripheral surface 323A of the cylinder part 323 (a part located at the lower right side). Thereby, as shown in FIG. 17, a space of a crescent shape is formed between the outer peripheral surface 327B of the rotor 327 and the internal peripheral surface 323A of the cylinder part 323.

The plurality of vanes 328 are partitioning members that partition the crescent space, and the vanes 328 are formed into the same shape. The vanes 328 are extended in the front-rear direction of the rotor 327 and set be substantially equal to the length of the cylinder chamber S of the cylinder part 323, namely, the distance between the mutually opposed inside surfaces of the above-mentioned two pieces of side plates 325 and 326, and the space between the vanes 328 and the side plates 325 and 326 are substantially blocked. The above mentioned crescent shape between the cylinder chamber S and the rotor 327 is partitioned by the vanes 328 into a plurality of (in the present embodiment, five) chambers.

These vanes 328 are made of carbon which is a light weight sliding material superior in a sliding property, and are formed to be lighter than those using a metal complex as other sliding materials. In this embodiment, the rotary compressing elements are formed by including the rotor 327 and the plurality of vanes 328.

Figure 18A:
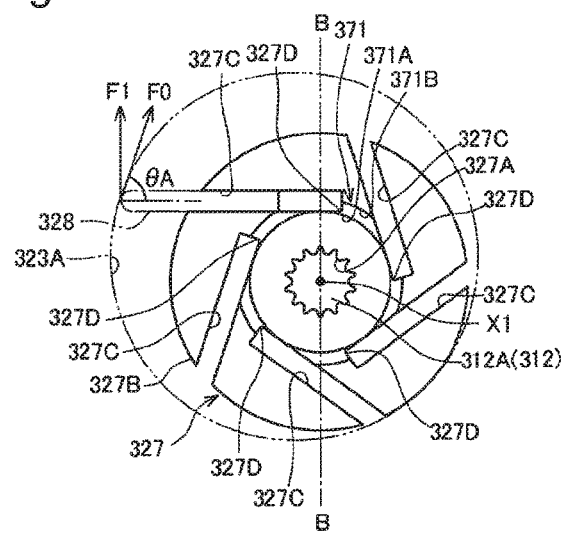
FIG. 18A is a figure which shows a side surface of a rotor with the neighboring configuration.
Figure 18B:
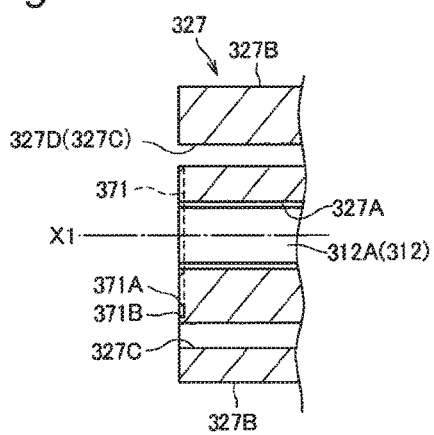
FIG. 18B shows a B-B section of FIG. 18A.

FIG. 18A is a figure which shows a side surface of the rotor 327 with the neighboring configuration, and FIG. 18B shows a B-B section of FIG. 18A.

As shown in FIGS. 17 and 18A, the deepest parts 327D of the guide grooves 327C are offset to positions apart from the rotation center X1 of the rotor 327, and the guide grooves 327 extend outwards in the radial direction so that a contact angle 6A (refer to FIG. 18A) of the vanes 328 moving along the guide grooves 327C and the internal peripheral surface 323A of the cylinder part 323 becomes an acute angle. With the guide grooves 327C, a bending force F1 of the vane 328 (equivalent to that $F1="F0 \sin \theta A"$) can be reduced. Therefore, even for the vanes 328 made of carbon whose mechanical strength is lower than a metal complex, the bending force F1 acting on the vanes 328 can be easily controlled within a tolerable range.

The pump cover 324 is arranged to the front side plate 326 via the gasket 326A, and is fixed to the casing body 322 with a bolt 34. On the front of the casing body 322, as shown in FIG. 17, a sealing groove 322D is formed by surrounding the cylinder part 323 and the expansion chamber 333, and an annular sealing member 335 is arranged to the sealing groove 322D. The exhausting port 324A is provided in the pump cover 324 at a position corresponding to the expansion chamber 333. The exhausting port 324A is intended to exhaust the air which flows into the expansion chamber 333 to the outside of the device (the outside of the vacuum pump 301), and a check valve 329 for preventing the countercurrent of air from the outside of the device into the pump is attached to the exhausting port 324A.

Next, operations of the vacuum pump 301 are described.

When the rotor 327 is rotationally driven with the operation of the electric motor 310, the vanes 328 fly outwards along the guide grooves 327C by a centrifugal force with the rotation of the rotor 327 so that the front ends of the vanes 28 abut with the internal peripheral surface 323A of the cylinder part 323. Therefore, As shown in FIG. 17, the crescent space of the cylinder chamber S is partitioned into 5 compression chambers P surrounded by two pieces of mutually adjacent vanes 328 and 328, the outer peripheral surface 327B of the rotor 327 and the internal peripheral surface 323A of the cylinder part 323.

In this case, because the center of the cylinder chamber S (=central axis X2) is offset from the rotation center X1 of the rotor 327, with the rotation of the arrow R direction of the rotor 327 with the rotation of the output shaft 312, the flying distances of the vanes 328 fluctuate and the capacity of the compression chamber P is changed to the maximum at a position near the opening 323B and to the minimum at a position near the discharging port 323C. Therefore, with the rotation of the rotor 327 and the vanes 328, the air taken in one compression chamber P from the opening 323B can rotate and can be compressed with the rotation of the rotor 327, discharged from the discharging port 323C, and discharged from the exhausting port 324A through the compression chamber 333. Thereby, the air which is gas from the vacuum tank connected to the vacuum pump 301 is exhausted and a pressure under an atmospheric pressure (vacuum) can be obtained.

When an underpressure occurs due to the flying out of the vanes 328 in the guide grooves 327C, there is a fear that this underpressure obstructs the flying out of the vanes 328. In particular, in this embodiment, because the vanes 328 are made of lightweight carbon and the guide grooves 327C are offset outwards in the radial direction from the rotation center X1 of the rotor 327, the centrifugal force acting on the vanes 328 is relatively small and the influence of the above underpressure is easy to be great.

Thus, in this configuration, as shown in FIGS. 18A and 18B, a groove 371 that links the plurality of guide grooves 327C is provided on the side surface of the rotor 327. Next, the groove 371 is described.

The groove 371 is a groove that links the deepest parts 327D of all the guide grooves 327C, and the groove 371 is formed to a "circular hole type groove" which is a ring-like groove around the rotation center X1.

More specifically, the groove 371 continues endlessly in the peripheral direction with a constant width narrower than the width of the guide grooves 327C, and extends so that the deepest parts 327D of all the guide grooves 327C are linked at the inner peripheral side. In this configuration, the internal peripheral edge 101A of the groove 371 is located at the internal peripheral ends of the deepest parts 327D of the guide grooves 327C, and the outer peripheral edge 101B of the groove 371 is located at positions substantially in the middle of the internal peripheral ends and the outer peripheral ends of the deepest parts 327D of the guide grooves 327C. Thus, there is little processing load added to the rotor 327, and the groove 371 is formed to a groove shape that has little influence on the mechanical strength of the rotor 327.

The groove 371 is formed on both side surfaces of the rotor 327. Thereby, spaces that communicate with all the guide grooves 327C can be easily provided between the two side surfaces of the rotor 327 and the side plates 325 and 326.

Thus, by forming the grooves 371 linking the guide grooves 327C, when an underpressure is almost produced with the flying out of any vanes 328 in the guide grooves 327C, the air in other guide grooves 327C can flow promptly through the above grooves 371 and the occurrence of the underpressure in the guide grooves 327C can be inhibited.

Besides, because the above grooves 371 link the deepest parts 327D of the guide grooves 327C to each other, even if the vanes 328 are at some positions in the guide grooves 327C, the area where an underpressure is produced with the flying out of the vanes 328 always communicates with other guide grooves 327C through the grooves 371. Therefore, regardless of the positions of the vanes 328, the occurrence of the underpressure due to the flying out of the vanes 328 can be inhibited.

Furthermore, because the vanes 328 that fly out from the guide grooves 327 in a centrifugal direction and the vanes 328 that move to the opposite side to the centrifugal direction and return into the guide grooves 327C exist at the same time in the vane-type rotor 327, by providing the grooves 371 that link all the guide grooves 327C, air can come and go through the above grooves 371 between the guide grooves 327C of the vanes 328 that fly out in the centrifugal direction and the guide grooves 327C of the vanes 328 that move to the opposite side. Thereby, the so-called pumping loss of all the vanes 328 can be avoided, and the vanes 328 can be easily moved in both directions.

Furthermore, because the grooves 371 are formed on the side surfaces of the rotor 327, the grooves 371 can be easily provided without increasing the number of components and without providing an extra space. Besides, because the grooves 371 are ring-like grooves around the rotation center X1 of the rotor 327, the grooves can be easily manufactured without adversely affecting the rotary balance of the rotor 327. The depth of the grooves 371 may be such a depth that the capacity that makes air to be flowed well between the guide grooves 327C can be ensured, and by adjusting this depth appropriately, it is possible to adjust to a capacity that is most suitable. As described above, according to the present embodiment, because the grooves 371 which link the guide grooves 327C are provided on the rotor 327, the vanes 328 can easily fly out without increasing the number of components. Because the grooves 371 are provided on the side surfaces of the rotor 327, the grooves 371 can be easily provided on the rotor 327 with groove-processing.

Furthermore, because the grooves 371 are ring-like grooves that link the deepest parts 327D of all the guide grooves 327C, the occurrence of an underpressure due to the flying out of the vanes 328 can be inhibited regardless of the positions of the vanes 328 and without affecting the rotation balance of the rotor 327. The groove 371 may be provided only on one side surface of the rotor 327 when the vanes 328 can easily fly out sufficiently with the groove 371 only on the one side surface of the rotor 327.

Figure 19A:
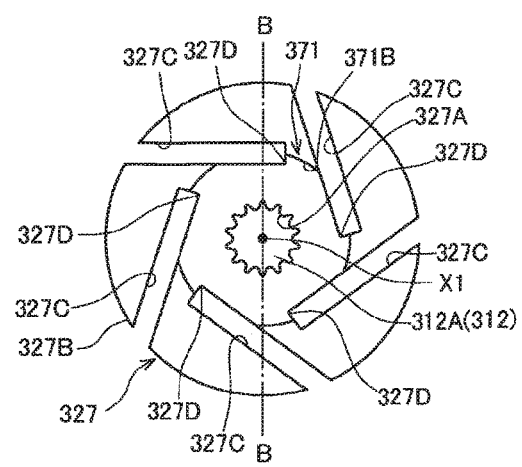
FIG. 19A is a figure which shows a side surface of a rotor according to the second embodiment with the neighboring configuration.
Figure 19B:
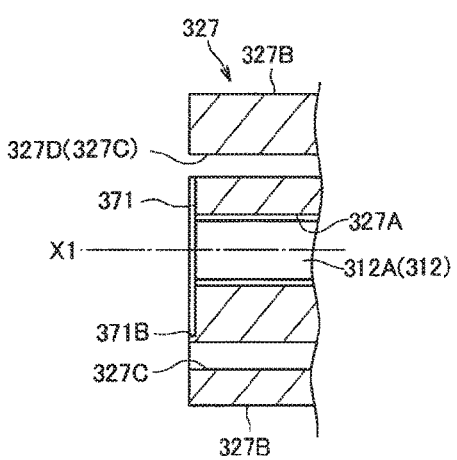
FIG. 19B is a B-B sectional view of FIG. 19A.

FIGS. 19A and 19B show a second embodiment to achieve the fourth object, in which FIG. 19A is a figure which shows a side surface of the rotor 327 with the neighboring configuration, and FIG. 19B shows a B-B section of FIG. 19A.

In the second embodiment, a "counterbored hole type groove" is shown, that is, the groove 371 to be formed on a side surface of the rotor 327 is formed to a groove of a counterbored hole shape (included in annular grooves) around the rotation center X1.

The outer peripheral edge 101B, which is centered on the rotation center X1, of the groove 371 is located at positions substantially in the middle of the internal peripheral ends and the outer peripheral ends of the deepest parts 327D of the guide grooves 327C. The groove 371 is formed to a groove of a perfect circle shape whose inside is all sunk, and links the deepest parts 327D of all the guide grooves 327C.

Therefore, by providing the groove 371, the same effects as those of the above first embodiment, such as that the vanes 328 can easily fly out, can be achieved without increasing the number of components.

Besides, in the case of the groove 371, the axial bore 327A of the rotor 327 can communicate with all the guide grooves 327C.

Although the front end part 312A of the output shaft 312 is inserted through the axial bore 327A of the rotor 327, some gaps are formed between the axial bore 327A and the output shaft 312 even in the case of spline combination or key combination, and when the vacuum pump 301 is operated, the air pressure (pressure) of the center side of the rotor 327 is high, and the pressure of the gaps becomes the atmospheric pressure in the vacuum pump 301.

Therefore, with the configuration that the guide grooves 327C and the axial bore 327A of the rotor 327 communicate, the high pressure air which is the high pressure fluid in the axial bore 327A or near the axial bore 327A can be introduced into the guide grooves 327C, and by using this high pressure air, the vanes 328 can easily fly out.

As described above, according to the present embodiment, because the groove 371 which links the guide grooves 327C and the axial bore 327A of the rotor 327 is provided on the rotor 327, by using the centrifugal force and the high pressure fluid at the side of the axial bore 327A, the vanes 328 can more easily fly out. The groove 371 may be provided on both side surfaces of the rotor 327 or may be provided on one side surface of the rotor 327.

FIGS. 19A and 19B show a third embodiment to achieve the fourth object, in which FIG. 19A is a figure which shows a side surface of the rotor 327 with the neighboring configuration, and FIG. 19B shows a B-B section of FIG. 19A.

In the third embodiment, a "groove with a labyrinth" is shown, that is, in addition to a groove 371 that links the guide grooves 327C, a labyrinth passage 381 between the guide grooves 327C and the axial bore 327A are included on a side surface of the rotor 327.

The labyrinth passage 381 is formed by coaxially arranging a plurality of (in the present embodiment three) annular grooves 381A with intervals, and the plurality of annular grooves 381A are provided coaxially with the axial bore 327A.

The cylinder chamber S of the vacuum pump 301 is sealed basically except the opening 323B and the discharging ports 323C and 322C, but because an opening where wires that extend from electrical components such as the electric motor of the vacuum pump 301 are drawn outwards is necessary, air might go in and out through gaps such as the opening. For example, in the cylinder chamber S, because the air pressure (pressure) of the central side of the rotor 327 becomes higher when the vacuum pump 301 is operated, a flow of the air of the central side discharged through the through hole 361D which is the bore near the bearing (shaft bearing) 362 may be produced.

When this flow is produced, abrasion powder which is produced because of the sliding of the vanes 328 may be attached to the bearing 362, and it is desired that the attachment of the abrasion powder is avoided.

As described above, in this configuration, because the labyrinth passage 381 is provided between the guide grooves 327C and the axial bore 327A, it is hard for the abrasion powder which is produced at the side of the vanes 328 to flow to the center side of the rotor 327. Therefore, it can be prevented that the abrasion powder flows to the central side of the rotor 327 and flows to the bearing 362.

Further, because the labyrinth passage 381 is formed as a multi-rings shaped groove formed on the side surface of the rotor 327, the labyrinth passage 381 can be provided without increasing the number of components, without providing another space separately and without adversely affecting the rotation balance of the rotor 327. Besides, the groove processing of the labyrinth passage 381 and the groove processing of the groove 371 which links the guide grooves 327C can be performed at the same time.

The labyrinth passage 381 may be provide on the two side surfaces of the rotor 327 and may be provided on one side surface, but it is desirable that the labyrinth passage 381 is provided at least on the side surface of the rotor 327 at the side of the bearing 362.

Figure 20A:
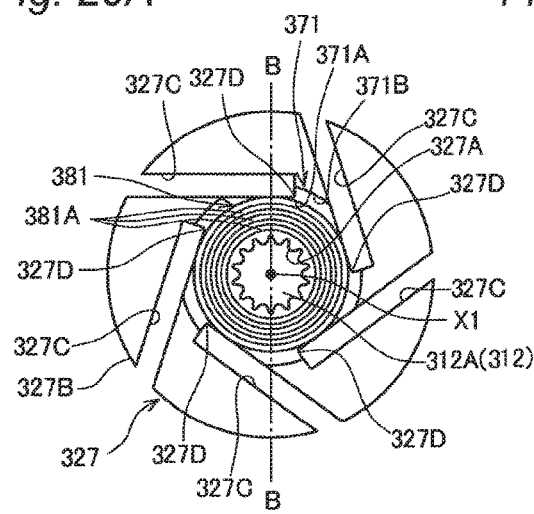
FIG. 20A is a figure which shows a side surface of a rotor according to the third embodiment with the neighboring configuration.
Figure 20B:
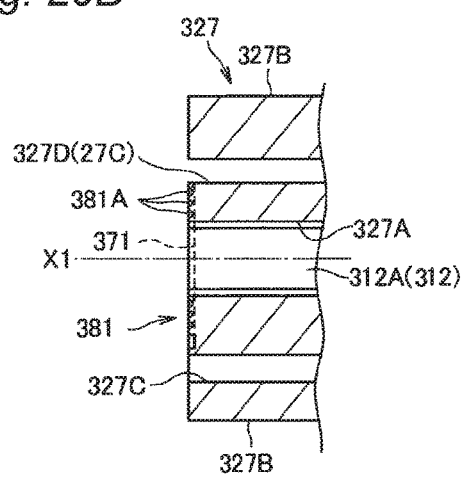
FIG. 20B is a B-B sectional view of FIG. 20A.

FIG. 20 is a figure which enlarges and shows the output shaft 312 of the electric motor 310 with the neighboring configuration.

As shown in this figure, the output shaft 312 of the electric motor 310 is provided with a disc-like collar part 385 whose diameter is larger than that of the output shaft 312. The collar part 385 is a member that functions as a shielding collar part for shielding the abrasion powder which is produced at the side of the vanes 328 from flowing to the bearing 362, and is arranged between the bearing 362 and the side plate 325.

According to this configuration, the abrasion powder produced at the side of the vanes 328 can be more surely shielded by the collar part 385 which the output shaft 312 is provided with from flowing to the bearing 362.

The collar part 385 may be formed integrally with the output shaft 312, and it is also possible that the collar part 385 is formed of a component other than the output shaft 312 and is attached to the output shaft 312. The shape of collar part 385, such as the outer diameter, may be changed optionally as far as the abrasion powder can be shielded from flowing to the side of the bearing 362.

The labyrinth passage 381 of this embodiment has a shape formed by coaxially arranging a plurality of (in the present embodiment three) annular grooves 381A with intervals, but the shape of the labyrinth passage 381 is not limited to this, and may have eddy-like annular grooves (eddy grooves).

Figure 21:
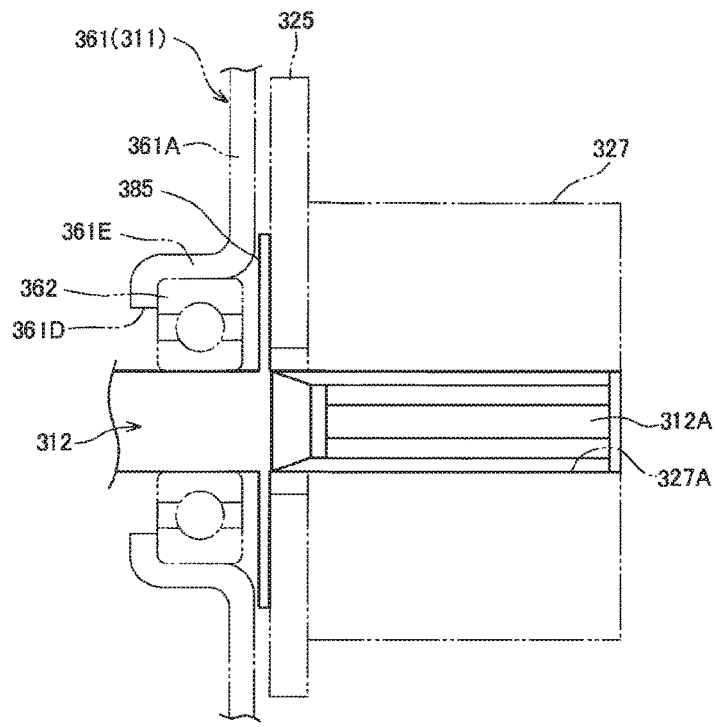
FIG. 21 is a figure which enlarges and shows an output shaft of the electric motor with the neighboring configuration.

FIGS. 21A and 21B show a fourth embodiment to achieve the fourth object, in which FIG. 21A is a figure which shows a side surface of the rotor 327 with the neighboring configuration, and FIG. 21B shows a B-B section of FIG. 21A.

In the fourth embodiment, a "star type groove" is shown, that is, grooves 375 that link the guide grooves 327C and the axial bore 327A of the rotor 327 are provided on a side surface of the rotor 327. The grooves 375 is formed of a plurality of (in the present embodiment five) grooves that link all (in the present embodiment five) the guide grooves 327C and the axial bore 327A, respectively.

In this configuration, the guide grooves 327C are offset to positions apart from the axial bore 327A, and the above mentioned grooves 375 are formed to grooves that extend into a linear shape along the radial direction of the rotary shaft (the rotation center X1) of the rotor 327, and are connected to the deepest parts 327D of the guide grooves 327C.

Thus, if the grooves 375 which link the guide grooves 327C and the axial bore 327A of the rotor 327 are provided, when the vacuum pump 301 is operated, the high pressure air which is the high pressure fluid of the center side of the rotor 327 can be introduced into the guide grooves 327C, and the vanes 328 can easily fly out.

Besides, because the grooves 375 extends into a linear shape along the radial direction of the rotary shaft (the rotation center X1) of the rotor 327, while the guide grooves 327C and the axial bore 327A of the rotor 327 can be linked at the shortest distance, the high pressure air can be sent to the side of the guide grooves 327C by using the centrifugal force of the rotor 327 and the high pressure air can be smoothly introduced into the guide grooves 327C. Therefore, the vanes 328 can more easily fly out efficiently.

Further, because the grooves 375 can be easily provided with processings on the side surface of the rotor 327, the grooves 375 can be provided without increasing the number of components, without providing another space separately and without adversely affecting the rotation balance of the rotor 327.

Further, the grooves 375 can function as grooves that connect all the guide grooves 327C through the axial bore 327A of the rotor 327. Therefore, through the grooves 375, air can come and go between the guide grooves 327C where the vanes 328 fly out in the centrifugal direction and the guide grooves 327C where the vanes 328 move to the opposite side, and thereby the vanes 328 can be easily moved.

In this embodiment, it is described that the grooves 375 which link the guide grooves 327C and the axial bore 327A of the rotor 327 are the grooves that link the guide grooves 327C and the axial bore 327A of the rotor 327 at the shortest distance, but the invention is not limited to this, the grooves 375 may have a curve groove shape that is curved convexly towards the outer peripheral side of the rotor 327. If the grooves 375 have a curve groove shape, the inclination of the grooves 375 changes in accordance with the radial direction of the rotor 327, and the grooves longer than the shortest distance between the guide grooves 327C and the axial bore 327A of the rotor 327 can be provided and can function as a labyrinth passage so that it is hard for the abrasion powder which occurs at the side of the vanes 328 to flow to the center side of the rotor 327.

The preferred embodiments for performing the present invention are described as above, but the present invention is not limited to the previously described embodiments, and various modifications and changes are possible based on the technical thought of the present invention.

Figure 22A:
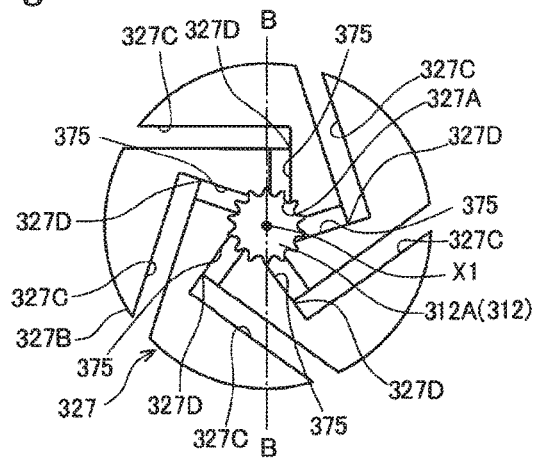
FIG. 22A is a figure which shows a side surface of a rotor according to the fourth embodiment with the neighboring configuration.
Figure 22B:
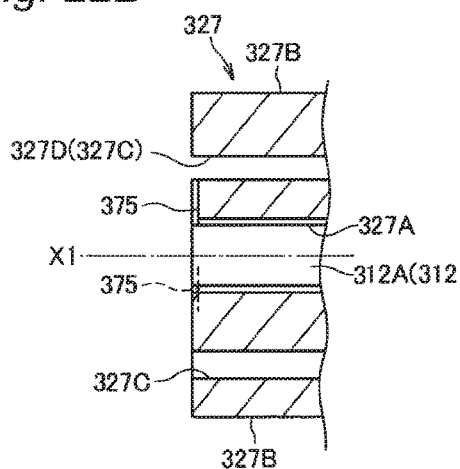
FIG. 22B is a B-B sectional view of FIG. 22A.

For example, in the above embodiments, it is also possible to form a bypath 391 of the fluid (air) between the vanes 328 and the guide grooves 327C by cutting one edge of the vanes 328. FIG. 22 is a figure which shows a configuration example in this case.

Figure 23:
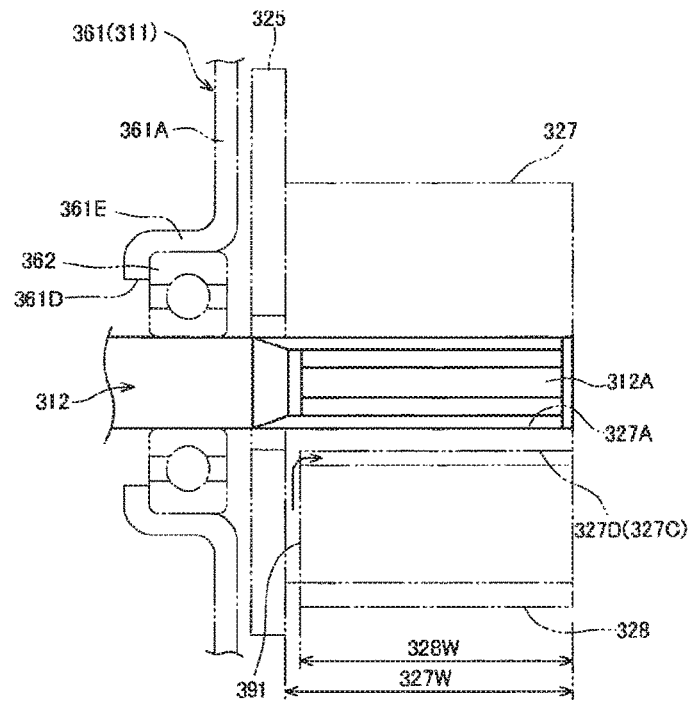
FIG. 23 is a figure which describes a variation.

In FIG. 23, by cutting the side surfaces of the vanes 328, the width 328W of the vanes 328 becomes smaller than the width 327W of the rotor 327. In this configuration, between the vanes 328 and side plates 325 and 326 (in this example side plate 325), a gap that becomes the bypath 391 is formed. Therefore, when an underpressure is almost produced in the guide grooves 327C with the flying out of the vanes 328, as shown with an arrow in FIG. 23, air can flow into the guide grooves 327C through the above bypath 391. Thereby, the occurrence of the underpressure in the guide grooves 327C can be inhibited, and the vanes 328 can easily fly out. Besides, the bypath of the fluid between the vanes 328 and the guide grooves 327C may be formed by cutting parts other than the side surfaces of the vanes 328.

In the above embodiments, it is described that the ring-like grooves 371 which link all the guide grooves 327C are provided, but the invention is not limited to this, the groove shape may be changed appropriately as far as the vanes can be easily fly out. In the above embodiments, it is described that the present invention is applied into the vane-type vacuum pump, but the invention is not limited to this, and the present invention may be applied into other vane-type compressing devices besides the vacuum pump.

Figure 24:
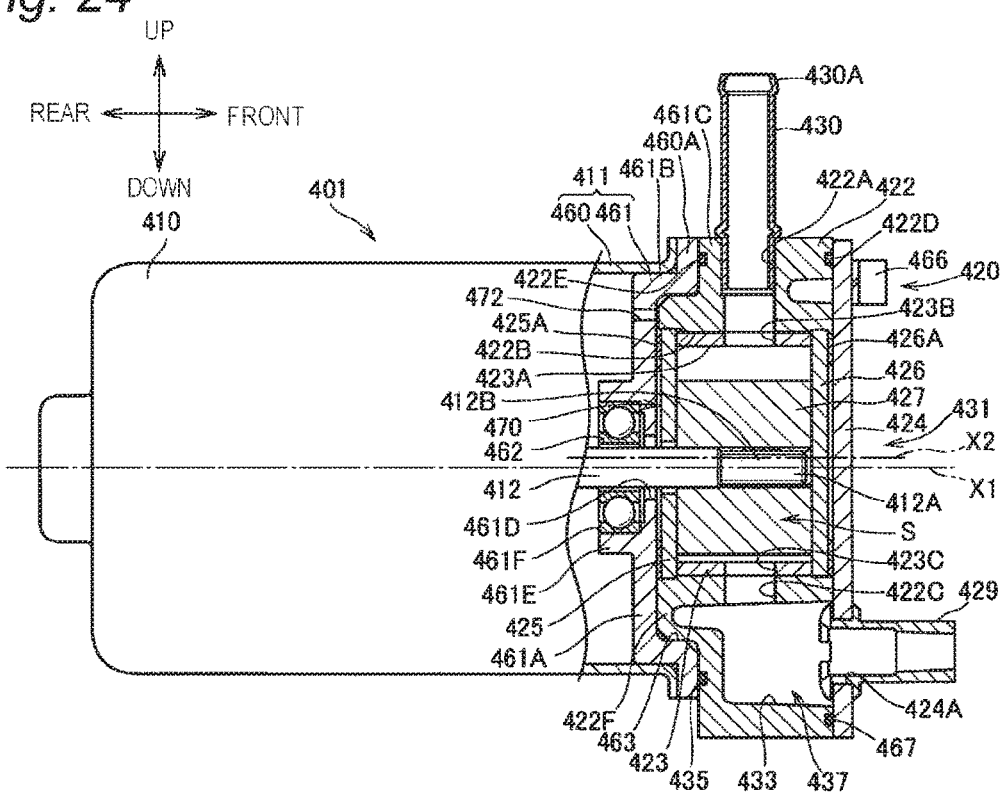
FIG. 24 is a side partial sectional view of a vacuum pump according to the embodiment to achieve the fifth object.
Figure 25:
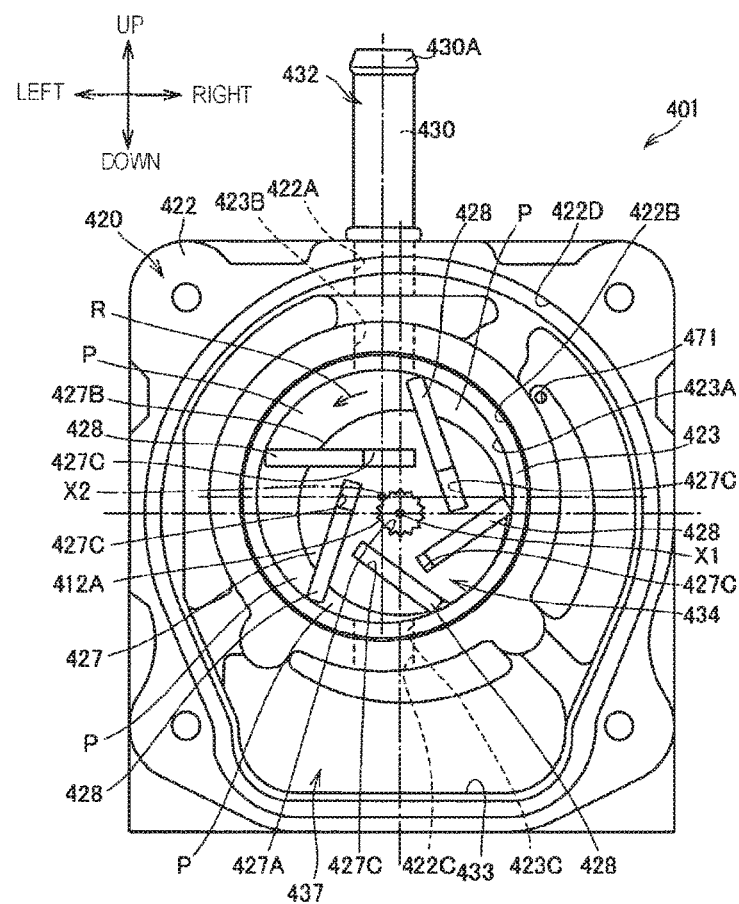
FIG. 25 is a figure of the vacuum pump when viewed from the front side.

FIG. 24 is a side partial sectional view of a vacuum pump 401 according to the embodiment of the invention to achieve the fifth object. FIG. 25 is a figure of the vacuum pump 401 of FIG. 24 when viewed from the front side of the vacuum pump 401 (the right side in the figure above). However, FIG. 25 illustrates a state that those members such as a pump cover 424 and a side plate 426 are removed in order to show the configuration of a cylinder chamber S. In the following, for the convenience of description, the directions respectively indicated by the arrows in the upper parts of FIGS. 24 and 25 are the up, down, front, rear, right and left directions of the vacuum pump 401. The front-rear direction is an axial direction, and the right-left direction is a widthwise direction.

The vacuum pump 401 shown in FIG. 24 is a rotary vane-type vacuum pump, and, for example, is used as a vacuum source of a brake boosting device (not shown in the figure) of an automobile or the like. In this case, the vacuum pump 401 is usually arranged in an engine room and is connected with pipes to the brake boosting device through a vacuum tank (not shown in the figure). The use range of the vacuum pump 401 used for automobiles or the like is, for example, −60 kPa to −80 kPa.

As shown in FIG. 24, the vacuum pump 401 includes an electric motor 410 and a pump body 420 which is operated by using the electric motor 410 as a driving source, and the electric motor 410 and the pump body 420 are fixed to and supported by a vehicle body of, for example, an automobile in an integrally connected state.

The electric motor 410 has an output shaft (rotary shaft) 412 which extends substantially from the center of one end (front end) of a case 411, which is formed into a substantially cylindrical shape, towards the side of the pump body 420 (front side). The output shaft 412 rotates around a rotation center X1 that extends in the front-rear direction. A spline part 412B, which is fitted into a rotor 427 of the pump body 420 to be described below and turns and stops the rotor 427, is formed at the front end part 12A of the output shaft 412. By providing a key on the outside surface of the output shaft 412, skidding of the rotor 427 can be prevented.

When a power supply (not shown in the figure) is switched ON, the output shaft 412 of the electric motor 410 rotates in an arrow R direction (counterclockwise direction) in FIG. 25, and thereby the rotor 427 is rotated in the same direction (arrow R direction) around the rotation center X1.

The case 411 includes a case body 460, which is formed to a bottomed cylindrical shape, and a cover body 461 which blocks the opening of the case body 460, and the case body 460 is formed by bending a peripheral part 460A of the case body 60 outwards. The cover body 461 is integrally formed by including a disk part (wall surface) 461A which is formed to have substantially the same diameter as that of the opening of the case body 460, a cylinder part 461B which is connected to the fringe of the disk part 461A and is fitted into the internal peripheral surface of the case body 460, and a flexed part 461C which is formed by bending outwards the fringe of the cylinder part 461B, the disk part 461A and the cylinder part 461B enter into the case body 460, and the flexed part 461C abuts against and is fixed to the peripheral part 460A of the case body 460. Thereby, in the electric motor 410, one end (front end) of the case 411 is caved inwards, and a fitting cavity 463, which the pump body 420 is attached to in a pillbox fitting manner, is formed.

Approximately in the center of the disk part 461A, a through hole 461D where the output shaft 412 penetrates and a circular bearing holding part 461E which extends inside of the case body 460 around the through hole 461D are formed, and the outer ring of a bearing 462 that pivotally supports the above output shaft 412 is held by the internal peripheral surface 61F of the bearing holding part 461E. In the embodiment, an open-type ball bearing is adopted for the bearing 462. Because the open-type ball bearing has a smaller resistance at the time of rotation and lower mechanical loss than a shield-type ball bearing, the power consumption of the electric motor can be reduced.

The pump body 420 includes, as shown in FIG. 24, a casing body 422 which is fitted into the fitting cavity 463 which is formed at the front side of the case 411 of the electric motor 410, a cylinder part 423 which is press fitted in the casing body 422 and forms a cylinder chamber S, and a pump cover 424 which covers the casing body 422 from the front side. In this embodiment, a casing 431 of the vacuum pump 401 is formed by including the casing body 422, the cylinder part 423 and the pump cover 424.

The casing body 422 uses, for example, metal materials such as aluminum whose thermal conductivity is high, and as shown in FIG. 25, the shape of the casing body 422, when viewed from front, is formed to a substantially rectangular shape which is longer in the up-down direction with the above-mentioned rotation center X1 as an approximate center. A communicating hole 422A, which communicates with the cylinder chamber S which the casing body 422 is provided with, is formed in the upper part of the casing body 422, and a vacuum absorbing nipple 430 is press fitted to the communicating hole 422A. As shown in FIG. 24, the vacuum absorbing nipple 430 is a direct pipe which extends upwards, and a pipe or a tube which supplies underpressure air from an external equipment (for example, a vacuum tank (not shown in the figure)) is connected to one end 430A of the vacuum absorbing nipple 430.

A bore 422B around a central axis X2 which extends in the front-rear direction is formed in the casing body 422, and a cylinder part 423 which is formed to a cylindrical shape is press fitted into the bore 422B. The central axis X2 is parallel with the rotation center X1 of the output shaft 412 of the above-mentioned electric motor 410, and as shown in FIG. 25, is offset to the upper left side relative to the rotation center X1. In this configuration, the central axis X2 is offset so that the outer peripheral surface 427B of the rotor 427 around the rotation center X1 is adjacent to the internal peripheral surface 423A of the cylinder part 423 that is formed around the central axis X2.

The cylinder part 423 is formed of metal material (in the present embodiment, iron) which is the same as that of the rotor 427. With this configuration, because the thermal expansion coefficients of the cylinder part 423 and the rotor 427 are the same, regardless of temperature change of the cylinder part 423 and the rotor 427, the contact of the outer peripheral surface 427B of the rotor 427 and the internal peripheral surface 423A of the cylinder part 423 when the rotor 427 is rotated can be prevented. The cylinder part 423 and the rotor 427 may use different materials as long as they are metal materials that have substantially the same thermal expansion coefficient.

Because the cylinder part 423 can be accommodated in the length range of the front-rear direction of the casing body 422 by press fitting the cylinder part 423 into the bore 422B which is formed in the casing body 422, the cylinder part 423 is prevented from being protruded from the casing body 422 and the casing body 422 can be downsized.

Furthermore, the casing body 422 is formed of material whose thermal conductivity is higher than that of the rotor 427. Thereby, since the heat that is generated when the rotor 427 and vanes 428 are rotationally driven can be transmitted to the casing body 422 immediately, the heat from the casing body 422 can be dissipated sufficiently.

An opening 423B which is coupled with the communicating hole 422A of the above described casing body 422 and the cylinder chamber S is formed at the cylinder part 423, and the air passing through the vacuum absorbing nipple 430 is supplied to the cylinder chamber S through the communicating hole 422A and the opening 423B. Therefore, in this embodiment, an intake path 32 is formed by including the vacuum absorbing nipple 430, the communicating hole 422A of the casing body 422 and the opening 423B of the cylinder part 423. At the lower part of the casing body 422 and the cylinder part 423, discharging ports 422C and 423C, which penetrate the casing body 422 and the cylinder part 423 and where the air compressed in the cylinder chamber S is exhausted, are provided.

Side plates 425 and 426 are disposed at the rear end and the front end of the cylinder part 423, respectively. The diameter of the side plates 425 and 426 is set to be larger than the inside diameter of the internal peripheral surface 423A of the cylinder part 423. The side plates 425 and 426 are pressed against the front end and the rear end of the cylinder part 423, respectively, by being biased by gaskets 425A and 26A. Thereby, the sealed cylinder chamber S is formed inside the cylinder part 423 except the opening 423B which is coupled to the vacuum absorbing nipple 430 and the discharging ports 423C and 422C.

In the cylinder chamber S, the rotor 427 is disposed. The rotor 427 is formed into a thick cylindrical shape, and the output shaft 412 on which the above-mentioned spline part 412B is formed is fitted to the internal peripheral surface 27A of the rotor 427. With this spline fitting configuration, the rotor 427 is rotated integrally with the output shaft 412. The length in the front-rear direction of the rotor 427 is set to be substantially equal to the length of the cylinder part 423, namely, the distance between the mutually opposed inside surfaces of the above-mentioned two pieces of side plates 425 and 426. The outer diameter of the rotor 427 is set so that, as shown in FIG. 25, the outer peripheral surface 427B of the rotor 427 keeps a minute clearance from a part among the internal peripheral surface 423A of the cylinder part 423 that is located at the lower right side. Thereby, as shown in FIG. 25, a space of a crescent shape is formed between the outer peripheral surface 427B of the rotor 427 and the internal peripheral surface 423A of the cylinder part 423.

The rotor 427 is provided with a plurality of (in this example, five pieces) vanes 428 which partition the crescent space. The vane 428 is formed into a board shape, and the length in the front-rear direction is set to be substantially equal to the distance between the mutually opposed inside surfaces of the two pieces of side plates 425 and 426, like the rotor 427. These vanes 428 are disposed to be extendable from the guide grooves 427C which the rotor 427 is provided with. The vanes 428 are protruded outwards along the guide grooves 427C by a centrifugal force with the rotation of the rotor 427 so that the front ends of the vanes 428 abut with the internal peripheral surface 423A of the cylinder part 423. Thereby, the above-mentioned crescent space is partitioned into 5 compression chambers P surrounded by two pieces of mutually adjacent vanes 428 and 428, the outer peripheral surface 427B of the rotor 427 and the internal peripheral surface 423A of the cylinder part 423. These compression chambers P rotates in the same direction with the rotation of the arrow R direction of the rotor 427 with the rotation of the output shaft 412, and the capacity of each of these compression chambers P becomes bigger at positions near the opening 423B, and becomes smaller at positions near the discharging port 423C. That is, with the rotation of the rotor 427 and the vanes 428, the air taken in one compression chamber P from the opening 423B rotates and is compressed with the rotation of the rotor 427, and is discharged from the exhausting port 423C. In this configuration, the rotary compressing elements are formed by including the rotor 427 and the plurality of vanes 428.

In this configuration, the cylinder part 423 is formed in the casing body 422, as shown in FIG. 25, by offsetting the central axis X2 of the cylinder part 423 to the upper left side relative to the rotation center X1. Therefore, in the casing body 422, a big space in the direction opposite to that the cylinder part 423 is offset can be secured, and the expansion chamber 433 which communicates with the discharging ports 423C and 422C is formed in this space along the peripheral part of the cylinder part 423.

The expansion chamber 433 is formed as a big closed space along the peripheral part of the cylinder part 423 from a position below the cylinder part 423 to a position above the output shaft 412, and communicates with the exhausting port 424A which is formed in the pump cover 424. After the compressed air which flows into the expansion chamber 433 is expanded and scattered in the expansion chamber 433, the air hits the wall of the expansion chamber 433 and is reflected diffusely. Thereby, since the sound energy of the compressed air is attenuated, the noise and the vibration in the air-exhausting can be reduced. In the embodiment, an exhausting path 437 is formed by including the discharging ports 422C and 423C, which are formed in the casing body 422 and the cylinder part 423, respectively, the expansion chamber 433 and the exhausting port 424A.

In this embodiment, by arranging the cylinder part 423 to be offset from the rotation center X1 of the rotor 427, a big space at the peripheral part of the cylinder part 423 at the side of the above mentioned rotation center X1 can be ensured in the casing body 422. Therefore, because the expansion chamber 433 can be integrally formed in the casing body 422 by forming the big expansion chamber 433 in this space, it is not necessary to provide the expansion chamber 433 outside the casing body 422, the casing body 422 can be downsized and thus the vacuum pump 401 can be downsized.

The pump cover 424 is arranged to the front side plate 426 via a sealing ring 426A, and is fixed to the casing body 422 with a bolt 66. On the front of the casing body 422, as shown in FIG. 25, a sealing groove 422D is formed by surrounding the cylinder part 423 and the expansion chamber 433, and an annular sealing member 467 is arranged to the sealing groove 422D. The exhausting port 424A is provided in the pump cover 424 at a position corresponding to the expansion chamber 433. The exhausting port 424A is intended to exhaust the air which flows into the expansion chamber 433 to the outside of the device (the outside of the vacuum pump 401), and a check valve 429 for preventing the countercurrent of air from the outside of the device into the pump is attached to the exhausting port 424A.

Figure 26:
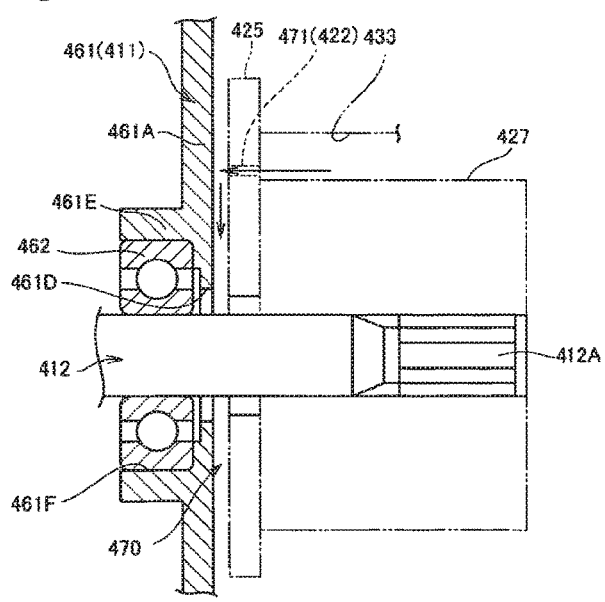
FIG. 26 is a rear view of a casing body.

FIG. 26 is a rear view of the casing body 422.

As mentioned above, the vacuum pump 401 is formed by coupling the electric motor 410 and the pump body 420, and the rotor 427 connected to the output shaft 412 of the electric motor 410 and the vanes 428 slide in the cylinder part 423 of the pump body 420. Therefore, it is important to assemble the pump body 420 in accordance with the rotation center X1 of the output shaft 412 of the electric motor 410.

Therefore, in this embodiment, as mentioned above, the fitting cavity 463, which is centered on the rotation center X1 of the output shaft 412, is formed at one end of the case 411 of the electric motor 410. On the other hand, on the back of the casing body 422, as shown in FIG. 26, a cylindrical fitting part 422F is integrally formed to be protruded backwards around the cylinder chamber S. The fitting part 422F is formed concentrically with the rotation center X1 of the output shaft 412 of the electric motor 410, and is formed so that the outer edge of the fitting part 422F is engaged with the fitting cavity 463 of the electric motor 410 in a pillbox manner. Furthermore, a chamfering process is performed at the corners 422G of the fitting part 422F so that the casing body 422 can be easily fitted in the fitting cavity 463 of the electric motor 410.

Therefore, with this configuration, since only by fitting the fitting part 422F of the casing body 422 into the fitting cavity 463 of the electric motor 410, the central locations can be easily put together, the assembly of the electric motor 410 and the pump body 420 can be easily performed. Further, on the back of the casing body 422, a sealing groove 422E is formed around the fitting part 422F, and a circular sealing member 435 is arranged to the sealing groove 422E.

In the vacuum pump 401 of the present embodiment, the fitting part 422F of the casing body 422 is fitted in and fixed to the fitting cavity 463 the electric motor 410. Because the cylinder body 423 forming the cylinder chamber S is arranged in the inside of the fitting part 422F as shown in FIG. 24, and the side plate 425 is arranged at the side of the rear end (the electric motor 410) of the cylinder body 423, a minute space 470 is formed between the side plate 425 and the disk part 461A of the electric motor 410.

On the other hand, because the side plates 425 and 426 and the rotor 427 do not always adhere when the vacuum pump 401 is operated, air is drawn from the above described space 470 through gaps between the side plates 425 and 426 and the rotor 427 and a gap between the axial bore 27A of the rotor 427 and the output shaft 412 since an underpressure occurs in the compression chambers P, and the pressure of the space 470 may become lower than the atmospheric pressure (that is, underpressure).

Then, a flow of the air in the case 411 of the electric motor 410 that flows into the above mentioned space 470 through the through hole 461D which is a bore near the open-type bearing (shaft bearing) 462 may occur. When this flow occurs, abrasion powder which occurs because of the sliding of, for example, the brush of the electric motor 410 may be attached to the bearing 462, and it is desired that the attachment of the abrasion powder is avoided.

Figure 27:
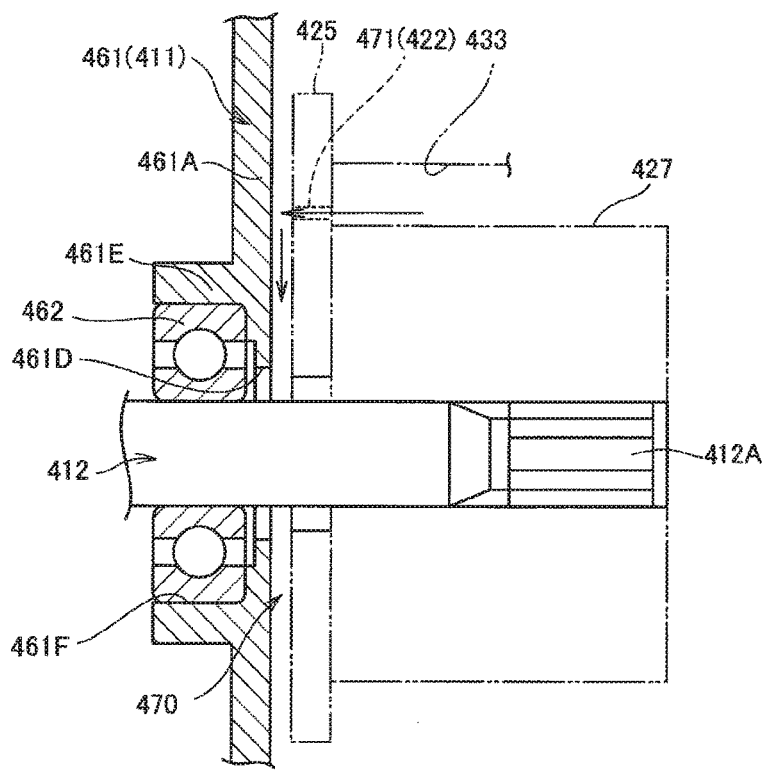
FIG. 27 is a figure which describes a flow of air.

In this configuration, in order to prevent an underpressure in the minute space 470 formed between the side plate 425 and the disk part 461A of the electric motor 410, a communicating hole 471 of a small size (in the present embodiment 1.6 mm in diameter) that communicates the space 470 and the expansion chamber (other space) 433 whose pressure is above the atmospheric pressure is formed in the casing body 422. Thus, when the pressure of the space 470 is below the atmospheric pressure, as shown in FIG. 27, since the air whose pressure is above the atmospheric pressure flows into the space 470 through the communicating hole 471, the pressure of the space 470 is immediately restored to the atmospheric pressure (or above the atmospheric pressure). Therefore, by inhibiting that the air in the case 411 of the electric motor 410 flows into the space 470 through the through hole 461D, it can be avoided that the abrasion powder included in the air is attached to the bearing 462, and a durability drop of the bearing 462 can be prevented and thus a durability drop of the electric motor 410 can be prevented.

In this case, because air flows into the pump body 420 through the communicating hole 471, a drop of the vacuum degree in the external equipment may be concerned about. However, it becomes clear with an experiment that by forming the communicating hole 471, there is not a trouble at all. The biggest underpressure level is only slightly decreased (−95 kPa, −93 kPa) and is in the normal use range (for example, −60 kPa to −80 kPa) in a brake boosting device of an automobile.

The communicating hole 471 is formed, as shown in FIG. 25, above the output shaft 412 at a position that is near the cylinder part 423 at the upper part of the expansion chamber 433.

Even if the communicating hole 471 is formed at some position of the expansion chamber 433, as long as the position communicates with the space 470, the cancellation of the underpressure of the space 470 can be implemented. However, when the communicating hole is provided below the expansion chamber 433, namely, near the exhausting port 424A, there are the following problems.

In the cylinder chamber S, because the vanes are gradually worn when the vanes slide on the internal peripheral surface 423A of the cylinder chamber S, the air that contains abrasion powder is easy to be exhausted near the exhausting port 424A. Therefore, a problem occurs that when the communicating hole is provided near the exhausting port 424A, since the air that contains abrasion powder flows into the space 470 through the communicating hole, the abrasion powder is attached to the bearing 462. When it is assumed that rain water invades into the expansion chamber 433 through the exhausting port 424A, if the communicating hole is provided near the exhausting port 424A, it is possible that the rain water flows into the above space 470 through the communicating hole. In this case, because the electric motor 410 is next to the space 470, it is necessary to surely prevent the water from flowing into the electric motor 410.

In order to inhibiting the occurrence of these problems, in the present embodiment, the communicating hole 471 is formed above the output shaft 412 at the upper part of the expansion chamber 433. Therefore, even if abrasion powder or water invades into the expansion chamber 433 by any chance, because the abrasion powder or water is less likely to be moved to be higher than the output shaft 412, it can be prevented that the abrasion powder or water flows into the space 470 through the communicating hole 471.

Thus, in this embodiment, the communicating hole 471 communicating the minute space 470 which is formed between the side plate 425 and the disk part 461A of the electric motor 410 and the expansion chamber (other space) 433 whose pressure is above the atmospheric pressure is formed in the casing body 422. Therefore, by inhibiting that the air in the case 411 of the electric motor 410 flows into the above space 470 through the through hole 461D, it can be avoided that the abrasion powder included in the air is attached to the bearing 462. On the other hand, because the temperature in the case 411 of the electric motor 410 increases during the operation of the vacuum pump 401, it is necessary to positively exhaust the expanded air due to the temperature increase to the outside of the case 411.

Because the electric motor 410 is formed to a waterproof type, the case body 460 is not provided with an opening that becomes an exhausting port. Therefore, if no measure is taken, the expanded air due to the temperature increase will be exhausted through the through hole 461D which is a bore near the open-type bearing (shaft bearing) 462, and a problem occurs that the abrasion powder produced due to the sliding of, for example, the brush of the electric motor 410 may be attached to the bearing 462.

Therefore, in this embodiment, in the electric motor 410, an exhausting port (communicating hole) 472 is formed in the disk part 461A opposed to the fitting part 422F of the casing body 422, at a position that is higher than the bearing 462 in the disk part 461A of the case 411, namely, as shown in FIG. 24, a position right above the output shaft 412. Because the expanded air due to the temperature increase is exhausted through the exhausting port 472 when the temperature in the case 411 increases, by inhibiting that the air in the case 411 of the electric motor 410 is exhausted through the through hole 461D, it can be avoided that the abrasion powder included in the air is attached to the bearing 462, and a durability drop of the bearing 462 can be prevented and thus a durability drop of the electric motor 410 can be prevented.

Furthermore, in this embodiment, since the air exhausted from the exhausting port 472 flows into the above space 470 through a gap with the sealing ring 425A, the exhausting port 472 will communicate with the space 470 through the sealing ring 425A. Therefore, the exhausting port 472 functions as a communicating hole that communicates the space 470 with the inside of the case 411 of the electric motor 410 (a space whose pressure is above the atmospheric pressure) during the operation of the vacuum pump 401.

Because the exhausting port 472 is formed at a position that is higher than the bearing 462 in the disk part 461A of the case 411, the abrasion powder in the case 411 can be inhibited from being exhausted through the exhausting port 472, and water can be inhibited from invading into the case 411 through the exhausting port 472.

As described above, according to the present embodiment, in the vacuum pump 401 which includes the casing 431 attached to the disk part 461A of the case 411 of the electric motor 410, the rotor 427 rotationally driven by the output shaft 412 of the electric motor 410 in the casing 431, and a plurality of vanes 428 extendably accommodated in the rotor 427, the casing 431 includes the hollow cylinder chamber S which is driven by the rotor 427 and has the openings at the ends, and the side plates 425 and 426 which blocks the openings of the cylinder chamber S, and the communicating hole 471, which communicates the space 470, which is formed between the side plate 425 and the disk part 461A of the electric motor 410, and the expansion chamber 433, which is formed in the exhausting path 437 to link the cylinder chamber S and the exhausting port 424A, is included. Therefore, when the pressure of the above space 470 is below the atmospheric pressure, since the air in the expansion chamber 433 whose pressure is above the atmospheric pressure flows into the space 470 through the communicating hole 471, the pressure of the space 470 is immediately restored to the atmospheric pressure (or above the atmospheric pressure). Therefore, by inhibiting that the air in the case 411 of the electric motor 410 flows into the above space 470, a durability drop of the bearing 462 of the electric motor 410 due to the abrasion powder included in the air can be prevented, and thus a durability drop of the electric motor 410 can be prevented.

According to the present embodiment, the casing body 422 forming the casing 431 includes the expansion chamber 433, which is formed in the exhausting path 437 to link the cylinder chamber S and the exhausting port 424A, at the peripheral part of the cylinder chamber S. Therefore, the cylinder chamber S and the expansion chamber 433 can be integrally formed in the casing body 422, and the upsizing of the vacuum pump 401 can be inhibited. Furthermore, because the communicating hole 471 that communicates the expansion chamber 433 and the space 470 is formed in the casing body 422, the air in the expansion chamber 433 can easily flow into the above space 470. According to the present embodiment, the communicating hole 471 is formed at a position that is higher than the output shaft 412 in the expansion chamber 433. Therefore, even if abrasion powder or water invades into the expansion chamber 433 by any chance, because the abrasion powder or water is less likely to be moved to be higher than the output shaft 412, it can be prevented that the abrasion powder or water flows into the space 470 through the communicating hole 471.

According to the present embodiment, the electric motor 410 includes the bearing 462 that pivotally supports the output shaft 412, and the exhausting port 472 is formed in the disk part 461A of the case 411 at a position that is higher than the bearing 462. Therefore, since the expanded air due to the temperature increase is exhausted through the exhausting port 472 when the temperature in the case 411 increases, by inhibiting that the air in the case 411 of the electric motor 410 is exhausted through the through hole 461D, it can be avoided that the abrasion powder included in the air is attached to the bearing 462, and a durability drop of the bearing 462 can be prevented and thus a durability drop of the electric motor 410 can be prevented.

The preferred embodiments for performing the present invention are described as above, but the present invention is not limited to the previously described embodiments, and various modifications and changes are possible based on the technical thought of the present invention. For example, in this embodiment, the exhausting port 472 is provided in the disk part 461A opposed to the fitting part 422F of the casing body 422 and right above the output shaft 412, but the invention is not limited to this and the exhausting port may be provided at the inner side of the sealing ring 425A and above the bearing 462. In this case, a water draining hole may be provided in the disk part 461A of the case 411 of the electric motor 410 at a position that is lower than the bearing 462. The water draining hole is a hole where water is exhausted outside when the water invades into the case 411 by any chance, and it is desirable that the water draining hole is provided in the disk part 461A at a position as low as possible. The water draining hole, like the above described exhausting port 472, functions as a communicating hole that communicates the space 470 with the inside of the case 411 of the electric motor 410 (a space whose pressure is above the atmospheric pressure) during the operation of the vacuum pump 401.

Figure 28:
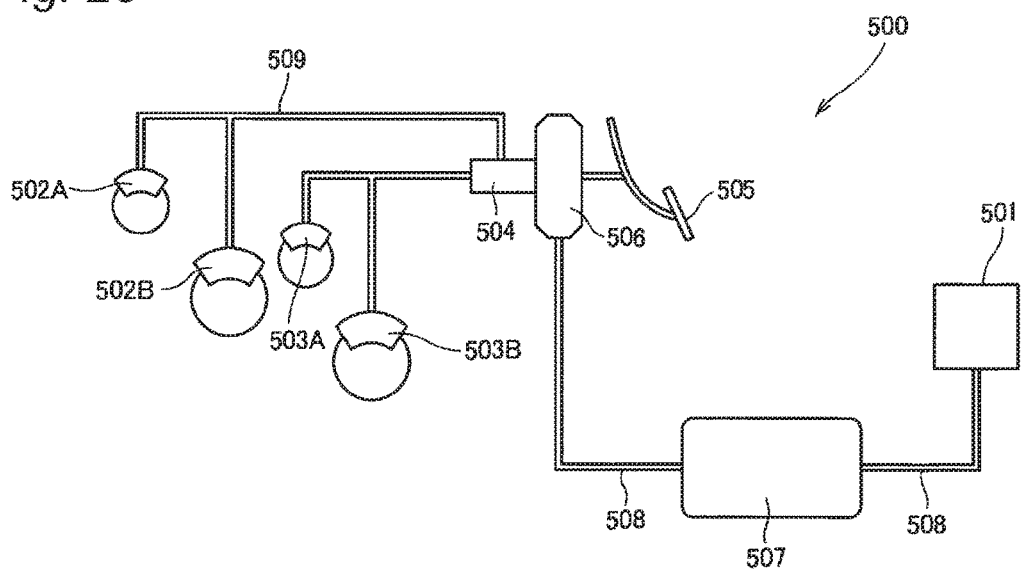
FIG. 28 is schematic diagram of a brake device in which a vacuum pump according to the embodiment of the invention to achieve the sixth object is used.

FIG. 28 is a schematic diagram of a brake device 500 in which a vacuum pump 501 according to the embodiment of the invention to achieve the first object is used as a vacuum source. For example, the brake device 500 includes front brakes 502a and 502b which are attached to the right and left front wheels of a vehicle such as an automobile, and rear brakes 503a and 503b which are attached to the right and left rear wheels. These brakes are connected with a master cylinder 504 via brake tubes 509, respectively, and each brake is operated with an oil pressure which is sent through the brake tube 509 from the master cylinder 504.

The brake device 500 further includes a brake booster 506 (brake boosting device) which is connected with a brake pedal 505, and a vacuum tank 507 and the vacuum pump 501 is serially connected to the brake booster 506 through an air tube 8. The brake booster 506 is adapted to boost the pedal force of the brake pedal 505 using an underpressure in the vacuum tank 507, and when a piston (not shown in the figure) of the master cylinder 504 is moved by a small pedal force, an enough braking power will be got.

The vacuum pump 501 is arranged in an engine room of the vehicle, and exhausts air in the vacuum tank 507 to the outside of the vehicle so that there becomes a vacuum in the vacuum tank 507. The use range of the vacuum pump 501 used for automobiles or the like is, for example, −60 kPa to −80 kPa.

Figure 29:
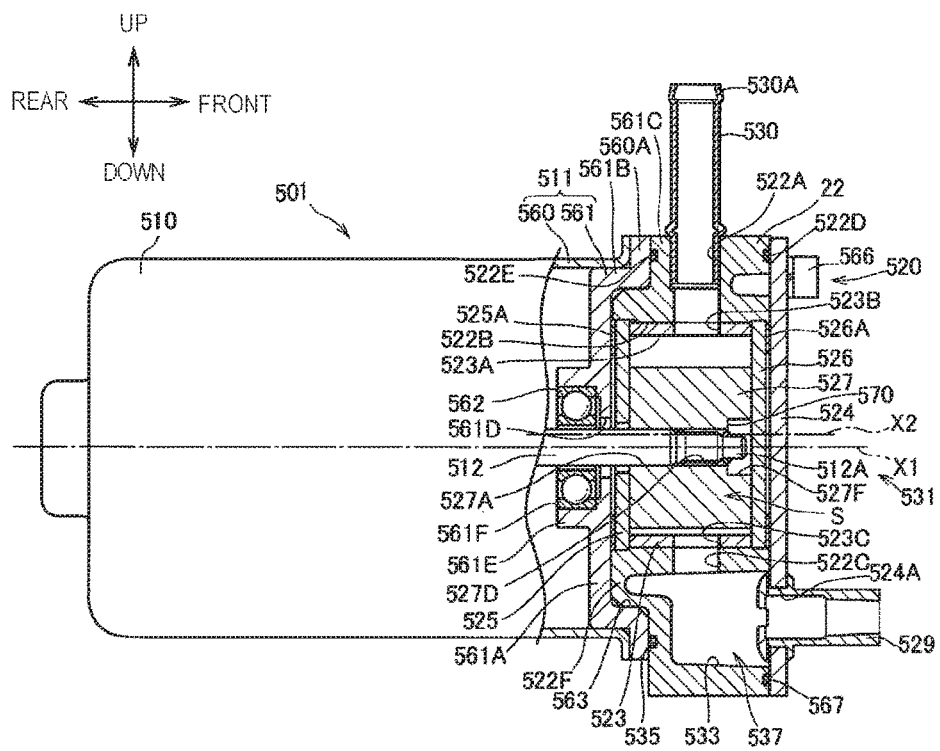
FIG. 29 is a side partial sectional view of the vacuum pump.
Figure 30:
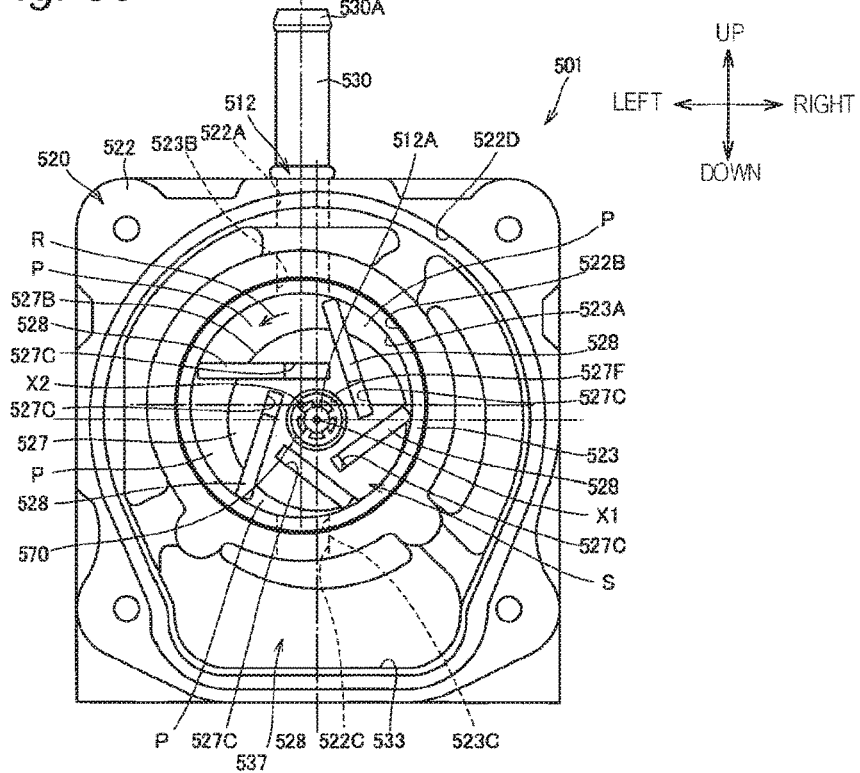
FIG. 30 is a figure of the vacuum pump when viewed from the front side.

FIG. 29 is a side partial sectional view of the vacuum pump 501, and FIG. 30 is a figure of the vacuum pump 501 of FIG. 29 when viewed from the front side of the vacuum pump 501 (the right side in the figure). However, FIG. 30 illustrates a state that those members such as a pump cover 524 and a side plate 526 are removed in order to show the configuration of a cylinder chamber S. In the following, for the convenience of description, the directions respectively indicated by the arrows in the upper parts of FIGS. 29 and 30 are the up, down, front, rear, right and left directions of the vacuum pump 501. The front-rear direction is an axial direction, and the right-left direction is a widthwise direction.

As shown in FIG. 29, the vacuum pump 501 includes an electric motor (driving machine) 510 and a pump body 520 which is operated by using the electric motor 510 as a driving source, and the electric motor 510 and the pump body 520 are fixed to and supported by a vehicle body of, for example, an automobile in an integrally connected state.

The electric motor 510 has an output shaft (rotary shaft) 512 which extends substantially from the center of one end (front end) of a case 511, which is formed into a substantially cylindrical shape, towards the side of the pump body 520 (front side). The output shaft 512 functions as a driving shaft for driving the pump body 520, and the output shaft 12 rotates around a rotation center X1 extending in the front-rear direction. A front end part 512A of the output shaft 512 is formed to a spline shaft and is engaged with a shaft hole 527A where the rotor 527 of the pump body 520 is penetrated in the axial direction, so that the output shaft 512 and the rotor 527 are connected to be integrally rotatable. Instead of that the output shaft 512 and the rotor 527 are spline coupled, the output shaft 312 and the rotor 327 may be coupled through a key.

When a power supply (not shown in the figure) is switched ON, the output shaft 512 of the electric motor 510 rotates in an arrow R direction (counterclockwise direction) in FIG. 30, and thereby the rotor 527 is rotated in the same direction (arrow R direction) around the rotation center X1.

The case 511 includes a case body 560, which is formed to a bottomed cylindrical shape, and a cover body 561 which blocks the opening of the case body 560, and the case body 560 is formed by bending a peripheral part 560A of the case body 60 outwards. The cover body 561 is integrally formed by including a disk part (wall surface) 561A which is formed to have substantially the same diameter as that of the opening of the case body 560, a cylinder part 561B which is connected to the fringe of the disk part 561A and is fitted into the internal peripheral surface of the case body 560, and a flexed part 561C which is formed by bending outwards the fringe of the cylinder part 561B, the disk part 561A and the cylinder part 561B enter into the case body 560, and the flexed part 561C abuts against and is fixed to the peripheral part 560A of the case body 560. Thereby, in the electric motor 510, one end (front end) of the case 511 is caved inwards, and a fitting cavity 563, which the pump body 520 is attached to in a pillbox fitting manner, is formed.

Approximately in the center of the disk part 561A, a through hole 561D where the output shaft 512 penetrates and a circular bearing holding part 561E which extends inside of the case body 560 around the through hole 561D are formed, and the outer ring of a bearing 62 that pivotally supports the above output shaft 512 is held by the internal peripheral surface 61F of the bearing holding part 561E.

The pump body 520 includes, as shown in FIG. 29, a casing body 522 which is fitted into the fitting cavity 563 which is formed at the front side of the case 511 of the electric motor 510, a cylinder part 523 which is press fitted in the casing body 522 and forms a cylinder chamber S, and a pump cover 524 which covers the casing body 522 from the front side. In this embodiment, a casing 531 of the vacuum pump 501 is formed by including the casing body 522, the cylinder part 523 and the pump cover 524.

The casing body 522 uses, for example, metal materials such as aluminum whose thermal conductivity is high, and as shown in FIG. 30, the shape of the casing body 522, when viewed from front, is formed to a substantially rectangular shape which is longer in the up-down direction with the above-mentioned rotation center X1 as an approximate center. A communicating hole 22A, which communicates with the cylinder chamber S which the casing body 522 is provided with, is formed in the upper part of the casing body 522, and a vacuum absorbing nipple 530 is press fitted to the communicating hole 22A. As shown in FIG. 29, the vacuum absorbing nipple 530 is a direct pipe which extends upwards, and a pipe or a tube which supplies underpressure air from an external equipment (for example, a vacuum tank 507 (refer to FIG. 28)) is connected to one end 30A of the vacuum absorbing nipple 530.

A bore 522B around a central axis X2 which extends in the front-rear direction is formed in the casing body 522, and a cylinder part 523 which is formed to a cylindrical shape is press fitted into the bore 522B. The central axis X2 is parallel with the rotation center X1 of the output shaft 512 of the above-mentioned electric motor 510, and as shown in FIG. 29, is offset to the upper left side relative to the rotation center X1. In this configuration, the central axis X2 is offset so that the outer peripheral surface 527B of the rotor 527 around the rotation center X1 is adjacent to the internal peripheral surface 523A of the cylinder part 523 that is formed around the central axis X2.

The cylinder part 523 is formed of metal material (in the present embodiment, iron) which is the same as that of the rotor 527. With this configuration, because the thermal expansion coefficients of the cylinder part 523 and the rotor 527 are the same, regardless of temperature change of the cylinder part 523 and the rotor 527, the contact of the outer peripheral surface 527B of the rotor 527 and the internal peripheral surface 523A of the cylinder part 523 when the rotor 527 is rotated can be prevented. The cylinder part 523 and the rotor 527 may use different materials as long as they are metal materials that have substantially the same thermal expansion coefficient.

Because the cylinder part 523 can be accommodated in the length range of the front-rear direction of the casing body 522 by press fitting the cylinder part 523 into the bore 522B which is formed in the casing body 522, the cylinder part 523 is prevented from being protruded from the casing body 522 and the casing body 522 can be downsized.

Furthermore, the casing body 522 is formed of material whose thermal conductivity is higher than that of the rotor 527. Thereby, since the heat that is generated when the rotor 527 and vanes 528 are rotationally driven can be transmitted to the casing body 522 immediately, the heat from the casing body 522 can be dissipated sufficiently.

An opening 523B which is coupled with the communicating hole 22A of the above described casing body 522 and the cylinder chamber S is formed at the cylinder part 523, and the air passing through the vacuum absorbing nipple 530 is supplied to the cylinder chamber S through the communicating hole 22A and the opening 523B. Therefore, in this embodiment, an intake path 32 is formed by including the vacuum absorbing nipple 530, the communicating hole 22A of the casing body 522 and the opening 523B of the cylinder part 523. At the lower part of the casing body 522 and the cylinder part 523, discharging ports 522C and 523C, which penetrate the casing body 522 and the cylinder part 523 and where the air compressed in the cylinder chamber S is exhausted, are provided.

Side plates 525 and 526 which block the openings of the cylinder chamber S, respectively, are disposed at the rear end and the front end of the cylinder part 523. The diameter of the side plates 525 and 526 is set to be larger than the inside diameter of the internal peripheral surface 523A of the cylinder part 523. The side plates 525 and 526 are pressed against the front end and the rear end of the cylinder part 523, respectively, by being biased by gaskets 525A and 526A. Thereby, the sealed cylinder chamber S is formed inside the cylinder part 523 except the opening 523B which is coupled to the vacuum absorbing nipple 530 and the discharging ports 523C and 522C.

In the cylinder chamber S, the rotor 527 is disposed. The rotor 527 has a cylindrical column shape which extends along the rotation center X1 of the electric motor 510, and has an axial bore 527A through which the output shaft 512 which is a driving shaft of the pump body 520 is inserted. Meanwhile, at positions away from the axial bore 527A in the radical direction, a plurality of guide grooves 527C are provided around the axial bore 527A by being spaced in the peripheral direction with an equal angular interval. A spline hole, which is engaged with the spline shaft that is provided at the front end part 512A of the output shaft 512, is formed at the above axial bore 527A, and the rotor 527 and the output shaft 512 is adapted to be spline connected.

The length in the front-rear direction of the rotor 527 is set to be substantially equal to the length of the cylinder chamber S of the cylinder part 523, namely, the distance between the mutually opposed inside surfaces of the above-mentioned two pieces of side plates 525 and 526, and the space between the rotor 527 and the side plates 525 and 526 are substantially blocked.

The outer diameter of the rotor 527 is set so that, as shown in FIG. 30, the outer peripheral surface 527B of the rotor 527 keeps a minute clearance from a part among the internal peripheral surface 523A of the cylinder part 523 that is located at the lower right side. Thereby, as shown in FIG. 30, a space of a crescent shape is formed between the outer peripheral surface 527B of the rotor 527 and the internal peripheral surface 523A of the cylinder part 523.

The rotor 527 is provided with a plurality of (in this example, five pieces) vanes 528 which partition the crescent space. The vane 528 is formed into a board shape, and the length in the front-rear direction is set to be substantially equal to the distance between the mutually opposed inside surfaces of the two pieces of side plates 525 and 526, like the rotor 527. These vanes 528 are disposed to be extendable from the guide grooves 527C which the rotor 527 is provided with. The vanes 528 are protruded outwards along the guide grooves 527C by a centrifugal force with the rotation of the rotor 527 so that the front ends of the vanes 528 abut with the internal peripheral surface 523A of the cylinder part 523. Thereby, the above-mentioned crescent space is partitioned into 5 compression chambers P surrounded by two pieces of mutually adjacent vanes 528 and 528, the outer peripheral surface 527B of the rotor 527 and the internal peripheral surface 523A of the cylinder part 523. These compression chambers P rotates in the same direction with the rotation of the arrow R direction of the rotor 527 with the rotation of the output shaft 512, and the capacity of each of these compression chambers P becomes bigger at positions near the opening 523B, and becomes smaller at positions near the discharging port 23C. That is, with the rotation of the rotor 527 and the vanes 528, the air taken in one compression chamber P from the opening 523B rotates and is compressed with the rotation of the rotor 527, and is discharged from the exhausting port 23C.

In this configuration, the cylinder part 523 is formed in the casing body 522, as shown in FIG. 29, by offsetting the central axis X2 of the cylinder part 523 to the upper left side relative to the rotation center X1. Therefore, in the casing body 522, a big space in the direction opposite to that the cylinder part 523 is offset can be secured, and the expansion chamber 533 which communicates with the discharging ports 523C and 522C is formed in this space along the peripheral part of the cylinder part 523.

The expansion chamber 533 is formed as a big closed space along the peripheral part of the cylinder part 523 from a position below the cylinder part 523 to a position above the output shaft 512, and communicates with the exhausting port 524A which is formed in the pump cover 524. After the compressed air which flows into the expansion chamber 533 is expanded and scattered in the expansion chamber 533, the air hits the wall of the expansion chamber 533 and is reflected diffusely. Thereby, since the sound energy of the compressed air is attenuated, the noise and the vibration in the air-exhausting can be reduced. In the embodiment, an exhausting path 537 is formed by including the discharging ports 522C and 523C, which are formed in the casing body 522 and the cylinder part 523, respectively, the expansion chamber 533 and the exhausting port 524A.

In this embodiment, by arranging the cylinder part 523 to be offset from the rotation center X1 of the rotor 527, a big space at the peripheral part of the cylinder part 523 at the side of the above mentioned rotation center X1 can be ensured in the casing body 522. Therefore, because the expansion chamber 533 can be integrally formed in the casing body 522 by forming the big expansion chamber 533 in this space, it is not necessary to provide the expansion chamber 533 outside the casing body 522, the casing body 522 can be downsized and thus the vacuum pump 501 can be downsized.

The pump cover 524 is arranged to the front side plate 526 via a sealing ring 526A, and is fixed to the casing body 522 with a bolt 66. On the front of the casing body 522, as shown in FIG. 29, a sealing groove 522D is formed by surrounding the cylinder part 523 and the expansion chamber 533, and an annular sealing member 67 is arranged to the sealing groove 522D. The exhausting port 524A is provided in the pump cover 524 at a position corresponding to the expansion chamber 533. The exhausting port 524A is intended to exhaust the air which flows into the expansion chamber 533 to the outside of the device (the outside of the vacuum pump 501), and a check valve 529 for preventing the countercurrent of air from the outside of the device into the pump is attached to the exhausting port 524A.

As mentioned above, the vacuum pump 501 is formed by coupling the electric motor 510 and the pump body 520, and the rotor 527 connected to the output shaft 512 of the electric motor 510 and the vanes 528 slide in the cylinder part 523 of the pump body 520. Therefore, it is important to assemble the pump body 520 in accordance with the rotation center X1 of the output shaft 512 of the electric motor 510.

Therefore, in this embodiment, the fitting cavity 563, which is centered on the rotation center X1 of the output shaft 512, is formed at one end of the case 511 of the electric motor 510. On the other hand, on the back of the casing body 522, as shown in FIG. 29, a cylindrical fitting part 522F is integrally formed to be protruded backwards around the cylinder chamber S. The fitting part 522F is formed concentrically with the rotation center X1 of the output shaft 512 of the electric motor 510, and is formed so that the outer edge of the fitting part 522F is engaged with the fitting cavity 563 of the electric motor 510 in a pillbox manner.

Therefore, with this configuration, only by fitting the fitting part 522F of the casing body 522 into the fitting cavity 563 of the electric motor 510, the central locations can be easily put together and the assembly of the electric motor 510 and the pump body 520 can be easily performed. Further, on the back of the casing body 522, a sealing groove 522E is formed around the fitting part 522F, and a circular sealing member 535 is arranged to the sealing groove 522E.

In the small vacuum pump used in the brake device of an automobile, usually, a small lightweight rotor is used, and in order to assemble the pump efficiently, the rotor is not fixed at all relative to the output shaft and is provided to be movable in the axial direction of the output shaft. Additionally, because the rotor is cantilever supported at the front end of the output shaft of the electric motor, when the rotor is rotated, it is very likely that the rotor is protruded to the front end side of the output shaft with the rotation. Therefore, in the conventional configuration, in the operation of the vacuum pump, since the rotor contacts with the front side plate, the rotor and the side plate are damaged due to the abrasion, and there is a problem that the durability of the vacuum pump is decreased. In order to solve this problem, this configuration has a feature in the coupling structure of the rotor 527 and the output shaft 512.

Figure 31:
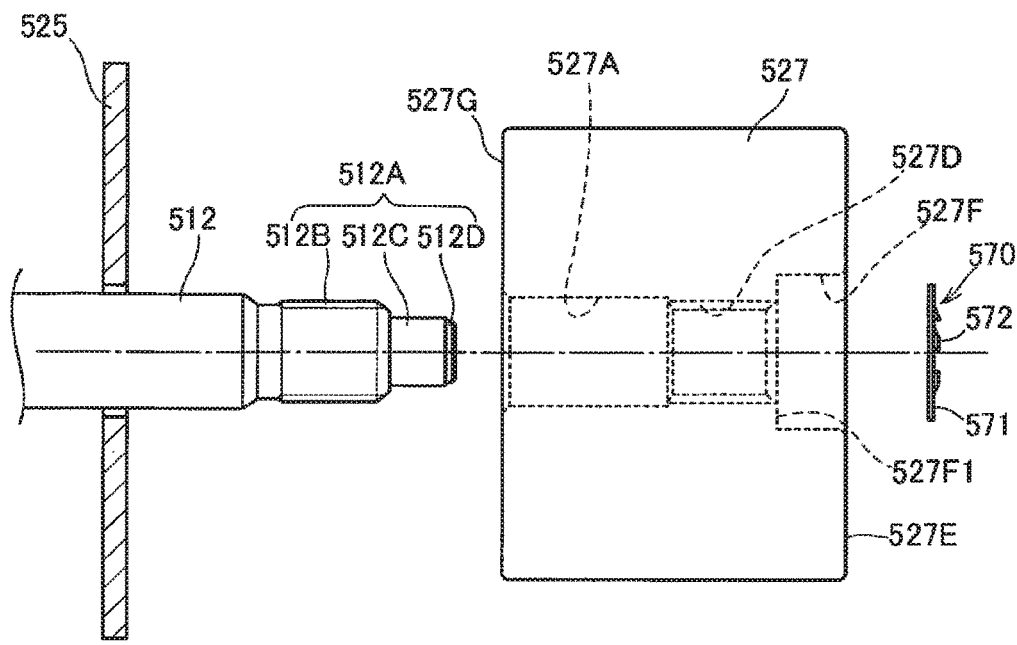
FIG. 31 is an exploded perspective view which shows a coupling structure of a rotor and an output shaft.

FIG. 31 is an exploded perspective view which shows the coupling structure of the rotor 527 and the output shaft 512.

The rotor 527, as described above, is spline connected with the output shaft 512, and since the rotor 527 is locked to the output shaft 512 with a push nut 570, the movement of the rotor 527 to the front end side of the output shaft 512 is regulated.

In particular, a spline bore 527D is formed in a part of the axial bore 527A of the rotor 527, as shown in FIG. 31, and by engaging the spline part 12B formed in the front end part 512A of the output shaft 512 with the spline bore 527D, the rotor 527 and the output shaft 512 are spline connected. Thus, after the rotor 527 and the output shaft 512 are spline connected, the rotor 527 is movable axially on the spline part 512B.

A columnar recess 527F whose diameter is larger than the axial bore 527A is formed around the axial bore 527A at the front end surface 27E of the rotor 527. A locking part 512C and a diameter-reduced part 512D of the output shaft 512 which is inserted into the axial bore 527A extend in the recess 527F, and the push nut 570 is locked in the recess 527F to the locking part 512C of the output shaft 512.

Figure 32:
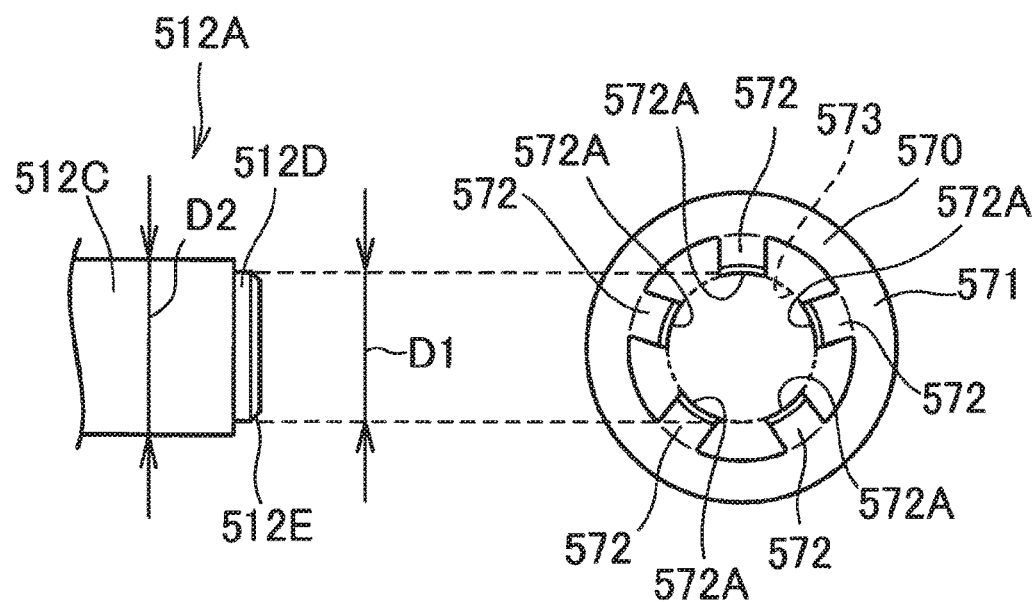
FIG. 32 is a figure which shows a shape of the front end part of the rotary shaft and a shape of a push nut.

The push nut 570, as shown in FIG. 32, includes a ring-like and board-like flange part 571, and a plurality of (five) claw parts 572 which are formed to be protruded from the inner peripheral part of the flange part 571 to the central direction in a top view. These five claw parts 572 are substantially equally arranged at the inner peripheral part of the flange part 571, and are formed so that the diameter D2 of the locking part 512C of the output shaft 512 is slightly bigger than the inside diameter D1 of an opening 573 formed at the front ends 572A of these claw parts 572.

Thereby, when the push nut 570 is fitted to the locking part 512C, each of the claw parts 572 transforms, and the claw parts 572 and the outer peripheral surface of the locking part 512C are locked with a restoring force of these claw parts 572. Because the flange part 571 of the push nut 570 abuts against the bottom surface (end surface) 27F1 (FIG. 31) of the recess 527F, the movement of the rotor 527 to the front end side of the output shaft 512 is regulated.

Therefore, with a simple configuration that the push nut 570 is attached to the output shaft 512, since it can be prevented that the rotor 527 and the front side plate 526 contact, the abrasion of the rotor 527 and the side plate 526 is inhibited and the durability of the vacuum pump 501 can be improved. Furthermore, because the push nut 570 is easily attached to the locking part 512C of the output shaft 512 in comparison with other fastening means such as bolts, the movement of the rotor 527 to the front end part 512A of the output shaft 512 can be prevented with an easy and short-time operation.

If the rotor 527 is only fixed to the output shaft 512, of course it is possible to use the fastening means such as bolts. However, high efficiency and time-shortening in the assembly of pumps are required, for example, for the small vacuum pump 501 of the present embodiment, and when the rotor 527 is fixed to the output shaft 512, it is necessary to perform operations of positioning and fixing the rotor 527 in a short time (for example, around ten seconds).

Figure 33A:
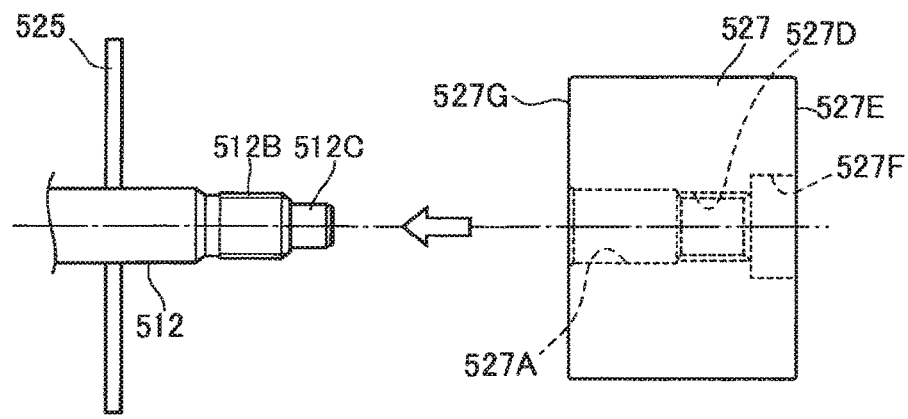
FIGS. 33A to 33C are figures which describe assembling procedures of a rotor.
Figure 33B:
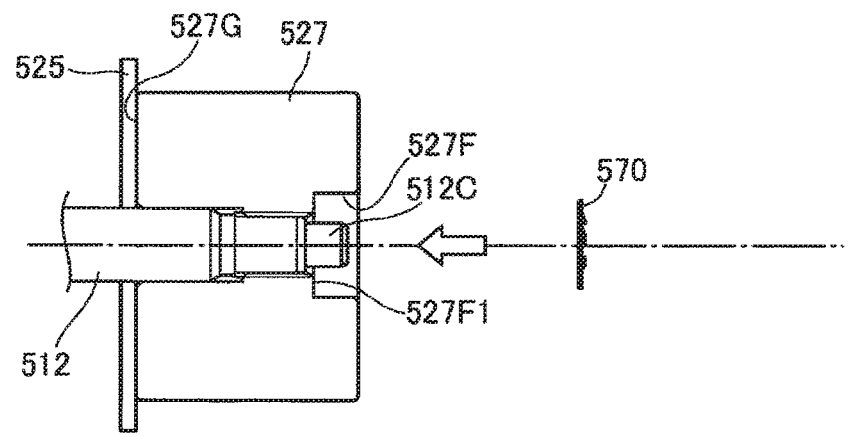
Figure 33C:
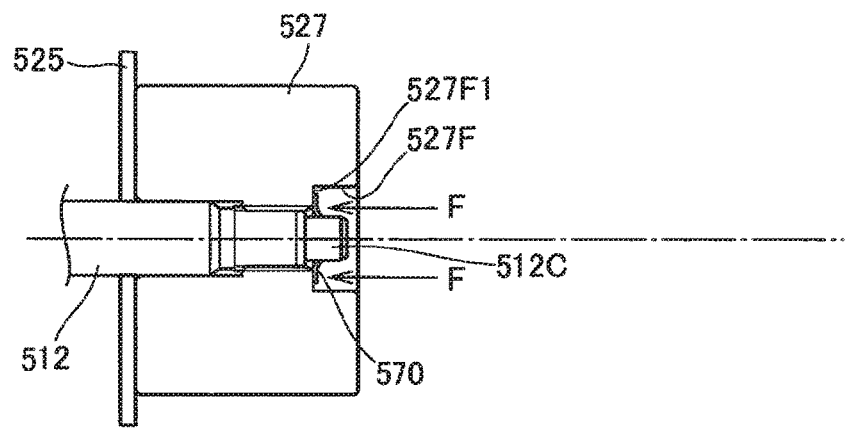

Then, with reference to FIGS. 33A to 33C, assembling procedures of the rotor 527 is described.

In FIGS. 33A to 33C, the descriptions of the case 511 of the electric motor 510 and the casing body 522 are omitted.

At first, as shown in FIG. 33A, the rotor 527 is inserted into the output shaft 512, and the spline part 512B of the output shaft 512 and the spline bore 527D of the rotor 527 are spline connected. In this case, because the length of the rotor 527 is set to be substantially equal to the length of the cylinder chamber S (FIG. 29), the rotor is inserted until the rear end surface 27G of the rotor 527 abuts against the back side plate 525, and the front end surface 27E of the rotor 527 and the opening of the cylinder chamber S becomes substantially flush.

Then, the push nut 570 is locked to the locking part 512C of the output shaft 512. When the rotor 527 is inserted into the output shaft 512 until the rotor 527 abuts against the side plate 525, as shown in FIG. 33B, the locking part 512C of the output shaft 512 is extended in the recess 527F formed in the rotor 527.

In the embodiment, as shown in FIG. 32, the output shaft 512 includes the locking part 512C and the diameter-reduced part 521D whose diameter is smaller than that of the locking part 512C, and the diameter D1 of the diameter-reduced part 512D is formed to be substantially equal to the inside diameter D1 of the opening 573 surrounded by the front ends 572A of the plurality of claw parts 572 of the push nut 570. Therefore, by fitting the push nut 570 to the diameter-reduced part 512D and making the push nut 570 to move along the diameter-reduced part 512D, the push nut 570 can be guided to the locking part 512C without being inclined relative to the output shaft 512. Furthermore, a chamfering processing is given to the corner 512E of the diameter-reduced part 512D, and the push nut 570 can be easily fitted to the diameter-reduced part 512D.

Then, as shown in FIG. 33C, by pressing the push nut 570 until the push nut 570 abuts against the bottom surface 27F1 of the recess 527F of the rotor 527, the push nut 570 is locked to the locking part 512C of the output shaft 512.

In this case, the push nut 570 is attached to the output shaft 512 by using an exclusive jig (not shown in the figure) whose pressing load can be measured. By pressing down until the pressing load F exceeds a predetermined threshold (for example, 100N), the rotor 527 is positioned by being held by the back side plate 525 and the push nut 570. Therefore, the positioning of the rotor 527 relative to the output shaft 512 can be easily performed with an easy operation of inserting the rotor 527 into the output shaft 512 until the rotor 527 abuts against the side plate 525, by pressing the push nut 570 against the bottom surface 27F1 of the recess 527F of the rotor 527 until a predetermined reference value is exceeded, it can be easily determined whether the positioning of the rotor 527 is completed based on whether the reference value is exceeded, and the assembly of the pump can be performed in a short time even if there is no experienced person.

In this situation, because the rotor 527 is positioned by being in contact with the back side plate 525, in the initial operation of the vacuum pump 501, since the rotor 527 and the side plate 525 slide, initial abrasion is produced in the rotor 527 and the side plate 525 by. However, at the time of the operation of the vacuum pump 501, because a force that presses the rotor 527 against the push nut 570 is produced, the contact of the rotor 527 and the side plate 525 is prevented, and the abrasion of the rotor 527 and the side plate 525 is prevented after that.

As described above, according to the present embodiment, the casing 531 attached to the electric motor 510, the hollow cylinder chamber S which is formed in the casing 531 and has the openings at the two ends of the casing 531, the rotor 527 which is provided to be movable in the axial direction relative to the output shaft 512 of the electric motor 510 and which is rotationally driven in the cylinder chamber S with the output shaft 512, and the pair of side plates 525 and 526 which block the openings of the rotor 527 are included, and the push nut 570 which regulates the movement of the rotor 527 to the front end part 512A of the output shaft 512 is provided to the output shaft 512. Therefore, by preventing the contact of the rotor 527 and the front side plate 526 with a simple configuration, the abrasion of the rotor 527 and the side plate 526 is inhibited and the durability of the vacuum pump 501 can be improved. Furthermore, because the push nut 570 is easily attached to the output shaft 512 in comparison with other fastening means such as bolts, the movement of the rotor 527 to the front end part 512A of the output shaft 512 can be prevented with an easy and short-time operation.

According to the present embodiment, the rotor 527 is inserted into the output shaft 512 until the rotor 527 abuts against the back side plate 525 located at the side of the electric motor, and in this state, by pressing the push nut 570 against the end surface of the rotor 527 until a predetermined reference value is exceeded, the push nut 570 is locked to the output shaft 512. With an easy operation of inserting the rotor 527 into the output shaft 512 until the rotor 527 abuts against the side plate 525, the positioning of the rotor 527 relative to the output shaft 512 can be performed easily. By pressing the push nut 570 against the end surface of the rotor 527 until a predetermined reference value is exceeded, it can be easily determined whether the positioning of the rotor 527 is completed based on whether the reference value is exceeded, and the assembly of the pump can be performed in a short time even if there is no experienced person.

In this case, because the rotor 527 is positioned by being in contact with the back side plate 525, in the initial operation of the vacuum pump 501, since the rotor 527 and the side plate 525 slide, initial abrasion is produced in the rotor 527 and the side plate 525. However, at the time of the operation of the vacuum pump 501, because a force that presses the rotor 527 against the push nut 570 is produced, the contact of the rotor 527 and the side plate 525 is prevented, and the abrasion of the rotor 527 and the side plate 525 is prevented after that.

According to the embodiment, the output shaft 512 includes the locking part 512C, to which the plurality of claw parts 572 of the push nut 570 are locked, at the front end part 512A, and the diameter-reduced part 521D whose diameter is smaller than that of the locking part 512C, and the diameter of the diameter-reduced part 512D is formed to be substantially equal to the inside diameter of the opening 573 surrounded by the front ends 572A of the plurality of claw parts 572 of the push nut 570. Therefore, by making the push nut 570 to move along the diameter-reduced part 512D, the push nut 570 can be guided to the locking part 512C without being inclined relative to the output shaft 512. Therefore, by pressing the push nut 570 guided to the locking part 512C against the rotor 527, the likelihood of failing to install the push nut 570 due to the inclination of the push nut 570 can be reduced, and while the operation procedure is simplified, the operation time can be shortened.

According to the present embodiment, the recess 527F is formed at the front end surface 27E of the rotor 527 around the axial bore 527A where the output shaft 512 is inserted, and the push nut 570 is locked to the locking part 512C of the output shaft 512 in the recess 527F. Therefore, without making the front end part 512A of the output shaft 512 to be protruded from the front end surface 27E of the rotor 527, the push nut 570 can be locked to the output shaft 512 and the configuration of the vacuum pump 501 can be simplified.

The preferred embodiments for performing the present invention are described as above, but the present invention is not limited to the previously described embodiments, and various modifications and changes are possible based on the technical thought of the present invention.

INDUSTRIAL APPLICABILITY

The present invention can be applied to a vacuum pump (compressing device) that includes rotary compressing elements in a casing. In particular, the present invention can be applied to a vacuum pump which has a rotor that is attached to a rotary shaft of a vane-type driving machine. For example, the present invention can be applied to a vacuum pump which is carried in an engine room of an automobile, and is used to produce a vacuum to operate a brake boosting device.

REFERENCE SIGNS LIST 80, 101, 200, 201, 202, 301, 401, 501 vacuum pump (compressing device)
506 brake booster (brake boosting device)
507 vacuum tank
509 brake pipe
10, 110, 310, 410, 510 electric motor (driving machine)
11, 211, 411, 511 case
211A space (resonance chamber or intake side expansion chamber)
12, 412, 512 output shaft (rotary shaft)
20, 120, 220, 320, 420, 520 pump body
22, 122, 222, 322, 422, 522 case body
22A, 122A communicating hole
22B, 122B bore
22C, 122C exhausting port
122F fitting part
123, 223, 423, 523 cylinder part
23 cylindrical liners
23C exhausting port
23C1 taper surface
123B opening (communicating hole)
224A, 424A exhausting port
123C discharging port
24, 84, 124, 224, 424 pump cover
27, 127, 227, 327, 427, 527 rotor (rotary compressing element)
28, 128, 228, 328, 428, 528 vanes (rotary compressing element)
130, 230, 280, 430 vacuum absorbing nipple (inlet pipe)
31, 131, 331 casing
33, 133, 233 expansion chamber
433 expansion chamber (other space whose pressure is above the atmospheric pressure)
233A first orifice
234 resonance chamber
235A orifice
40, 237, 437 exhausting path
238, 438 intake side expansion chamber
40A inside course
40B outside course
40C turning part
41 separating wall
41A one end
41B the other end
44A, 44B silence member
163 fitting cavity
160A1 part
160C1 bore
260, 460 case body
261, 461 cover body
461A disk part (wall surface)
470 space
471 communicating hole
472 exhausting port (communicating hole)
264 second orifice
265 desiccating agent
268 communicating hole
271 first communicating hole
272 second communicating hole
371, 375 groove
381 labyrinth passage
81 pilot bearing
84A bearing holding hole
570 push nut
571 flange part
572 claw part
572A front end
573 opening
500 brake device F pressing load
P compression chamber
R arrow
S cylinder chamber
X1 rotation center
X2 central axis

The invention claimed is:

1. A vacuum pump comprising:
rotary compressing elements including a rotor and disposed in a casing,
wherein the casing comprises:
   a casing body which is formed of material whose thermal conductivity is higher than that of the rotary compressing elements, and
   a cylinder part which is press fitted in the casing body and in which the rotary compressing elements slide, and
the cylinder part is formed of a metal material which has a thermal expansion coefficient that is equal to that of the rotor.

2. The vacuum pump according to claim 1, wherein
the casing body and the cylinder part comprises a communicating hole which communicates with the cylinder part by penetrating through the casing body and the cylinder part, and
while an inlet pipe is provided at the communicating hole, a front end of the inlet pipe is engaged with the communicating hole of the cylinder part.

3. The vacuum pump according to claim 1, wherein
in the casing body, a central axis of the cylinder part is arranged at a position that is offset from the rotation center of the rotary compressing elements, and
an expansion chamber that communicates with the cylinder part is formed at a peripheral part of the cylinder part at a side opposite to a side to which the central axis of the cylinder part is offset from the rotation center.

4. A vacuum pump comprising:
rotary compressing elements including a rotor and disposed in a casing,
wherein the casing comprises:
   a casing body;
   a cylinder part which is press fitted in the casing body and in which the rotary compressing elements slide, and
the cylinder part is formed of a metal material which has a thermal expansion coefficient that is equal to that of the rotor.

* * * * *